US010855117B2

(12) United States Patent
Daetwyler et al.

(10) Patent No.: US 10,855,117 B2
(45) Date of Patent: Dec. 1, 2020

(54) EXTENDED FOREIGN OBJECT DETECTION SIGNAL PROCESSING

(71) Applicant: WiTricity Corporation, Watertown, MA (US)

(72) Inventors: Andreas Daetwyler, Muhen (CH); Hans Peter Widmer, Wohlenschwil (CH); Lukas Sieber, Olten (CH); Martin Ludwig Weber, Munich (DE)

(73) Assignee: WiTricity Corporation, Watertown, MA (US)

( * ) Notice: Subject to any disclaimer, the term of this patent is extended or adjusted under 35 U.S.C. 154(b) by 34 days.

(21) Appl. No.: 16/392,464

(22) Filed: Apr. 23, 2019

(65) Prior Publication Data

US 2019/0363588 A1  Nov. 28, 2019

Related U.S. Application Data

(60) Provisional application No. 62/675,127, filed on May 22, 2018.

(51) Int. Cl.
*H02J 50/60* (2016.01)
*H02J 50/40* (2016.01)
*H02J 50/90* (2016.01)
*H02J 50/12* (2016.01)

(52) U.S. Cl.
CPC .............. *H02J 50/60* (2016.02); *H02J 50/12* (2016.02); *H02J 50/40* (2016.02); *H02J 50/90* (2016.02)

(58) Field of Classification Search
CPC .. H02J 50/60; H02J 50/90; H02J 50/12; H02J 50/40
See application file for complete search history.

(56) References Cited

U.S. PATENT DOCUMENTS

| 2014/0167704 A1 | 6/2014 | Lafontaine et al. |
| 2016/0187520 A1 | 6/2016 | Widmer et al. |
| 2018/0076671 A1 | 3/2018 | Chopra et al. |

FOREIGN PATENT DOCUMENTS

WO  2019226268  11/2019

OTHER PUBLICATIONS

"International Search Report and Written Opinion", PCT Application No. PCT/US2019/028923, dated Oct. 25, 2019, 20 pages.
"Invitation to Pay Additional Fees", PCT Application No. PCT/US2019/028923, dated Sep. 25, 2019, 11 pages.

*Primary Examiner* — Robert L Deberadinis
(74) *Attorney, Agent, or Firm* — Colby Nipper PLLC

(57) ABSTRACT

Systems and methods are described for extended foreign object detection (FOD) signal processing. In aspects, an oscillator reset is implemented in a FOD system to mitigate the effects of intermodulation products. In addition, dynamic frequency allocation is implemented to avoid high noise desensitizing the FOD system. Also, a slow sampling mode is implemented to increase a tolerance to transient foreign objects. Reference tracking and auto-recovery is implemented to bridge power outages. Additionally, the FOD system is configured to support position finding for determining an alignment between the vehicle pad and the base pad using a passive beacon transponder circuit and to perform beacon response cancellation as needed in concurrent FOD operation.

30 Claims, 21 Drawing Sheets

EXTENDED FOREIGN OBJECT DETECTION SIGNAL PROCESSING

RELATED APPLICATION

This application claims priority to U.S. Provisional Patent Application 62/675,127 filed May 22, 2018 entitled "Extended Foreign Object Detection Signal Processing", the disclosure of which is incorporated by reference herein in its entirety.

FIELD

The present disclosure relates generally to object detection, for example, in an application for inductive power transfer. In particular, the present disclosure is directed to a circuit for extended foreign object detection signal processing.

BACKGROUND

Object detection may be valuable for a variety of applications, and in particular for applications where it may be useful to detect objects within a predetermined region. For example, in certain inductive power transfer applications (or other types of wireless power transfer applications) it may be useful to be able to rapidly detect foreign objects that may be present in an inductive power region and that could be susceptible to induction heating due to the high magnetic field strength in that region. In an inductive wireless electric vehicle charging (WEVC) system, magnetic flux densities above a transmit coil (e.g., a primary coil) can be at relatively high levels to allow for sufficient power transfer (e.g., for a WEVC system power may be transferred on the order of kilowatts—e.g., 3.3 kW, 11 kW, and the like). Metallic objects or other objects present in the magnetic field can experience undesirable induction heating. For this reason, foreign object detection (FOD) may be implemented to detect metal objects or other objects that are affected by a magnetic field generated by the coils of the wireless power transfer system.

SUMMARY

Systems and methods are described for extended foreign object detection (FOD) signal processing. In aspects, an oscillator reset is implemented in a FOD system to mitigate effects of intermodulation products. In addition, dynamic frequency allocation is implemented to avoid high noise desensitizing the FOD system. A slow sampling mode is implemented to increase a tolerance to transient foreign objects. Reference tracking and auto-recovery is implemented to bridge power outages. Additionally, the FOD system is configured to support position finding for determining an alignment between a vehicle pad and a base pad using a passive beacon transponder circuit and to perform beacon response cancellation as needed in concurrent FOD operation.

In aspects, an apparatus for detecting an object is disclosed. The apparatus includes a plurality of sense coils in a power-transfer system and drive circuitry electrically connected to the plurality of sense coils and configured to selectively apply a signal at an operating frequency to each of the plurality of sense coils. The apparatus also includes a detection circuit configured to: generate one or more sample values indicative of an impedance at one or more of the plurality of sense coils based on the selective application of the signal at the operating frequency to each of the plurality of sense coils by the drive circuitry; and adjust a parameter associated with a processing of the one or more sample values based on whether power transfer by the power-transfer system is active or inactive.

In aspects, a method for detecting an object is disclosed. The method includes generating one or more sample values indicative of an impedance at one or more of a plurality of sense coils of a power-transfer system based on a selective application of a signal at an operating frequency to each of the plurality of sense coils; and adjusting a parameter associated with a processing of the one or more sample values based on whether power transfer by the power-transfer system is active or inactive.

In another aspect, an apparatus for detecting an object is disclosed. The apparatus includes a drive means for selectively applying a signal at an operating frequency to each of a plurality of sense coils of a power-transfer system. The apparatus also includes a generating means for generating one or more samples values indicative of an impedance at one or more of the plurality of sense coils based on the selective application of the signal at the operating frequency to each of the plurality of sense coils by the drive means. The apparatus also includes an adjusting means for adjusting a parameter associated with a processing of the one or more sample values based on whether power transfer by the power-transfer system is active or inactive.

In aspects, an apparatus for detecting an object is disclosed. The apparatus includes a plurality of sense coils in a power-transfer system and drive circuitry electrically connected to the plurality of sense coils and configured to selectively apply a signal at an operating frequency to each of the plurality of sense coils. The apparatus also includes a detection circuit configured to: generate one or more values indicative of an impedance at one or more of the plurality of sense coils based on the selective application of the signal at the operating frequency to each of the plurality of sense coils; and store at least one of the one or more values in a memory. The detection circuit is further configured to compare at least another of the one or more values to the at least one of the one or more values stored in the memory: in response to detecting a power outage event; or as part of an initialization sequence that determines whether the at least one of the one or more values is stored in the memory. The detection circuit is further configured to determine whether an object is proximate to at least one of the plurality of sense coils based on at least the comparison of the at least another of the one or more values to the at least one of the one or more values stored in the memory.

In aspects, a method for detecting an object is disclosed. The method includes generating one or more values indicative of an impedance at one or more of a plurality of sense coils of a power-transfer system based on a selective application of a signal at an operating frequency to each of the plurality of sense coils. The method also includes storing at least one of the one or more values in a memory. The method further includes comparing at least another of the one or more values to the at least one of the one or more values stored in the memory: in response to detecting a power outage event; or as part of an initialization sequence that determines whether the at least one of the one or more values is stored in the memory. In addition, the method includes determining whether an object is proximate to at least one of the plurality of sense coils based on at least the comparison of the at least another of the one or more values to the at least one of the one or more values stored in the memory.

In at least one aspect, an apparatus for detecting an object is disclosed. The apparatus includes a drive means for selectively applying a signal at an operating frequency to each of the plurality of sense coils. The apparatus also includes a generating means for generating one or more values indicative of an impedance at one or more of the plurality of sense coils based on the selective application of the signal at the operating frequency to each of the plurality of sense coils. In addition, the apparatus includes a storing means for storing at least one of the one or more values in a memory. The apparatus also includes a comparing means for comparing at least another of the one or more values to the at least one of the one or more values stored in the memory in response to detecting a power outage event or as part of an initialization sequence that determines whether the at least one of the one or more values is stored in the memory. The apparatus further includes a determining means for determining whether an object is proximate to at least one of the plurality of sense coils based on at least the comparison of the at least another of the one or more values to the at least one of the one or more values stored in the memory.

In aspects, an apparatus for detecting an object is disclosed. The apparatus includes a plurality of sense coils in a power-transfer system, an analog frontend circuit coupled to the plurality of sense coils, and an oscillator configured to drive a digital-to-analog converter (DAC) coupled to the analog frontend circuit. The apparatus also includes a detection circuit configured to measure an impedance at each of the plurality of sense coils to determine a presence of a foreign metal object proximate to one or more of the plurality of sense coils, where the impedance is measured in a series of measurement cycles. The detection circuit is also configured to reset a parameter of the oscillator after each measurement cycle to reduce distortions in the impedance measurement. In some aspects, the distortions are caused by intermodulation between the plurality of sense coils.

The detection circuit may be configured to reset a phase of the oscillator after each measurement cycle. Resetting the oscillator after each measurement cycle can cause each impedance measurement sample to be stable over time and have the same offset. The oscillator may include a digitally controlled oscillator of a digital signal processor of the apparatus. The detection circuit may be further configured to determine the presence of a foreign metal object that is located within a magnetic field generated by the plurality of sense coils. The apparatus may include one or more additional analog frontend circuits configured to operate in parallel with the analog frontend circuit, where the analog frontend circuit and each of the one or more additional analog frontend circuits operate on a different frequency. The detection circuit may be further configured to generate one or more sample values indicative of the impedance at each of the plurality of sense coils and adjust a sampling rate for generating the one or more sample values based on whether power transfer by the power-transfer system is active or inactive. The detection circuit may also include an outlier cancellation filter configured to cancel out one or more of the one or more sample values that are within a time window having a length based on whether the power transfer is active or inactive. The detection circuit may be further configured to adjust an operating frequency of a signal applied to at least a portion of the plurality of sense coils based on one or more noise measurements and at least in part on avoiding harmonics of a power-transfer frequency of the power-transfer system.

In at least one aspect, a method is described for detecting an object. The method includes measuring an impedance at each of a plurality of sense coils to determine a presence of a foreign metal object proximate to one or more of the plurality of sense coils. The impedance is measured in a series of measurement cycles. The method also includes resetting a parameter of the oscillator after each measurement cycle to reduce distortions in the impedance measurement, where the distortions are caused by intermodulation between the plurality of sense coils.

In another aspect, an apparatus for detecting an object is disclosed. The apparatus includes a plurality of sense coils in a power-transfer system, an analog frontend circuit coupled to the plurality of sense coils, and an oscillator configured to drive a digital-to-analog converter (DAC) coupled to the analog frontend circuit. The apparatus also includes a measuring means for measuring an impedance at each of the plurality of sense coils to determine a presence of a foreign metal object proximate to one or more of the plurality of sense coils. In addition, the apparatus includes a resetting means for resetting a parameter of the oscillator after each measurement cycle to reduce distortions in the impedance measurement caused by intermodulation between the plurality of sense coils In aspects, an apparatus for detecting an object is disclosed. The apparatus includes a plurality of sense coils in a power-transfer system, drive circuitry, and a detection circuit. The drive circuitry is electrically connected to the plurality of sense coils and configured to selectively apply a signal at an operating frequency to each of the plurality of sense coils. The detection circuit is configured to: generate one or more values indicative of an impedance at one or more sense coils of the plurality of sense coils based on the selective application of the signal at the operating frequency to each of the plurality of sense coils; and determine that one or more of the one or more sense coils are defective based on a comparison between an absolute value of the impedance at the one or more sense coils and one or more resonance frequency ranges.

The resonance frequency ranges may include ranges that indicate a short-circuit, an open-circuit, or a hardware failure of a sense coil. The detection circuit may be further configured to adjust the operating frequency of the signal applied to at least a portion of the plurality of sense coils based on one or more noise measurements, and a range of adjustment of the operating frequency may be based around a resonance frequency of each of the plurality of sense coils. The operating frequency may be adjusted based at least in part on avoiding harmonics of a power-transfer frequency of the power-transfer system. The detection circuit may be further configured to adjust a sampling rate for generating the one or more values based on whether power transfer by the power-transfer system is active or inactive. The detection circuit may include an outlier cancellation filter configured to cancel out one or more of the one or more sample values that are within a time window having a length based on whether the power transfer is active or inactive. The detection circuit may be further configured to adjust a parameter associated with a processing of the one or more sample values based on whether the power transfer is active or inactive. The detection circuit may be configured to reduce distortions in impedance data by resetting a parameter of a local oscillator after each measurement cycle of the local oscillator.

In at least one aspect, a method for detecting an object is disclosed. The method includes selectively applying a signal at an operating frequency to each of a plurality of sense coils in a power-transfer system. The method also includes generating one or more values indicative of an impedance at one or more sense coils of the plurality of sense coils based on the selective application of the signal at the operating frequency to each of the plurality of sense coils. In addition, the method includes determining that one or more of the one or more sense coils are defective based on a comparison between an absolute value of the impedance at the one or more sense coils and one or more resonance frequency ranges.

In another aspect, an apparatus for detecting an object is disclosed. The apparatus includes a drive means for selectively applying a signal at an operating frequency to each of a plurality of sense coils in a power-transfer system. The apparatus also includes a generating means for generating one or more values indicative of an impedance at one or more sense coils of the plurality of sense coils based on the selective application of the signal at the operating frequency to each of the plurality of sense coils. In addition, the apparatus includes a determining means for determining that one or more of the one or more sense coils are defective based on a comparison between an absolute value of the impedance at the one or more sense coils and one or more resonance frequency ranges.

BRIEF DESCRIPTION OF THE DRAWINGS

In the figures, the left-most digit of a reference number identifies the figure in which the reference number first appears. The use of the same reference numbers in different instances in the description or the figures indicates like elements.

DETAILED DESCRIPTION

Object detection (and particularly metal object detection) may be valuable for a variety of applications. For detection in a predetermined region (space), an object detection system may include a plurality of sense elements distributed across a predetermined area. This predetermined region, which may be above the predetermined area, may be defined by the space where metal objects may be found and where the magnetic flux density exceeds certain limits (e.g., a threshold determined based on what levels of temperature to which an object might be heated up). The number of sense elements may be proportional or related to the minimum size of objects that are desirable to be detected. For a system that is configured to detect small objects (e.g., the size of a paper clip), the number of sense elements may be relatively high. Drive circuitry for applying sense signals to each of the sense elements, additional circuitry for conditioning of the sense elements, as well as corresponding detection and measurement circuitry for looking for changes in electrical characteristics that may correspond to the presence of an object may be costly or complex as the number of sense elements increases.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include, besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

Figure 1:
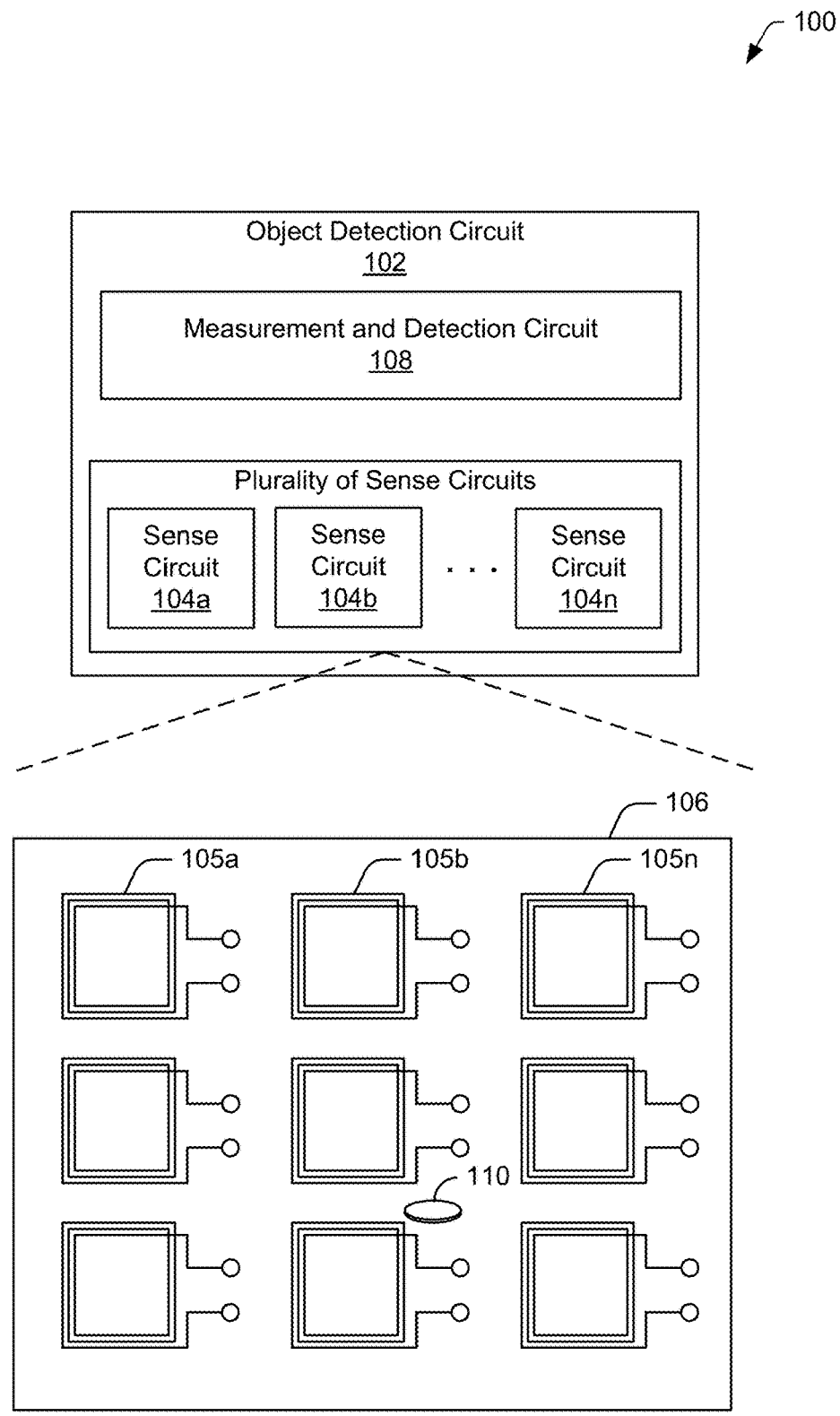
FIG. 1 illustrates an example implementation of an object detection circuit.

FIG. 1 illustrates an example implementation of a system 100 that includes an object detection circuit 102. The object detection circuit 102 includes one or more sense circuits, such as sense circuits 104a, 104b, and 104n. As shown in FIG. 1, each sense circuit 104a, 104b, and 104n includes corresponding sense coil 105a, 105b, 105n, respectively, configured to sense a change in one or more electrical characteristics that change in response to the presence of the object 110 in proximity to the sense coil 105a, 105b, or 105n to be able to provide detection coverage for an entire predetermined detection region. Each sense circuit 104a, 104b, and 104n may also include additional conditioning circuitry (not shown in FIG. 1) configured to improve measurement of a change in the one or more electrical characteristics. In aspects, sense circuits 104a, 104b, and 104n may include reactive components (capacitors) to compensate for the reactance of the sense coils 105a, 105b, and 105n at or near an operating (sense) frequency of the object detection circuit 102 and thus creating a resonance at or near the sense frequency. In implementations referred to herein, each of the sense circuits 104a, 104b, and 104n are configured as series resonant circuits providing a minimum magnitude impedance at or near the sense frequency. Each sense circuit 104a, 104b, and 104n also defines a measurement port (not shown in FIG. 1) where the change in an electrical characteristic (e.g., an impedance, an admittance, a voltage, or a current) is measured. In some implementations the sense coils may be arranged in a sense coil array 106.

Sense coils 105a, 105b, and 105n are shown in FIG. 1 as "circular" coils for purposes of illustration. However, in other implementation, the sense coils 105a, 105b, and 105n may have another coil topology e.g., a figure-eight-like (DD) topology (not shown herein). In further implementations, the sense coils 105a, 105b, and 105n may be of a mixed coil topology e.g., "circular" and DD. In yet other implementations, the sense coils 105a, 105b, and 105n as shown in FIG. 1 may represent other types of sense elements that may be used in the implementations described herein that may be configured to be used to detect changes in electrical characteristics to determine whether an object 110 is present.

In some implementations, the sense coils 105a, 105b and 105n are arranged in an array, such as a two-dimensional array as shown in FIG. 1. However, in other implementations the sense coils 105a, 105b and 105n are arranged in other configurations that do not conform to rows or columns (radial or interleaved), are at least partially overlapping or have irregular spacing, have different sizes, have different shapes (circular, hexagonal, etc.), or cover irregular detection areas, or any combination thereof. As such, the term "array" as used herein denotes a plurality of sense coils 105a, 105b, and 105n that are arranged over a predetermined area. Furthermore, the number (N) of sense coils 105a, 105b, and 105n and thus the number (N) of sense circuits 104a, 104b, and 104n can vary widely based on the application, including the total region in which the object 110 is to be detected and the smallest size of an object the system 100 is configured to detect. In an example implementation, the sense coil array 106 includes N=64 sense coils 105a, 105b, 105n.

Each of the plurality of sense circuits 104a, 104b, and 104n, including corresponding sense coils 105a, 105b, and 105n, are operably connected to a measurement and detection circuit 108. The measurement and detection circuit 108 is configured to measure one or more electrical characteristics at each of the plurality of sense circuits 104a, 104b, and 104n and process the measurements to output a signal indicative of whether presence of an object 110 is detected (and in some cases the location of the object 110 based on information about the particular sense coil 105a, 105b, or 105n at which the object 110 is detected). The measurement and detection circuit 108 may be configured to selectively apply a sense signal individually to each of the plurality of sense circuits 104a, 104b, and 104n (e.g., sequentially) to allow for measurement of changes in electrical characteristics at each of the plurality of sense circuits 104a, 104b, and 104n in response to the presence of the object 110. The measurement and detection circuit 108 further includes a measurement circuit configured to output a measurement value indicative of an electrical characteristic in each of the plurality of sense circuits 104a, 104b, and 104n.

The measurement and detection circuit 108 may include signal processing circuitry configured to process and filter the measurement output and determine whether an object 110 is potentially present (e.g., based on a time-differential approach). At least a portion of the measurement and detection circuit 108 may be implemented by one or more micro-controllers or processors. For example, at least a portion of the measurement and detection circuit 108 may be implemented as an application-specific integrated circuit (ASIC), a field programmable gate array (FPGA) device, digital signal processor (DSP), or another processor device.

The measurement and detection circuit 108 may be configured to receive information from each of the components of the object detection circuit 102 and perform calculations based on the received information. The measurement and detection circuit 108 may be configured to generate control signals for each of the components that may adjust the operation of that component. The measurement and detection circuit 108 may further include a memory (not shown) configured to store data, for example, such as instructions for causing the measurement and detection circuit 108 to perform particular functions, such as those related to object detection. As will be described further, for purposes of selectively driving each of the plurality of sense circuits 104a, 104b, and 104n and measuring the output of each of the plurality of sense circuits 104a, 104b, and 104n, further analog or other circuit components may be included in the measurement and detection circuit 108.

In an exemplary implementation, an object 110 is detected by applying a sinusoidal sense signal and measuring a change of an impedance at each sense circuit 104a, 104b, and 104n. While the description may refer to sinusoidal signals, it should be appreciated that any alternating voltage or alternating current may be applied and are contemplated by different implementations described herein. For example, the object detection circuit 102 may be configured to detect metallic objects (or other objects) that can cause changes in impedance at a sense circuit 104a, 104b, or 104n.

In an exemplary implementation, the measurement and detection circuit 108 is configured to cause each of the plurality of sense coils 105a, 105b, and 105n (e.g., sequentially) to generate an alternating magnetic field at an operating frequency. If a metallic object 110 is present in the alternating magnetic field, voltages induced due to the alternating magnetic field may cause eddy currents in the metallic object 110. According to Lentz' law, the eddy currents in the object 110 will generate another (secondary) magnetic field that interacts with the sense coils 105a, 105b, or 105n (e.g., a mutual coupling is developed) and the impedance is changed at the terminals of at least a portion of the plurality of sense coils 105a, 105b, and 105n and thus at the corresponding sense circuits 104a, 104b, or 104n. Other interactions such as electric field (capacitive) interactions or ferromagnetic interaction between an object 110 and the sense coils 105a, 105b, and 105n are also possible that cause impedance changes at the terminals of the sense coils 105a, 105b, or 105n.

In other implementations, an object 110 is detected by applying a sense signal different from a sinusoidal signal (single frequency) and by measuring a change in a response to that signal. In an exemplary implementation, the measurement and detection circuit 108 is configured to selectively (e.g., sequentially) excite each of the plurality of sense coils 105a, 105b, and 105n with a pulse suitable for measuring an impulse response and presence of an object is determined based on measuring a change in an impulse response in each of the plurality of sense circuits 104a, 104b, and 104n.

In another exemplary implementation, the measurement and detection circuit 108 is configured to selectively (e.g., sequentially) excite each of the plurality of sense coils 105a, 105b, and 105n with a multiple frequency (multi-tone) signal. The measurement and detection circuit 108 is configured to then determine a presence of an object based on a change in impedance measured in each of the plurality of sense circuits 104a, 104b, and 104n and for each frequency component individually.

In another exemplary implementation, the measurement and detection circuit 108 is configured to selectively (e.g., sequentially) excite each of the plurality of sense coils 105a, 105b, and 105n with another suitable waveform (e.g., a pseudo-noise signal). The measurement and detection circuit 108 is configured to then determine a presence of an object 110 based on a change in a response to that waveform measured in each of the plurality of sense circuits 104a, 104b, and 104n.

Many of the descriptions of the object detection circuit 102 herein contemplate a measurement and detection circuit 102 that is configured to detect changes in impedance at a single frequency and determine if the metallic object 110 is present in proximity to at least one of the sense coils 105a, 105b, and 105n. However, this should not exclude implementations using a measurement and detection circuit 102 that is configured to detect changes in one or more electrical characteristics using other sense signal waveforms to determine whether an object 110 is present.

Further, many of the descriptions of the object detection circuit 102 herein contemplate a measurement and detection circuit 102 that is also configured to support a passive beacon position finding technique e.g., for determining a displacement (misalignment) between a wireless power receive structure 260 (vehicle pad) and the wireless power transmit structure (base pad). However, the passive beacon position finding technique may not be in all implementations as described herein (e.g., some implementations of other features described herein may function and be applicable in the absence of positioning functionality). In an example implementation, the passive beacon transponder (e.g., passive beacon transponder 278 with reference to FIG. 2B) includes a coil and a passive impedance modulation circuit including an oscillator generating, e.g., a two-level (square wave) modulation signal. At least the coil of the passive beacon transponder may be integrated into the wireless power receive structure 260 as shown in FIG. 2B. In an example implementation, the passive beacon transponder is tuned for resonance near the operating (sense) frequency of the object detection circuit 102 each time the modulation signal (e.g., a square wave) is at the first (e.g., high) level. It is tuned off-resonance each time the modulation signal is at the second (e.g., low) level. In some implementations, modulation is performed at a frequency $f_{mod}$ in the kHz range (e.g., 5 kHz).

When the passive beacon transponder is activated and positioned over the sense coil array 106 with reference to FIG. 2B, it produces a time-varying (periodic) impedance change (e.g., a square wave response) in at least one of the plurality of sense coils 105a, 105b, 105n. This impedance change varies at the frequency $f_{mod}$ of the passive beacon modulation signal and is expected strongest in magnitude in the sense coil (e.g., sense coil 105n) that is located closest to the passive beacon coil (e.g., integrated into the wireless power receive structure 260). By measuring the impedances in each of the plurality of sense circuits 104a, 104b, 104n, extracting and evaluating the beacon responses, the object detection circuit 102 may determine a position of the passive beacon coil relative to the sense coil array 106 within a predetermined detection region. This position may be indicative of the displacement (misalignment) of the wireless power receive structure 260 with respect to the wireless power transmit structure 224.

In some aspect, the object detection circuit 102 may be configured to concurrently perform foreign object detection and passive beacon position finding. However, such concurrent operation may require passive beacon response cancellation in those signal processing paths used for foreign object detection as further described below.

Example Inductive Wireless Power Application for Object Detection

The object detection circuit 102 may be used in a variety of applications for detecting objects, such as metallic objects, within a predetermined detection region as previously defined. In one example inductive wireless power-transfer system, magnetic flux densities above a transmit coil (e.g., a primary coil) and below a receive coil (e.g., secondary coil) can be at relatively high levels to allow for sufficient power transfer (e.g., for a wireless electric vehicle charging (WEVC) system power may be transferred on the order of kilowatts, e.g., 3.3 kW, 11 kW, or at even higher levels). Metallic objects or other objects present in the magnetic field can experience undesirable induction heating based on interaction with the wireless power field. For this reason, the object detection circuit 102 may be integrated into an inductive wireless power-transfer system to detect metal objects or other objects that are affected by the magnetic field generated by the coils used for the wireless power transfer. Such detection may allow the wireless power-transfer system to respond appropriately (e.g., reduce or stop power transmission, alert a user, and the like).

Figure 2A:
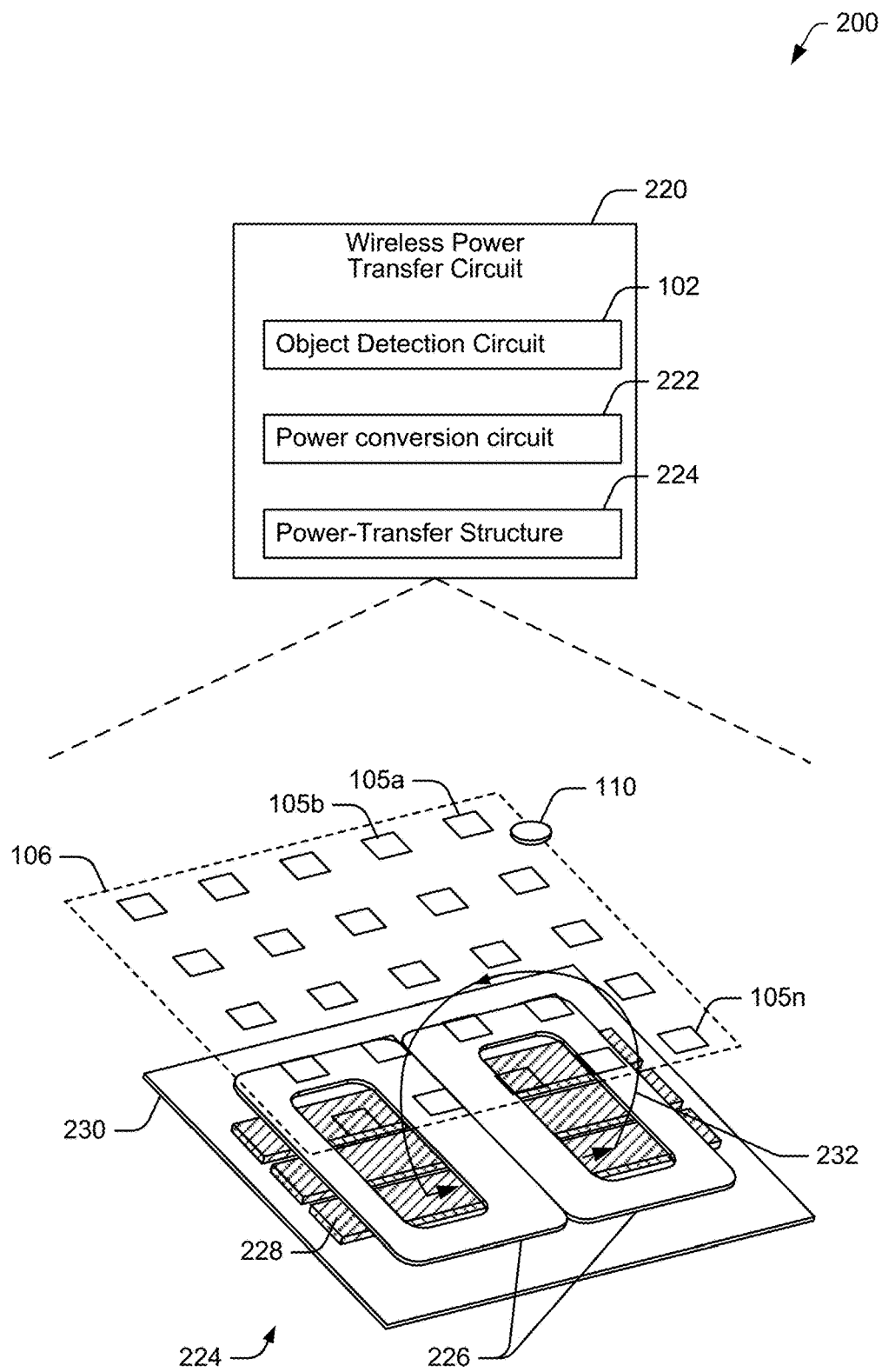
FIG. 2A illustrates an example implementation of a wireless power transfer apparatus including a wireless power transfer circuit with the object detection circuit of FIG. 1.
Figure 2B:
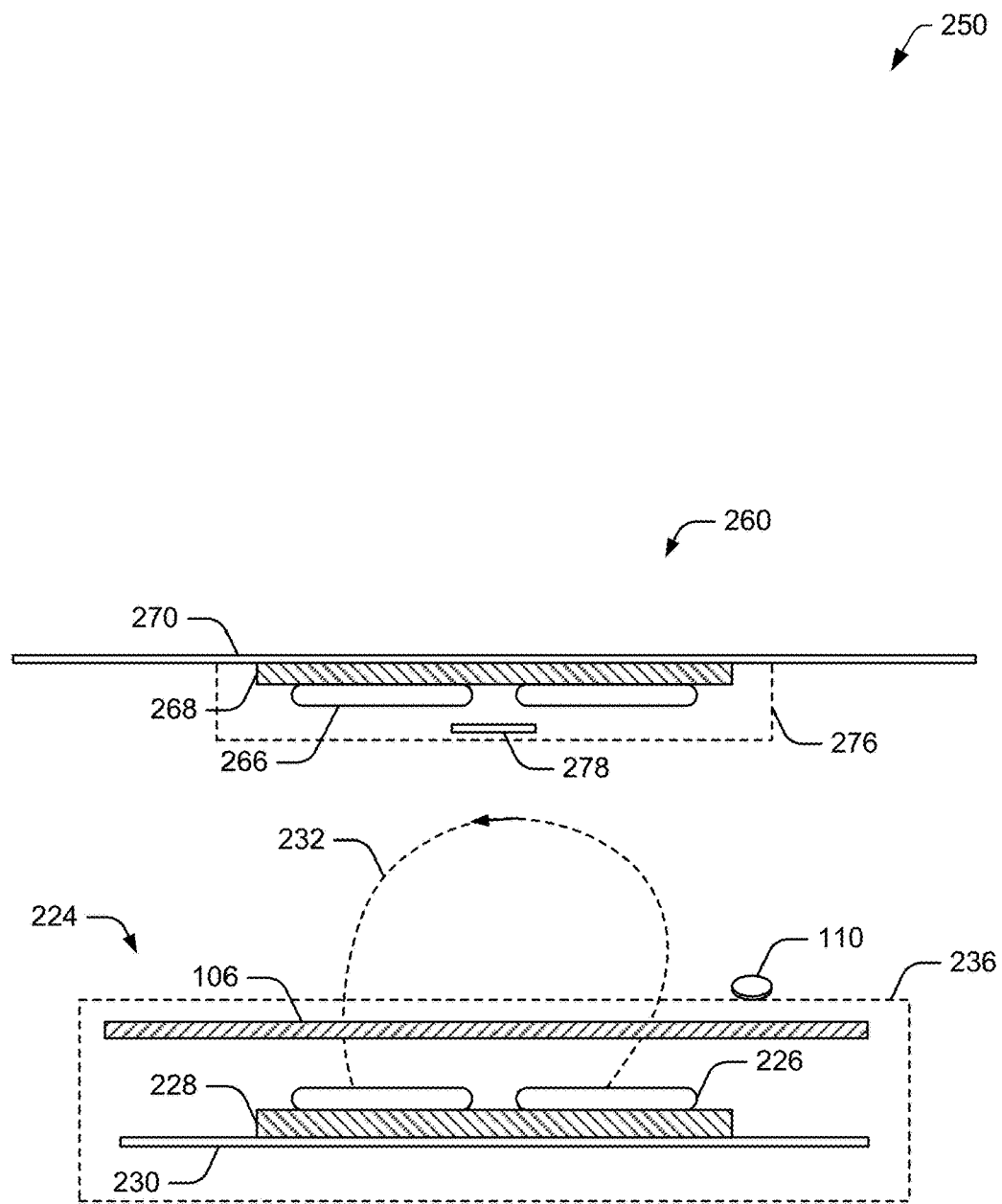
FIG. 2B illustrates a side view of a portion of a wireless power transfer apparatus including the object detection circuit of FIG. 1.

FIG. 2A illustrates an example implementation of a wireless power transfer system 200 including a wireless power transfer circuit 220 with the object detection circuit 102 of FIG. 1. The wireless power transfer circuit 220 may depict either a wireless power transmit circuit that generates a magnetic field 232 for transferring power or a wireless power receive circuit that can couple and receive power via the magnetic field 232. The wireless power transfer circuit 220 includes a power conversion circuit 222 and a power transmit structure 224. When the wireless power transfer circuit 220 is configured as a wireless power transmit circuit, the power conversion circuit 222 is configured to convert power from a power source (not shown) to a suitable operating frequency and form for wireless power transfer via the power transmit structure 224. It may be more likely that when integrated with an object detection circuit 102, the wireless power transfer circuit 220 is a wireless power transmit circuit, as power may be generally transferred from the ground or other upward facing surface where metallic objects may come to a rest. However, other implementations are possible, e.g., an object detection circuit 102 or a portion thereof may be also integrated with a wireless power receive circuit. When the wireless power transfer circuit 220 is configured as a wireless power receive circuit, the power conversion circuit 222 is configured to convert power received via the power transmit structure 224 into a suitable form (e.g., direct current (DC) with a suitable voltage and current level) for providing power to a load, such as a battery.

The power transmit structure 224 (also sometimes referred to as a "pad") is configured to wirelessly transmit or receive power. FIG. 2A illustrates one example of a power transmit structure 224 and how the sense coil array 106 of FIG. 1 may be integrated. The power transmit structure 224 includes a coil 226 configured to generate an alternating magnetic field when driven with a current by the power conversion circuit 222. The power transmit structure 224 may further include ferrite 228 configured to channel and/or provide a path for magnetic flux (e.g., may be arranged in one or more ferrite bars which can be a combination of ferrite tiles arranged to form the bars). The power transfer structure may also include a shield 230 (also sometimes referred to as a back plate). The shield 230 is configured to prevent the magnetic field 232 or associated electromagnetic emissions from extending beyond a boundary determined by the shield 230 or at least to attenuate the magnetic field 232 extending beyond that boundary. As an example, the shield 230 may be formed from aluminum.

In the illustrated example, the power transmit structure 224 includes a double-D (DD) coil topology, which includes two electrically conductive coils 226 disposed proximate to one another. The coils 226 are configured to generate a magnetic field 232 (indicated in FIG. 2A by a line of flux) by running alternating current through the coils 226. Generally, the current in the two center sections of the DD coil runs in the same direction. In this way, a high magnetic flux is generated in the center of the power transmit structure 224 and is channeled through the ferrite 228 and arches above the DD coil from one opening (magnetic pole area) to the other opening (magnetic pole area) of the DD coil 226 as indicated in FIG. 2A by the line of flux representing the magnetic field 232. Other coil topologies are also applicable to the techniques described herein, including a multi-coil topology (e.g., Bi-Polar, DD plus Circular) or just a single coil Circular or Solenoid topology.

The wireless power transfer circuit further includes an object detection circuit 102 that may include a plurality of sense circuits that may include a plurality of sense coils 105a, and 105n arranged in an array 106 (sense coil array 106) as illustrated in FIG. 2A. The plurality of sense coils 105a, 105b, 105n may be arranged in a substantially planar array to cover a predetermined area (e.g., at least the area covered by the coil 226 and ferrite 228). The size and the number of sense coils 105a, 105b, 105n may depend on the size of the wireless power coil 226 and/or ferrite 228 and also on the smallest size of an object 110 that is required to be detected by the object detection circuit 102. For example, if the minimum size of metallic object (e.g., object 110) required to be detected is the size of a coin or a paper clip, then the size of each sense coil 105a, 105b, 105n may be either on the order of this minimum size or within several (e.g., two or three) orders of magnitudes larger, assuming that those minimum size objects are located in close proximity of a plane defined by the array of sense coils 105a, 105b, 105n (e.g., on the top surface of the housing 236 of the base pad as shown later in FIG. 2B). As a mere illustrative example, the number of sense coils 105a, 105b, 105n could be on the order of 64 (e.g., 8×8 array) to be able to provide coverage of the entire predetermined area.

Further, the system shown in FIG. 2A may include a housing (not shown in FIG. 2A but shown later in FIG. 2B as housing 236) configured to house, for example at least the coil 226, the ferrite 228, the sense coil array 106, and potentially the shield 230. The housing may be made of any suitable material (e.g., hard plastic, ceramics etc.) and can be designed to provide structural support for example to support the weight of various objects such as vehicles that may pass over the housing. In some implementations, the housing may be made of a non-conductive material to avoid interfering or interacting with the magnetic field 232. The sense coil array 106, in one exemplary implementation, is positioned between the wireless power transfer coil 226 and the housing (with other intervening layers if desired) so that the sense coils 105a, 105n are positioned closer to objects that may rest on the surface of the housing and where magnetic field levels could be high during power transfer.

All or just a portion of the power conversion circuit 222 may also be housed in the housing. Although in some implementations the power conversion circuit 222 may be housed separately from the housing that houses the power transmit structure 224. In some cases, the power conversion circuit 222 is housed in the housing but is positioned on the other side of the shield 230 from the ferrite 228.

FIG. 2B illustrates a side view of a wireless power-transfer system 250 including portions of the wireless power transfer circuit 220 of FIG. 2A. FIG. 2B includes a wireless power transmit structure 224 (that may be a part of the wireless power transfer circuit 220 of FIG. 2A) and a wireless power receive structure 260. The wireless power transmit structure 224 includes a shield 230, a layer of ferrite 228 and a transmit coil 226. A housing 236 configured to house the transmit coil 226, ferrite 228, and shield 230 may be provided. In addition, the housing 236 is configured to house a sense coil array 106 as shown in FIG. 2A. In some implementations, the shield 230 may form a portion of the housing 236. The power conversion circuit 222 is not shown but may be electrically connected to the transmit coil 226 or a portion or all may also be housed in the housing 236.

The wireless power receive structure 260 includes a receive coil 266, a layer of ferrite 268, and a shield 270. In some implementations, the shield 270 may be formed from a portion of the apparatus that the ferrite 268 and receive coil 266 are affixed to (e.g., the metallic underbody of a vehicle if in a WEVC application). In this case, a housing 276 configured to house the receive coil 266 and ferrite 268 is provided but the housing 276 does not house the shield 270. However other implementations are possible where a shield 270 is included in the housing 276. A power conversion circuit 222 is not shown but may be electrically connected to the receive coil 266 or a portion or all may also be housed in the housing 276. In some implementations, the housing 276 is also configured to integrate a passive beacon transponder 278 (e.g., the passive beacon transponder coil) as illustrated in FIG. 2B.

The wireless power transmit structure 224 is configured to generate a magnetic field 232. The wireless power receive structure 260 is configured to inductively receive power via the magnetic field 232. Magnetic flux may be at a particular level (density) at the surface of the housing 236 (and in some cases, it may be somewhat higher at or in proximity to the surface of the housing 236 relative to surrounding areas as the surface of the housing 236 is closer to the coil 226). Furthermore, as the wireless power transmit structure 224 may be positioned on a ground or other top facing surface, an object 110 may come to rest of the surface of the housing 236. The object 110 may thereby be potentially exposed to high levels (density) of magnetic flux if power is being transferred. The object detection circuit 102 is configured to detect the object 110.

Object Detection Circuit

Figure 3:
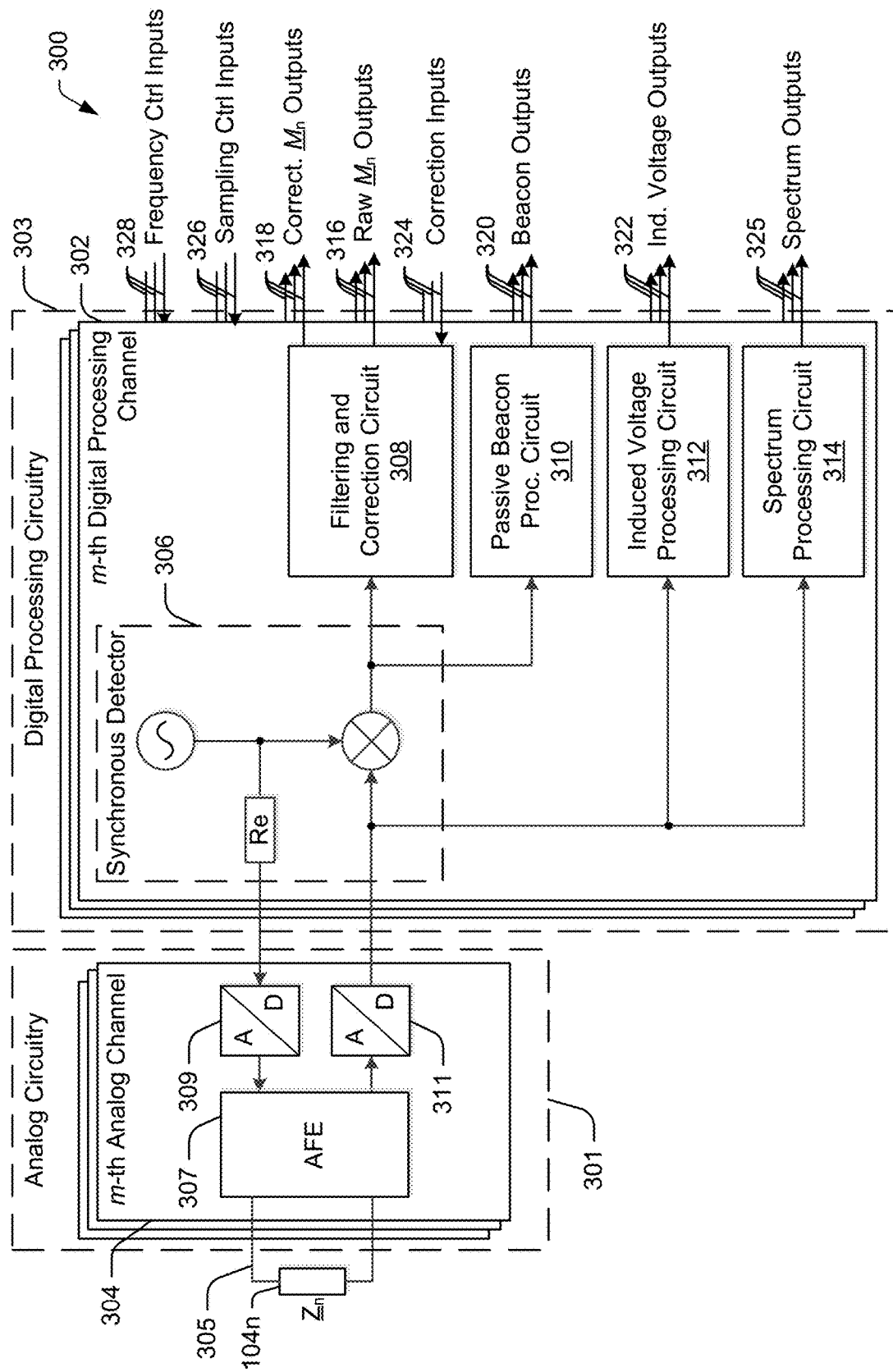
FIG. 3 is a block diagram illustrating an example implementation of a portion of the object detection circuit of FIG. 1 including analog circuitry and digital processing circuitry having various analog and digital processing channels, respectively.

FIG. 3 is a block diagram of a circuit 300 illustrating an example implementation of a portion of the object detection circuit 102 with reference to FIG. 1. More specifically, the circuit 300 is a portion of the measurement and detection circuit 108 shown in FIG. 1. The circuit 300 includes analog circuitry 301 electrically connected to digital processing circuitry 303. The block diagram of FIG. 3 illustrates an example implementation where the analog circuitry 301 and the digital processing circuitry 303 are subdivided into a plurality of analog channels 304 and a plurality of digital processing channels 302, respectively (illustrated in FIG. 3 by three boxes on top of each other).

The example implementation described herein includes the number $N_a$ of analog channels 304 equal to the number $N_d$ of digital processing channels 302 ($N_a=N_d$), meaning that there is a digital processing channel 302 dedicated to each of the plurality ($N_a$) of analog channels 304. In other implementations, there may be more analog channels 304 than digital processing channel 302 or vice versa. Further, the block diagram of FIG. 3 shows details of an example implementation of the m-th analog channel 304 and of the m-th digital processing channel 302. These details may apply to all other analog channels 304 (e.g., the (m−1)-th analog channel 304) and digital processing channels 302 (e.g., the (m−1)-th digital processing channel 302), respectively. Any suitable number $N_a$ (e.g., 4) of analog channels 304 and digital processing channels 302 may principally apply. However, in aspects, it may be desirable to choose the number $N_a$ to be a divisor (factor) of the number N of sense coils 105a, 105b, 105n constituting the sense coil array 106 with reference to FIG. 1. This allows the plurality of sense coils 105a, 105b, 105n to be subdivided into $N_a$ equal number groups (subsets), each subset including a number ($N/N_a$) of sense coils and each subset associated to a dedicated analog channel 304.

The analog channel 304 includes an analog front end (AFE) circuit 307, a digital-to-analog converter (DAC) 309 electrically connected to an input of the AFE circuit 307, and an analog-to-digital converter (ADC) 311 electrically connected to an output of the AFE circuit 307. The block diagram of FIG. 3 also shows the m-th analog channel 304 electrically connected to an impedance $Z_n$ representing (abstracting) the sense circuit 104n including sense coil 105n as described with reference to FIG. 1. The impedance $Z_n$ may correspond to the impedance as presented by the sense circuit 104n at the measurement port 305 indicated in FIG. 3. While only one sense circuit 104n is indicated in FIG. 3, this just illustrates the sense circuit that is temporarily connected (selected) for purposes of selectively (e.g., sequentially) measuring an electrical characteristic (e.g., an impedance, an admittance, a voltage, or a current) in each of the plurality of sense circuits 104a, 104b, 104n.

The example implementation described herein, assumes the plurality (N) of sense circuits 104a, 104b, 104n subdivided into a plurality ($N_a$) of subsets and an analog channel 304 dedicated to each subset as described above. Therefore, only sense circuits of the m-th subset can be selectively connected to the m-th analog channel 304. Likewise, only sense circuits of the (m−1)-th subset of sense circuits can be selectively connected to the (m−1)-th analog channel 304, etc. Moreover, the example implementation described herein assumes only one sense circuit (e.g., sense circuit 104a) of the m-th subset connected to the m-th analog channel at a time and only one sense circuit (e.g., sense circuit 104b) of the (m−1)-th subset connected to the (m−1)-th analog channel at a time. Therefore, in total, $N_a$ sense circuits of the plurality (N) of sense circuits 104a, 104b, 104n can be connected to the analog circuitry 301 at a time. Further, each of the plurality of analog channels 304 may provide switch circuitry (e.g., analog multiplexer circuitry) not shown in FIG. 3 to selectively (e.g., sequentially) connect each of a subset of sense circuits (e.g., sense circuits 104a, 104b, 104n) to the respective AFE circuit 307 for measuring an electrical characteristic.

For purposes of illustration, the control logic governing all analog and digital processing parts including sense circuit multiplexing (e.g., sense circuit addressing) is not shown in FIG. 3.

In one operational mode of the measurement and detection circuit 108, each of a subset of sense circuits 104a, 104b, 104n is sequentially connected to the AFE circuit 307 of the m-th analog channel 304 for the duration $T_m$ of a measurement interval e.g., in a round robin fashion. During a first measurement interval of duration $T_m$, the sense circuit 104a may be connected to the AFE circuit 307. During a second measurement interval of duration $T_m$, sense circuit 104b may be connected to the AFE circuit 307, etc. As previously stated, $N_a$ sense circuits, each from a different subset can be concurrently connected to the AFE circuit 307 of a respective (dedicated) analog channel 304 during a measurement interval of duration $T_m$.

In some implementations or operations, each of the plurality of sense circuits 104a, 104b, 104n, when connected, is operated at or near its resonance for measuring an electrical characteristic. In some implementations, the resonant frequencies (e.g., $f_{0,a}$, $f_{0,b}$, $f_{0,n}$) of the plurality of sense circuits 104a, 104b, 104n may generally differ either intentionally by design or unintentionally e.g., due to component tolerances and detuning effects of materials inside the wireless power transmit structure 224 with reference to FIG. 2A. Therefore, in some operational modes as previously described, the frequency of the sense signal that is selectively (e.g., sequentially) applied by an AFE circuit 307 to the plurality of sense circuit 104a, 104b, 104n may generally change from measurement interval to measurement interval. Therefore, the AFE circuit 307 may apply a sense signal with a frequency $f_a$ to the sense circuit 104a during a first measurement interval and a sense signal with a second frequency $f_b$ to the sense circuit 104b during a second consecutive measurement interval, etc. This is illustrated and described with reference to FIG. 8 in more detail.

Moreover, in an implementation using a plurality ($N_a$) of parallel analog channels 304 as previously discussed, the frequencies (e.g., $f_a$, $f_b$, $f_n$) of the set of sense signals that are concurrently applied to respective sense circuits (e.g., sense circuits 104a, 104b, 104n) e.g., during any measurement interval may be allocated as close as possible to the respective resonant frequencies (e.g., $f_{0,a}$, $f_{0,b}$, $f_{0,n}$), but distinct to prevent from mutual interference due to cross coupling between respective sense coils (e.g., sense coils 105a, 105b, 105n). Assuming a digital processing circuitry 303 providing narrowband filtering as discussed below, the minimum frequency separation to be respected when allocating frequencies for concurrently applied sense signals may be relatively small. Therefore, any of the plurality of sense circuits 104a, 104b, 104n can be operated close to its resonant frequency, even in those cases where the resonant frequency of two or more sense circuits are equal by chance.

Figure 8:
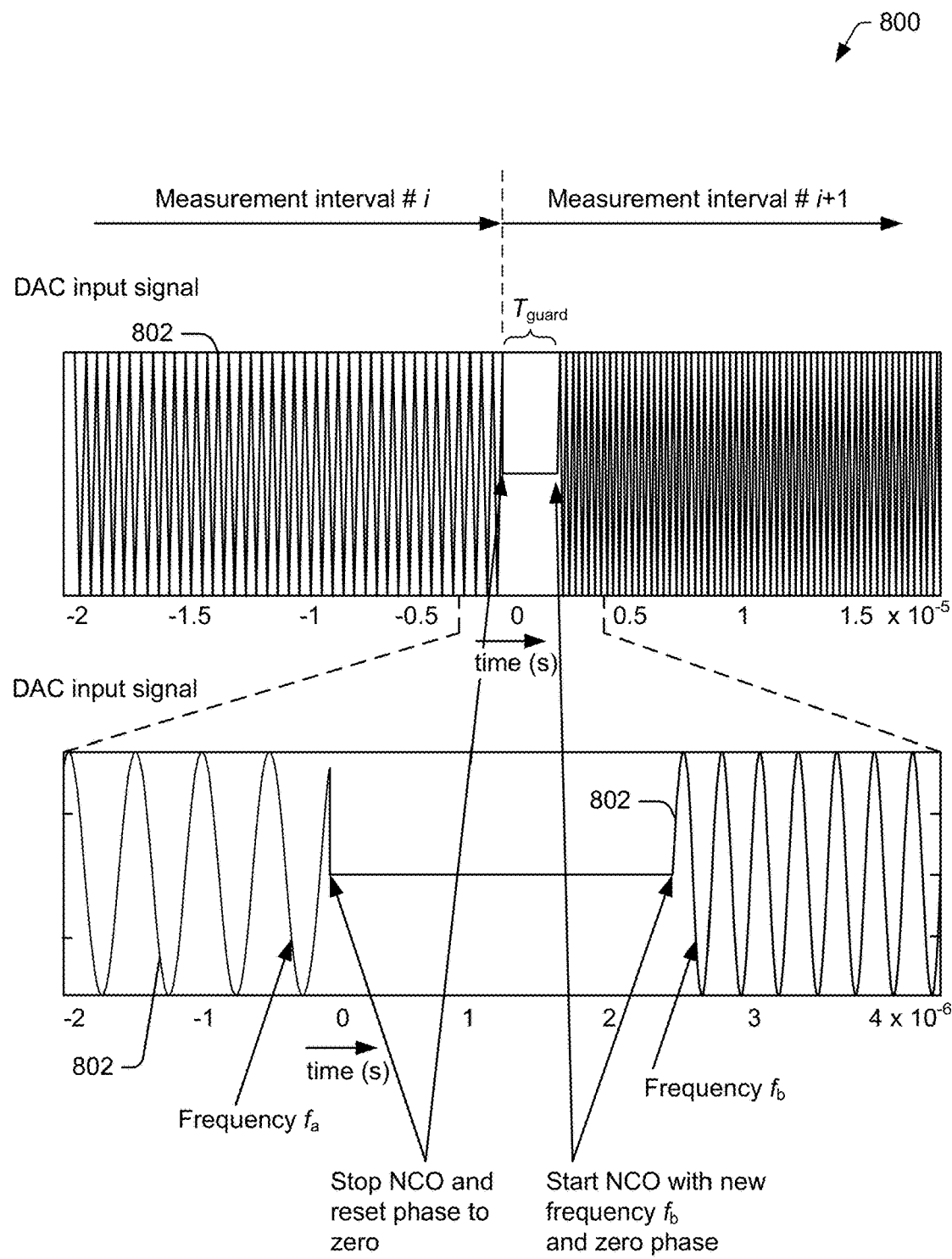
FIG. 8 shows a time diagram illustrating an example oscillator output signal in a transition between two consecutive measurement intervals where the oscillator's frequency is changed and its phase is reset.

In an implementation of a circuit 300 based on both a time-multiplexed and parallel processing approach as described above, the total number N of sense circuits 104a, 104b, 104n, the number $N_a$ (divisor of N) of analog channels 304, and the duration $T_m$ of a measurement interval determine the time required to scan the plurality of sense circuits 104a, 104b, 104n. This time is also referred to herein as the scan cycle period. Increasing a number $N_a$ of parallel analog channels 304 may reduce the scan cycle period and thus an object detection latency. The descriptions herein assume no extra time (e.g., guard time) between consecutive measurement intervals. Some guard time e.g., for sense circuit switching may be included in each measurement interval as illustrated in FIG. 8. Furthermore, the implementation assumes a digital processing circuitry 303 providing enough processing power to process the data acquired in a preceding (e.g., i-th) measurement interval within the following (e.g., (i+1)-th) measurement interval (pipeline processing).

In some implementations, each AFE circuit 307 uses a current source selectively (e.g., sequentially) applied to each of a subset of sense circuits 104a, 104b, 104n and a voltage is measured at the measurement port 305 of each analog channel 304. This technique may be referred to as the current source voltage measurement technique. In other implementations, each AFE circuit 307 uses a voltage source selectively (e.g., sequentially) applied to each of a subset of sense circuits 104a, 104b, 104n and a current is measured at the measurement port 305 of each analog channel 304. This technique may be referred to as the voltage source current measurement technique.

In the current source voltage measurement technique, the measured voltage may be indicative of (e.g., proportional to) the complex impedance, which allows the complex impedance to be calculated directly from the measured voltage. However, in the voltage source current measurement approach, the measured current may be indicative of (e.g., proportional to) the complex admittance. For certain sense circuit topologies e.g., series-tuned sense circuits, dealing with impedance may be advantageous by reasons not further discussed herein. Therefore, in some implementations using the voltage source current measurement technique, measured current is inverted (reciprocal value) to calculate the complex impedance as further described in connection with FIG. 9. Regardless of the measurement technique and whether measurement values are indicative of an impedance or admittance, the complex measurement value associated to the sense circuit 104n is generally denoted herein by $\underline{M}_n$. In the following descriptions, if not otherwise stated, the index n is occasionally used by example and may refer to any of the plurality of sense circuits 104a, 104b, 104n. Complex measurement values $\underline{M}_n$ may be also referred to herein as $\underline{M}_n$ samples.

In some implementations of the digital processing circuitry 303, the plurality of digital processing channels 302 is implemented as multiple instantiations. Each of the plurality of digital processing channels 302 includes various processing paths providing multiple digital outputs for purposes as explained below with reference to FIGS. 5 to 18. Further, each digital processing channel 302 includes a synchronous detector circuit 306 configured to provide unfiltered $\underline{M}_n$ outputs, a filtering and correction circuit 308 configured to receive correction inputs 324 that may correspond to correction outputs 1812 with reference to FIG. 18 and to provide filtered and corrected $\underline{M}_n$ outputs 318 (corrected $\underline{M}_n$ outputs) as well as filtered raw $\underline{M}_n$ outputs 316 (raw $\underline{M}_n$ outputs). For implementations that incorporate passive beacon positioning, each digital processing channel 302 includes a passive beacon processing circuit 310 configured to provide beacon outputs 320. In addition, each digital processing channel 302 includes an induced voltage processing circuit 312 configured to provide induced voltage outputs 322 and a spectrum processing circuit 314 configured to provide spectrum outputs 325. Further detail on these components is discussed below.

If not otherwise stated, the reference numbers indicated at inputs or outputs of any circuits or blocks shown in FIGS. 3 to 18 refer to the signals (or digital samples) that may be present at these input or output ports rather than to the ports itself. Depending on the implementation (hardware or software), the input and output ports may be physical (electrical) ports or just logical ports.

Moreover, each of the plurality of digital processing channels 302 is configured to receive various inputs such as sampling control inputs 326 and frequency control inputs 328 as needed to control each of the analog channels 304 and each of the digital processing channels 302. The plurality of sampling control inputs 326 and frequency control inputs 328 may correspond to the plurality of sampling control outputs 510 with reference to FIGS. 5 and 10 and the plurality of frequency control outputs 1810 (with reference to FIG. 18, respectively. In some implementations, the plurality of sampling control inputs 326 received during the i-th measurement interval include the ID number (e.g., address) of each of the sense circuits 104a, 104b, 104b to be concurrently connected to the respective AFE circuit 307 during the (i+1)-th measurement interval. Therefore, inputs 326 may be used by the circuit 300 to control the sense circuit switching (e.g., analog multiplexing) circuitry (not shown herein) in each of the analog channels 304. Analogously, the plurality of frequency control inputs 328 received during the i-th measurement interval include the frequencies (e.g., $f_a$, $f_b$, $f_n$) of the plurality of sense signals to be applied to respective sense circuits (e.g., 104a, 104b, 104n) concurrently connected to the respective AFE circuit 307 during the (i+1)-th measurement interval.

The example operations described with reference to the circuit 300 of FIG. 3 include a fast and a slow sampling mode, though the circuit 300 may principally support more and other sampling modes as dictated by the sampling mode controller circuit 502 (with reference to FIGS. 5 and 10) via sampling control inputs 326. The operation in an example fast sampling mode and in an example slow sampling mode are described in more detail below.

When operated in the example fast sampling mode, each sense circuit of a subset of sense circuits 104a, 104b, 104n is selectively (e.g., sequentially) connected to the m-th analog channel 304 for the duration $T_m$ of a measurement interval in a round robin fashion. During a first measurement interval, sense circuit 104a may be connected to the m-th analog channel 304. During a second measurement interval, sense circuit 104b may be connected to the m-th analog channel 304, etc. The same process may apply to the other parallel analog channels 304 (e.g., the (m−1)-th analog channel 304). Moreover, each of the processing circuits 308, 310, 312, and 314 in each of the plurality of parallel digital processing channels 302 may deliver a new output after every measurement interval with some latency due to the processing time. Otherwise stated, outputs of the digital processing circuitry 303 may be updated with a period equal to the duration $T_m$ of a measurement interval.

In some implementations or operations, certain processing circuits (e.g., the spectrum processing circuit 314) may deliver a new output (e.g., output 325) with a period larger than a measurement interval (e.g., once per scan cycle). When operated in the fast sampling mode, the plurality of outputs (e.g., outputs 318, 316, 320, 322, 325) delivered by the m-th digital processing channel 302 after the first measurement interval may refer to sense circuit 104a. The plurality of outputs delivered by the m-th digital processing channel 302 after the second measurement interval may refer to sense circuit 104b, etc. The plurality of outputs delivered by the m-th digital processing channel 302 after the $((N/N_a)+1)$-th measurement interval, which may be counted again as the first measurement interval of a following scan cycle, may refer again to the sense circuit 104a. Therefore, the product of the integer number $N/N_a$ and the duration $T_m$ of a measurement interval define the scan cycle period of the object detection circuit 102 in the fast sampling mode.

When operated in the fast sampling mode, consecutive outputs of the m-th digital processing channel 302 may be considered as a serial stream output of samples, each output sample referring to a respective sense circuit of the respective subset of sense circuits. For example, consecutive outputs 318 (corrected $\underline{M}_n$ samples) of the m-th digital processing channel 302 may be the repetitive sequence of samples $\underline{M}_1, \underline{M}_2, \ldots, \underline{M}_n, \ldots, \underline{M}_{N/Na}, \underline{M}_1, \underline{M}_2, \ldots$, with $\underline{M}_1$ referring to sense circuit 104a, $\underline{M}_2$ referring to sense circuit 104b, etc., $\underline{M}_n$ referring to sense circuit 104n, etc. of the m-th subset $(N_a)$ of sense circuits 104a, 104b, 104n. The plurality of outputs 318 (corrected $\underline{M}_n$ samples) as delivered by the plurality $(N_a)$ of digital processing channels 302 per scan cycle in the fast sampling mode may be combined to the repetitive complete sequence of samples $\underline{M}_1, \underline{M}_2, \ldots, \underline{M}_n, \ldots, \underline{M}_N, \underline{M}_1, \underline{M}_2, \ldots$, with $\underline{M}_1$ referring to sense circuit 104a, $\underline{M}_2$ referring to sense circuit 104b, etc., $\underline{M}_n$ referring to sense circuit 104n, etc. of the plurality (N) of sense circuits 104a, 104b, 104n.

When operated in the slow sampling mode, each sense circuit of the m-th subset of sense circuits 104a, 104b, 104n is selectively (e.g., sequentially) and repeatedly connected to the m-th analog channel 304 for the duration of $N_s$ consecutive measurement intervals $(N_s \cdot T_m)$ in a round robin fashion. Any suitable number $N_s$ (referred to herein as the number of repetitions) may apply (e.g., $N_s=10$). During a first series of $N_s$ measurement intervals, sense circuit 104a may be connected to the m-th analog channel 304 and the outputs 318, 316, 320, 322, 325 delivered by the m-th digital processing channel 302 after each measurement interval may refer to the sense circuit 104a. During a second series of $N_s$ measurement intervals, sense circuit 104b may be connected to the m-th analog channel 304 and the outputs 318, 316, 320, 322, 325 delivered by the m-th digital processing channel 302 after each measurement interval may refer to the sense circuit 104b, etc.

The same process may apply to the other analog channels 304 (e.g., the (m−1)-th analog channel) and corresponding digital processing channels 302. Therefore, the product of the integer number $N/N_a$, the repetition number $N_s$, and the duration $T_m$ of a measurement interval define the scan cycle period of the object detection circuit 102 in the slow sampling mode. When operated in the slow sampling mode, consecutive outputs of the m-th digital processing channel 302 may be considered as a serial stream output of samples, each group $(N_s)$ of output samples referring to a respective sense circuit of the respective subset of sense circuits. For example, consecutive outputs 318 (corrected $\underline{M}_n$ samples) of the m-th digital processing channel 302 may be a repetitive sequence of samples $\underline{M}_1, \underline{M}_1, \underline{M}_1, \ldots, \underline{M}_2, \underline{M}_2, \underline{M}_2, \ldots, \underline{M}_n, \underline{M}_n, \underline{M}_n, \ldots, \underline{M}_{N/Na}, \underline{M}_{N/Na}, \underline{M}_{N/Na}, \ldots, \underline{M}_1, \underline{M}_1, \underline{M}_1, \ldots, \underline{M}_2, \underline{M}_2, \underline{M}_2, \ldots$, with $\underline{M}_1$ referring to sense circuit 104a, $\underline{M}_2$ referring to sense circuit 104b, etc., $\underline{M}_n$ referring to sense circuit 104n, etc. of the m-th subset $(N_a)$ of sense circuits 104a, 104b, 104n. The plurality of outputs 318 (corrected $\underline{M}_n$ samples) as delivered by the plurality $(N_a)$ of digital processing channels 302 per scan cycle in the slow sampling mode may be combined to the repetitive complete sequence of samples $\underline{M}_1, \underline{M}_1, \underline{M}_1, \ldots, \underline{M}_2, \underline{M}_2, \underline{M}_2, \ldots, \underline{M}_n, \underline{M}_n, \underline{M}_n, \ldots, \underline{M}_N, \underline{M}_N, \underline{M}_N, \ldots, \underline{M}_1, \underline{M}_1, \underline{M}_1, \ldots, \underline{M}_2, \underline{M}_2, \underline{M}_2, \ldots$, with $\underline{M}_1$ referring to sense circuit 104a, $\underline{M}_2$ referring to sense circuit 104b, $\underline{M}_n$ referring to sense circuit 104n, etc. of the plurality (N) of sense circuits 104a, 104b, 104n.

Figure 4:
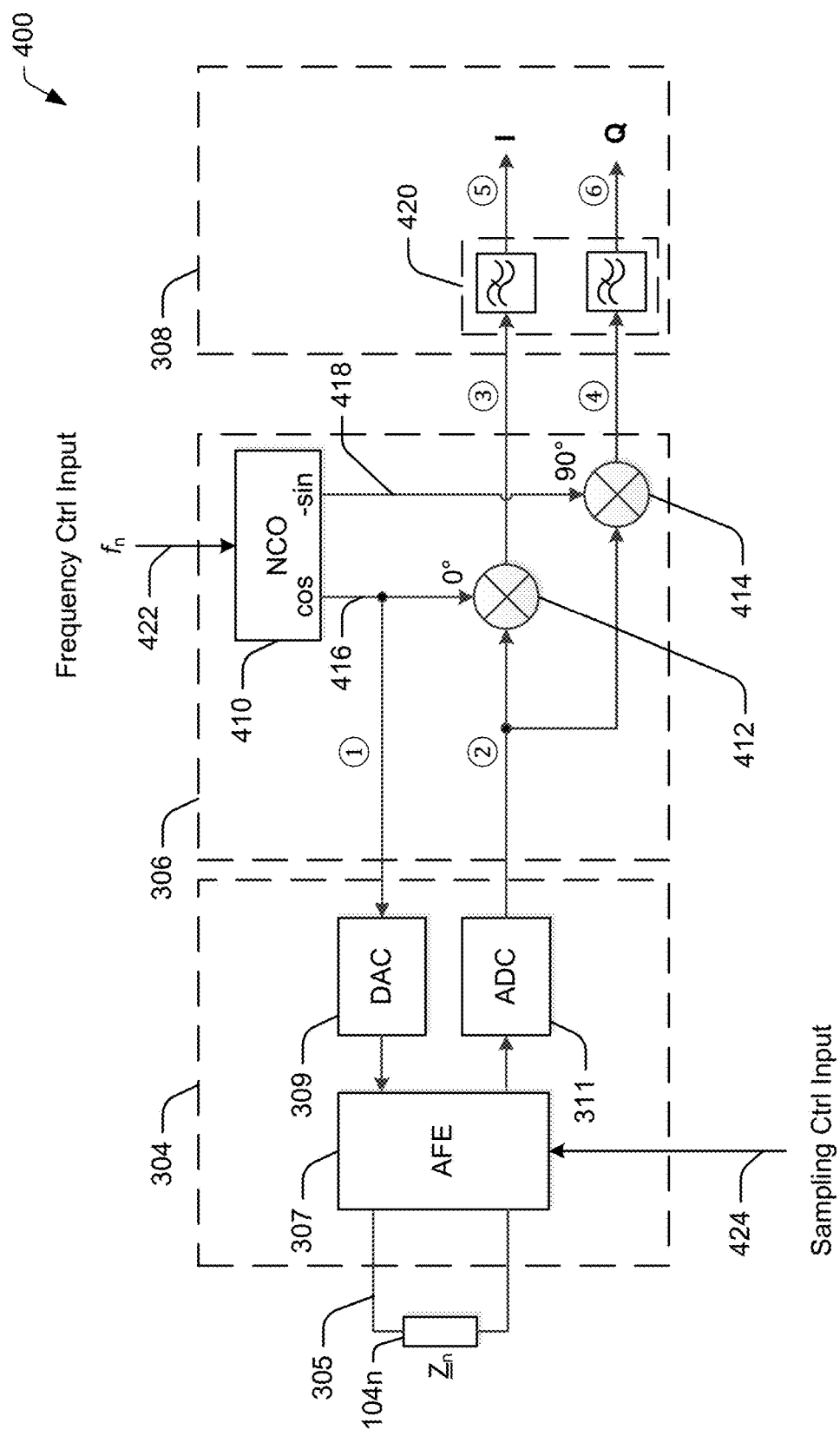
FIG. 4 is a block diagram illustrating an example implementation of a portion of the circuit of FIG. 3 including analog circuitry and digital processing circuitry in more detail.

FIG. 4 is a block diagram of a circuit 400 illustrating an example implementation of a portion of the circuit 300 of FIG. 3 in more detail. The circuit 400 includes the analog channel 304 (e.g., the m-th analog channel), the synchronous detector circuit 306, and a portion of the filtering and correction circuit 308 as part of the digital processing channel 302 with reference to FIG. 3. FIG. 4 shows, by example, the sense circuit 104n (represented by its impedance $\underline{Z}_n$ as previously discussed with reference to FIG. 3) electrically connected to the AFE circuit 307. As illustrated in FIG. 4, the AFE circuit 307 is configured to receive sampling control inputs 424, which may correspond to one of the plurality of sampling control inputs 326 with reference to FIG. 3, used to control sense circuit switching (e.g., analog multiplexing) as previously discussed with reference to FIG. 3.

The synchronous detector circuit 306 interfaces, via DAC 309 and ADC 311, to the AFE circuit 307. A digital continuous wave (sinusoidal) high frequency sense signal with frequency $f_n$ (e.g., in the MHz range) as needed to drive the sense circuit 104n is generated by an oscillator, such as numerically controlled oscillator (NCO) 410, and supplied to the DAC 309, to a first mixer 412, and to a second mixer 414 of the synchronous detector circuit 306. The NCO 410 is configured to receive frequency control inputs 422, which may correspond to one of the frequency control inputs 328 with reference to FIG. 3, and to generate two digital output signals, e.g., a first NCO output signal 416 and a second NCO output signal 418 with a frequency based on the frequency control input 422. The NCO output frequency defines the operating (sense) frequency (e.g., $f_n$) used to measure an impedance (or admittance) of a sense circuit (e.g., sense circuit 104n). The first NCO output 416 is a digital cosine signal with a frequency (e.g., $f_n$), which is used as a local oscillator signal for the mixer 412 and to the DAC 309 (indicated in FIG. 4 by input ①). The second NCO output 418 is an inverted digital sine signal of the same frequency (e.g., $f_n$), which is used as a local oscillator signal for the mixer 414.

The DAC 309 converts the first NCO digital output signal 416 to an analog signal that is fed into the AFE circuit 307 to drive the selected sense circuit (e.g., sense circuit 104n)

at a frequency (e.g., $f_n$). The analog voltage (or current) signal at the measurement port 305 is processed (e.g., amplified) by the AFE circuit 307 and fed to the ADC 311. The ADC 311 converts the analog signal received from the AFE 406 to a digital signal (indicated in FIG. 4 by output ②) that is fed into mixers 412 and 414. The ADC 311 output (output ②) is a digital representation of a generally phase and amplitude modified and noisy version of the DAC 309 output signal (the original).

The synchronous detector circuit 306 is configured to convert the digital signal received from ADC 311 (output ②) down to digital base band to be further processed in the filtering and correction circuit 308. Each of the digital outputs of mixers 412 and 414 (indicated in FIG. 4 by output ③ and ④, respectively) may contain a static component that may be indicative for an impedance (or admittance) as presented by the connected sense circuit (e.g., sense circuit 104n). The low pass filters 420 as part of the filtering and correction circuit 308 are configured to filter the static component, yielding an in-phase (I) and a quadrature (Q) output (indicated in FIG. 4 by output ⑤ and ⑥, respectively) also referred to herein as the raw $\underline{M}_n$ output. The cut-off frequency of the low pass filters 420 defines the measurement bandwidth of the measurement and detection circuit 108. A measurement bandwidth of 200 Hz may require a low pass filter with a cut-off frequency at 100 Hz.

The entire synchronous detector circuit 306 and the associated ADC 311 and DAC 309 may run on a common clock (e.g., 50 MHz). Therefore, each digital output 416 as generated by the NCO 410 may produce a corresponding voltage level at the analog output of the DAC 309. Similarly, ADC 311 and mixers 412 and 414 may output samples at the same rate (e.g., 50 MS/s). The output frequency of an NCO may be formally expressed as $$f_{out} = \frac{FCW \cdot f_{CLK}}{2^L} \qquad \text{Equation 1}$$

where FCW refers to the frequency control word (phase increment) that controls the NCO output frequency, fax to the NCO clock frequency in Hz, and L to the binary word length (number of bits) of the phase accumulator. In an example implementation, an NCO output frequency of 3 MHz is produced with a clock frequency of 50 MHz, an accumulator size L of 16 bits, requiring the frequency control word FCW to be set to 3932. In some implementations, the frequency control input 328 includes the frequency control word FCW.

Returning to FIG. 3, the passive beacon processing circuit 310 is configured to detect a passive beacon transponder 278 installed on an electric vehicle (e.g., integrated into housing 276 of the wireless power receive structure 260 as shown in FIG. 2B). If the passive beacon transponder 278 is positioned over the sense coil array 106, the passive beacon transponder 278 may produce a modulated impedance change (passive beacon response) in at least one of the plurality of sense coils 105a, 105b, 105n as previously discussed. Based on information of the sense coils associated with the passive beacon response, the object detection circuit 102 may determine a position of the passive beacon transponder 278 with respect to the sense coil array 106. The passive beacon transponder 278 can be distinguished from other responses (e.g., produced by object 110) by its modulation with a defined frequency. Therefore, in some implementations, the passive beacon processing circuit 310 is configured to demodulate and filter the passive beacon response and to provide static beacon outputs 320 (e.g., I/Q outputs) that may be used for position finding but also for the beacon cancellation as further discussed with reference to FIG. 9.

The input of the induced voltage processing circuit 312 is directly connected to the ADC 311 and configured to detect signal components in the voltage induced into a selected sense coil (e.g., sense coil 105n) at any frequency e.g., at a frequency other than any of the sense frequencies (e.g., $f_a$, $f_b$, $f_n$) used for measuring an impedance (or admittance). In some implementations, the induced voltage processing circuit 312 can be tuned to any desired frequency in a range limited by the analog channel 304 and to provide induced voltage outputs 322 (e.g., I/Q outputs) indicative of the magnitude and phase of the induced voltage in a narrow bandwidth at the desired frequency. In some implementations, the induced voltage processing circuit 312 (details not shown herein) may include full synchronous detector and low pass filter circuitry similarly to the synchronous detector circuit 306 and low pass filters 420, respectively, as shown in FIG. 4. In some implementations or operations, the induced voltage processing circuit 312 is tuned to the operating frequency (fundamental) of the wireless power transfer (e.g., 85 kHz) to provide outputs 322 indicative of the voltage induced by the wireless power transfer. This information is used e.g., in the sampling mode controller circuit 502 with reference to FIGS. 5 and 10 to determine whether wireless power transfer is active or inactive and consequently to control the sampling mode as further discussed below with reference to FIG. 10.

The spectrum processing circuit 314 is configured to analyze the spectrum of the noise induced into the selected sense coil (e.g., sense coil 105n) in a predetermined frequency range (e.g., 2.5-3.5 MHz) and to provide spectrum outputs 325. Spectrum outputs 325 may be used by the frequency allocation circuit 1800 with reference to FIG. 18 to determine an optimum sense frequency (e.g., $f_n$) with minimum noise level maximizing signal-to-noise ratio (SNR) for each of the plurality of sense circuits 104a, 104b, 104n.

Figure 5:
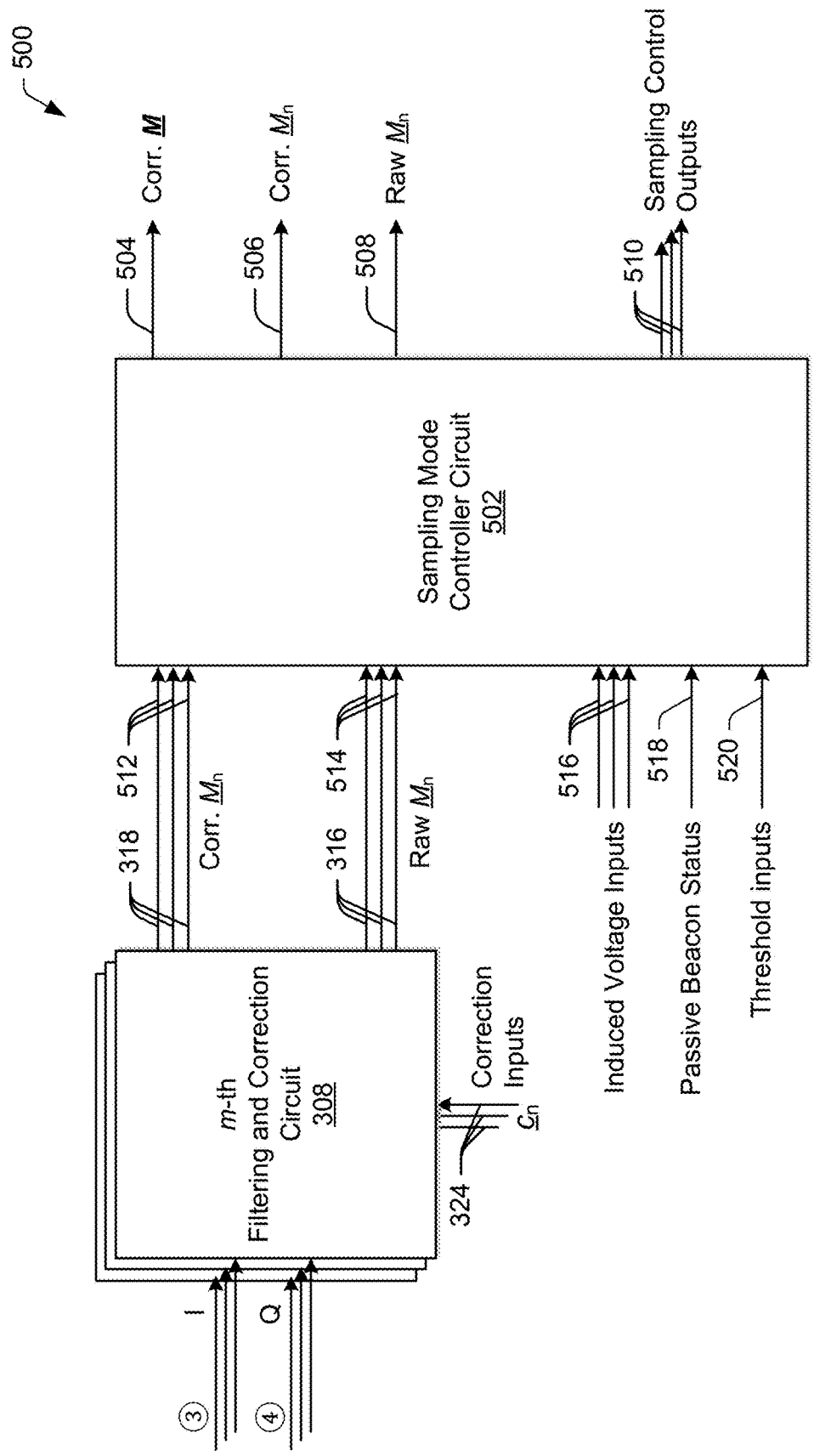
FIG. 5 illustrates, for purposes of overview, an example implementation of a portion of the circuit of FIG. 3 including a filtering and correction circuit and a sampling mode controller circuit.
Figure 9:
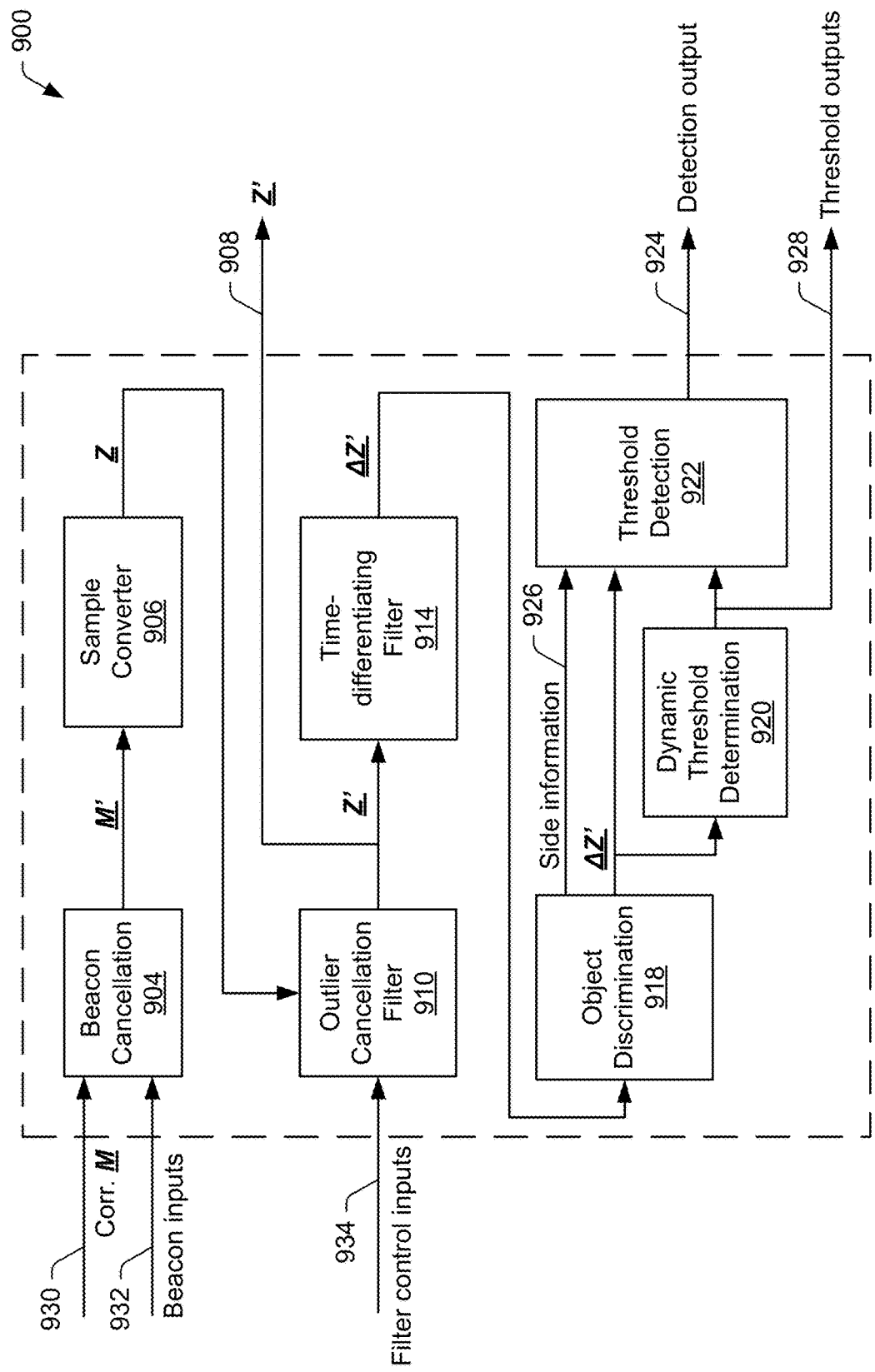
FIG. 9 is a block diagram illustrating an example implementation of another portion of the digital processing circuitry shown in FIG. 3.
Figure 10:
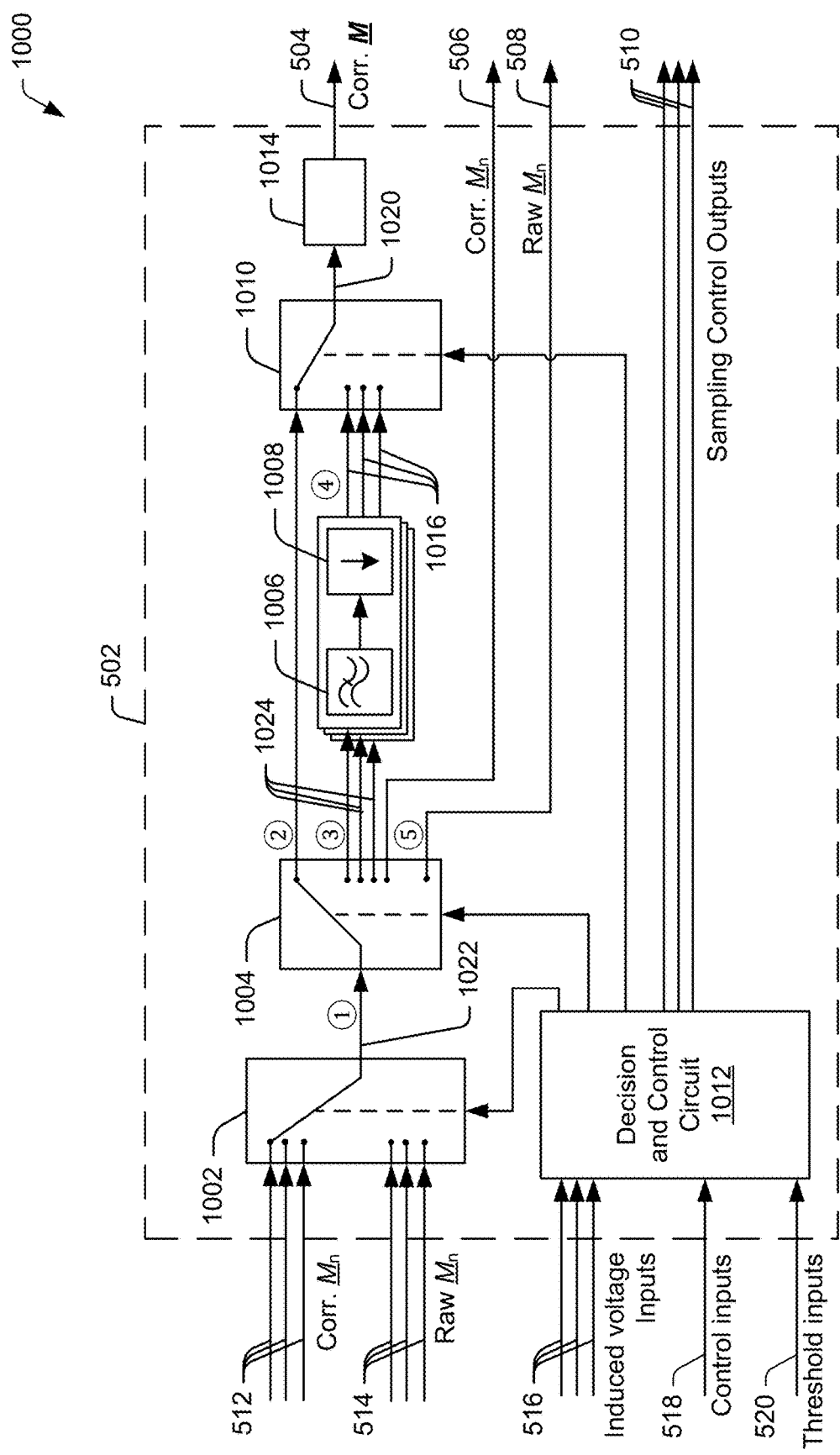
FIG. 10 is a block diagram illustrating an example implementation of the sampling mode controller circuit of FIG. 5.
Figure 12:
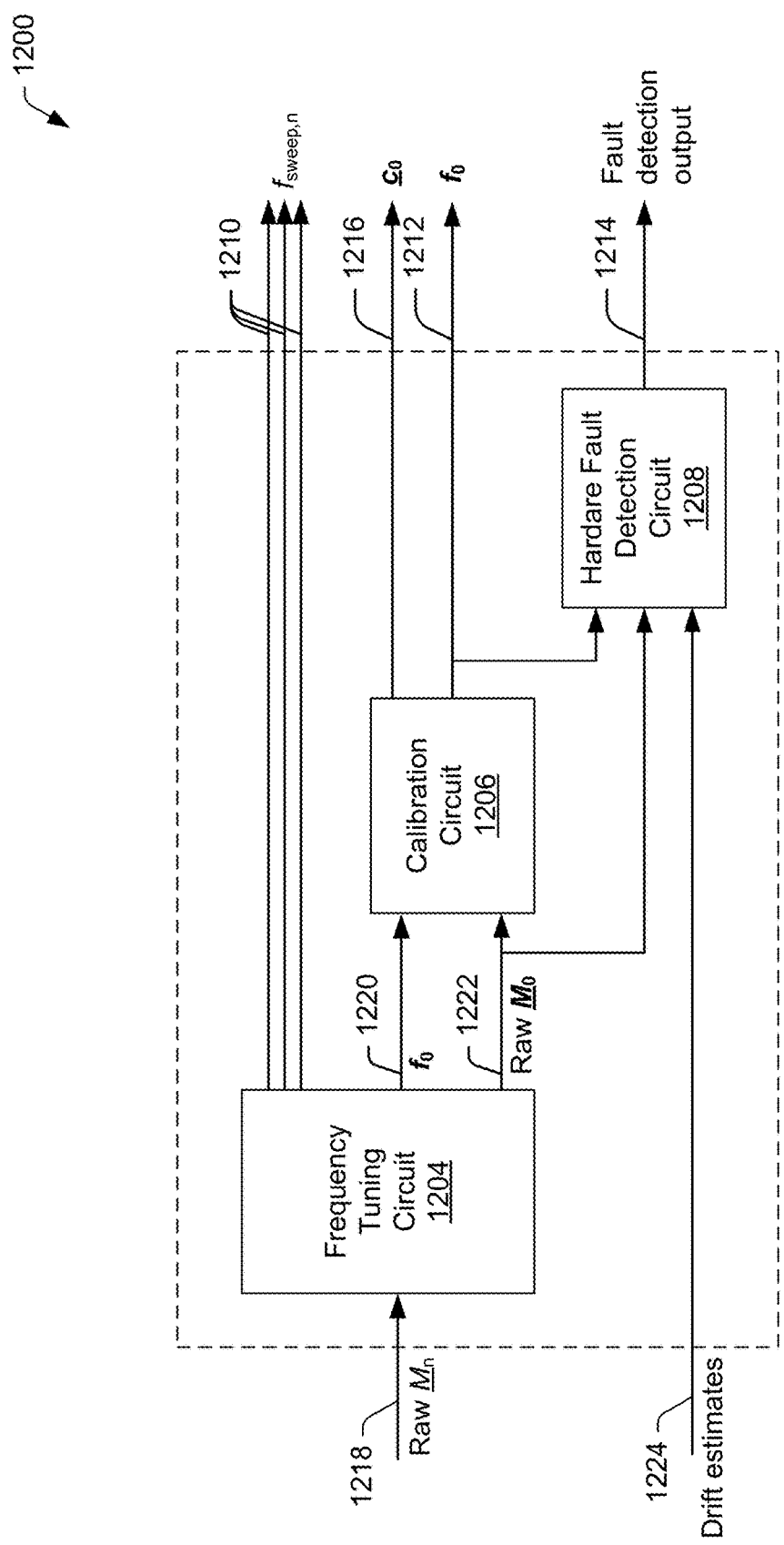
FIG. 12 is a block diagram illustrating an example implementation of a resonance frequency tuning and calibration circuit that is a portion of the object detection circuit of FIG. 1.
Figure 13:
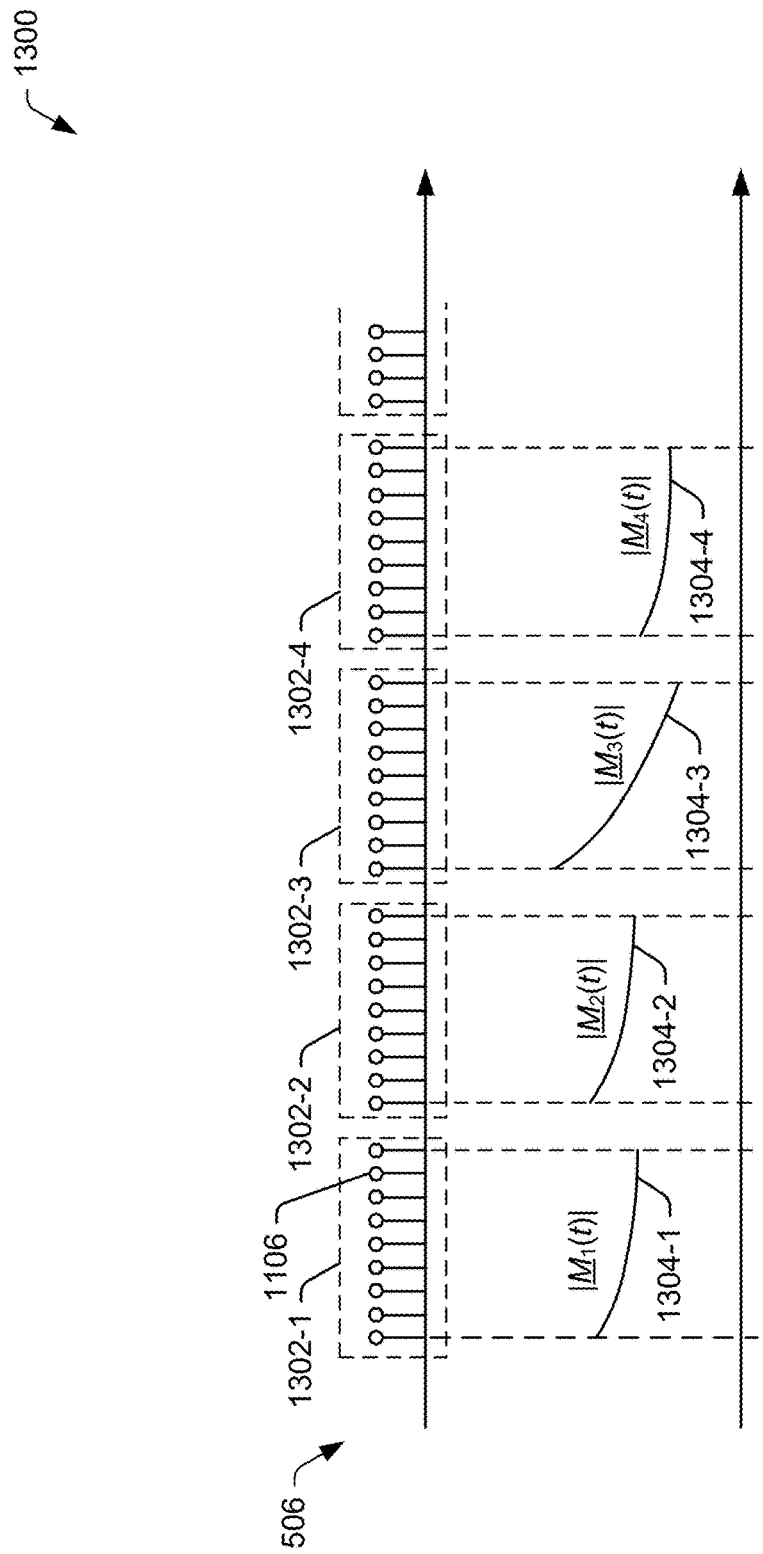
FIG. 13 shows various time diagrams illustrating drift in consecutive measurement outputs e.g., due to temperature changes.

With reference to FIG. 3, the serial stream outputs 318 (corrected $\underline{M}_n$ outputs) of the plurality of filtering and correction circuits 308 are used by the sampling mode controller circuit 502 with reference to FIGS. 5 and 10 and eventually for purposes of object detection with reference to FIG. 9 and drift estimation with reference to FIG. 13, while serial stream outputs 316 (raw $\underline{M}_n$ outputs) are used for purposes of resonance frequency tracking, calibration, hardware fault detection with reference to FIG. 12. Beacon outputs 320 of the plurality of passive beacon processing circuits 310 are used for position finding by a circuit not shown herein and for beacon cancellation in the circuit 900 with reference to FIG. 9. Induced voltage outputs 322 provided by the plurality of induced voltage processing circuits 312 are used e.g., to determine if wireless power transfer is active or inactive. This information may be needed by the sampling mode controller circuit 502 as discussed in connection to FIGS. 5 and 10. Spectrum outputs 325 provided by the plurality of spectrum processing circuits 314 are used e.g., to select an optimum sense frequency $f_n$ maximizing SNR individually for each of the plurality of sense circuits 104a, 104b, 104n as further discussed in connection with FIG. 18.

FIG. 5 illustrates, for purposes of overview, a circuit 500 that is a portion of the measurement and detection circuit 108 of FIG. 1. The circuit 500 includes a plurality ($N_a$) of filtering and correction circuits 308 as previously described with reference to FIG. 3 (illustrated in FIG. 5 by the three boxes on top of each other). Each of the circuits 308 is configured to receive I/Q inputs (indicated in FIG. 5 by input ③ and ④, respectively) from a respective synchronous detector circuit 306, to filter the static component, and to provide serial stream outputs 318 (corrected $\underline{M}_n$ samples) and 316 (raw $\underline{M}_n$ samples) as previously described with reference to FIGS. 3 and 4. The correction performed by each of the filtering and correction circuits 308 may account for phase errors introduced in the respective analog channel 304. Therefore, each of the filtering and correction circuits 308 may apply respective correction inputs 324 ($\underline{c}_n$), which may correspond to correction outputs 1812 ($\underline{c}_n$) of the frequency allocation circuit 1800 with reference to FIG. 18. Further detail on the filtering and correction circuit 308 is provided with reference to FIG. 6.

Further, the circuit 500 includes a sampling mode controller circuit 502 configured to receive a plurality of inputs 512 and 514 corresponding to the plurality of serial stream outputs 318 (corrected $\underline{M}_n$ samples) and 316 (raw $\underline{M}_n$ samples), respectively, of respective filtering and correction circuit 308 and to provide a parallel (vector) output 504 (corrected $\underline{M}$), serial stream outputs 506 (corrected $\underline{M}_n$), and serial stream outputs 508 (raw $\underline{M}_n$) in a format and rate in accordance to the selected sampling mode (e.g., fast sampling or slow sampling). Vector outputs 504 (corrected $\underline{M}$) may be used for object detection by the circuit 900 with reference to FIG. 9, while serial stream outputs 506 and 508 may be used for drift estimation with reference to FIG. 13 and for resonance frequency tracking, calibration, and hardware fault detection as discussed with reference to FIG. 12.

The sampling mode controller circuit 502 is also configured to receive a plurality of inputs 516 (induced voltage inputs) that may correspond to the plurality of induced voltage outputs 322 with reference to FIG. 3. It is further configured to receive a control input 518 e.g., from a superordinate control circuit (not shown herein) as well as threshold inputs 520 that may correspond to threshold outputs 928 of the circuit 900 with reference to FIG. 9. Moreover, the sampling mode controller circuit 502 is configured to decide on a sampling mode (e.g., fast sampling or slow sampling) based on inputs 516, 518, and 520 and to switch (route) the serial stream inputs 512 and 514 to the various outputs 504, 506, and 508 in accordance to the selected sampling mode. Moreover, the sampling mode controller circuit 502 is configured to provide a plurality of serial stream outputs 510 (sampling control outputs) that may be used to control the operation of the circuit 300 in accordance with the selected sampling mode as previously described with reference to FIG. 3. An example implementation of a sampling mode controller circuit 502 is provided with reference to FIG. 10.

Figure 6:
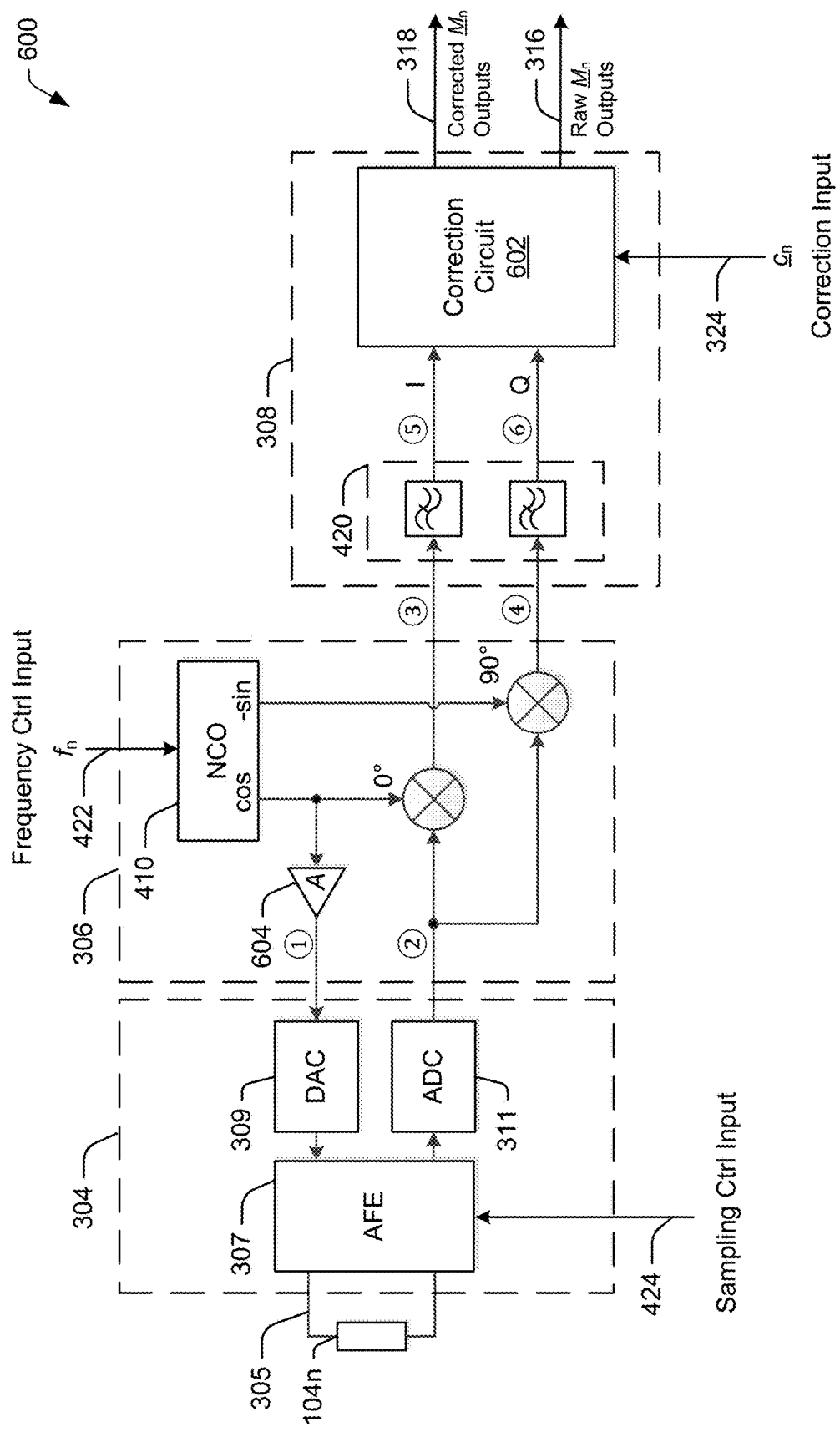
FIG. 6 is a block diagram for purposes of showing more detail in a portion of the circuit of FIG. 3.

FIG. 6 is a block diagram of a circuit 600 for purposes of showing further detail in a portion of the circuit 300 of FIG. 3. The circuit 600 includes the analog channel 304 (e.g., the m-th analog channel 304), the synchronous detector circuit 306, and the filtering and correction circuit 308 as part of the digital processing channel 302 (e.g., the m-th digital processing channel 302) as previously described with reference to FIGS. 3 and 4. The filtering and correction circuit 308 includes the low pass filters 420 (with reference to FIG. 4) followed by a correction circuit 602. The correction circuit 602 may be configured for phase correction based on inputs 324 (complex correction coefficients $\underline{c}_n$) as previously discussed with reference to FIG. 5. In some implementations, the circuit 602 performs a complex multiplication of I/Q inputs ⑤ and ⑥ (corresponding to real and imaginary part, respectively, of the filtered raw $\underline{M}_n$ samples) with the respective correction input 324 ($\underline{c}_n$).

Furthermore, FIG. 6 illustrates a variable gain stage 604 (indicated in FIG. 6 with a gain A) as part of the synchronous detector circuit 306. The variable gain stage 604 is used to control the level of the DAC 309 digital input ① as provided by the NCO 410 and thus to control the level of current excitation of the selected sense coil 105n. The input to control the gain stage 604 are not shown in FIG. 6.

Intermodulation Interference Mitigation

Intermodulation may be generated when applying a multi-tone signal to analog circuitry (e.g., analog circuitry 301) that is not perfectly linear. As previously described in connection with FIG. 3, multiple AFE circuits 307 can operate in parallel, each on a different sense frequency $f_n$. In one example implementation, four AFE circuits 307 are used. The four simultaneously selected sense coils of the sense coil array 106 are magnetically coupled to some degree as previously discussed with reference to FIG. 3. Hence, there may be cross-talk between the plurality of analog channels 304 potentially causing intermodulation in each AFE circuit 307. In an example implementation, intermodulation products may be approximately 30 to 50 dB below the wanted sense signal level at the output of an AFE circuit 307. Such level of intermodulation may negatively impact the system's sensitivity if an intermodulation product falls onto at least one of the sense frequencies (e.g., $f_a$, $f_b$, $f_n$), each associated to a respective sense circuit of the plurality of sense circuits 104a, 104b, 104n. Frequencies of signals generated by the NCO 410 of FIG. 4 are integer multiples of a minimum frequency spacing $\Delta f$ defined by some parameters of the NCO 410 with reference to Equation 1. Consequently, intermodulation products are also integer multiples of $\Delta f$ and may also fall precisely on a sense frequency (e.g., $f_n$) as generated by the NCO 410, thus coherently interfering with the sense signal.

Figure 7:
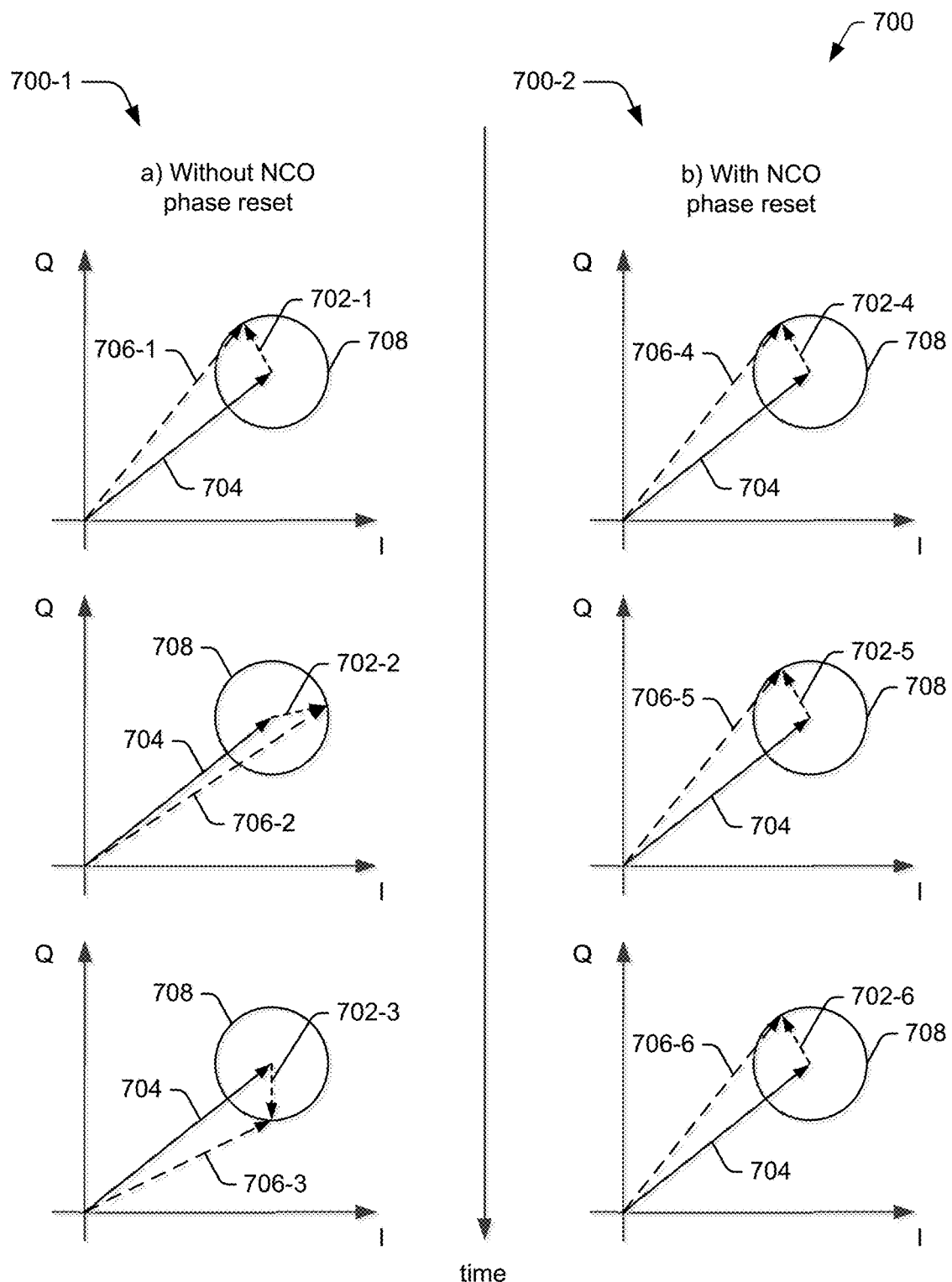
FIG. 7 shows a series of example I/Q diagrams illustrating effects of intermodulation in an object detection circuit of FIG. 1 that concurrently applies a sense signal to each of plurality of sense circuits.

FIG. 7 shows example I/Q diagrams 700 illustrating effects of intermodulation in an object detection circuit 102 using a plurality of sense circuits 104a, 104b, 104n. Each of the series of I/Q diagrams 700-1 and 700-2 refer to a series of consecutive I/Q outputs (e.g., raw $\underline{M}_n$ outputs 316 with reference to FIG. 3), e.g., associated to sense circuit 104n. These I/Q outputs are generated at a rate corresponding to the scan cycle period of the object detection circuit 102 as previously discussed with reference to FIG. 3. The diagrams 700 show I/Q outputs represented as two superimposed phasors. Phasor 704 refers to the I/Q output in absence of intermodulation interference, while phasor 702 (intermodulation phasor) illustrate the effect of the intermodulation interference. The sum phasor (vector sum) is represented by phasor 706 (dashed arrow).

The series of I/Q diagrams 700-1 illustrate the situation where no additional provisions are made (e.g., no NCO phase reset is applied). In this case, the intermodulation phasor 702 may rotate in consecutive I/Q outputs, which is illustrated by the sequence of intermodulation phasors 702-1, 702-2, 702-3. Such rotation of the intermodulation phasor 702 may be observed, if the phase evolution over one scan cycle period of an NCO 410 is not an integer multiple of 360°, which may be the normal case. It may be appreciated that in an object detection circuit 102 based on a time-differential detection scheme (e.g., using a time-differentiating filter 914 with reference to FIG. 9), the effect of the variation in outputs due to intermodulation interference may be equivalent to an increased noise level and thus to a reduced object detection sensitivity.

The series of I/Q diagrams 700-2 now illustrate the situation where the NCO's 410 phase accumulator is reset (e.g., to zero) at the end of each measurement interval. Since measurement intervals are of equal duration ($T_m$) as previously defined with reference to FIG. 3, it may be appreciated that the phase reset may cause the intermodulation phasor 702 in consecutive I/Q outputs (illustrated by phasors 702-4, 702-5, 702-6) associated to a sense circuit (e.g., sense circuit 104n) to be stable (non-rotating) thus producing a static offset in consecutive I/Q outputs 706-4, 706-5, 706-6. However, it may be appreciated that a static offset may have no effect in outputs e.g., of a time-differentiating filter 914 with reference to FIG. 9.

FIG. 8 shows a time diagram 800 of an example DAC input signal 802 corresponding to a continuous-time representation of the NCO output signal 416, e.g., with reference to FIG. 4). More specifically, it illustrates the signal 802 in the transition between two consecutive measurement intervals. The DAC input signal 802 refers to an example operation, where the frequency of the NCO's 410 output is changed from an old frequency $f_a$ to a new frequency $f_b$ and the NCO's phase accumulator is reset to zero in the transition from the i-th measurement interval to the (i+1)-th measurement interval for purposes as previously discussed with reference to FIG. 3.

The NCO 410 periodically returns to the same sense frequency (e.g., the sense frequency $f_n$ associated to sense circuit 104n) with a period corresponding to the scan cycle period as also discussed with reference to FIG. 3. However, in some implementations or operations, there may be a requirement to change the sense frequency (e.g., $f_n$) to be used for a sense circuit (e.g., sense circuit 104n) from time to time. A change in the sense frequency allocation may be required, if the resonant frequency of at least one of the sense circuits 104a, 104b, 104n has drifted substantially e.g., due to changes in ambient temperature, mechanical impacts on the sense coil array 106, ageing, etc. A change in a frequency allocation may be also forced by a change in the noise spectrum as discussed with reference to FIGS. 3 and 18. It may be appreciated that a change in the sense frequency $f_n$ as used for the sense circuit 104n may cause the intermodulation phasor 702 (with reference to FIG. 7) to alter in spite of the NCO phase reset.

Figure 17:
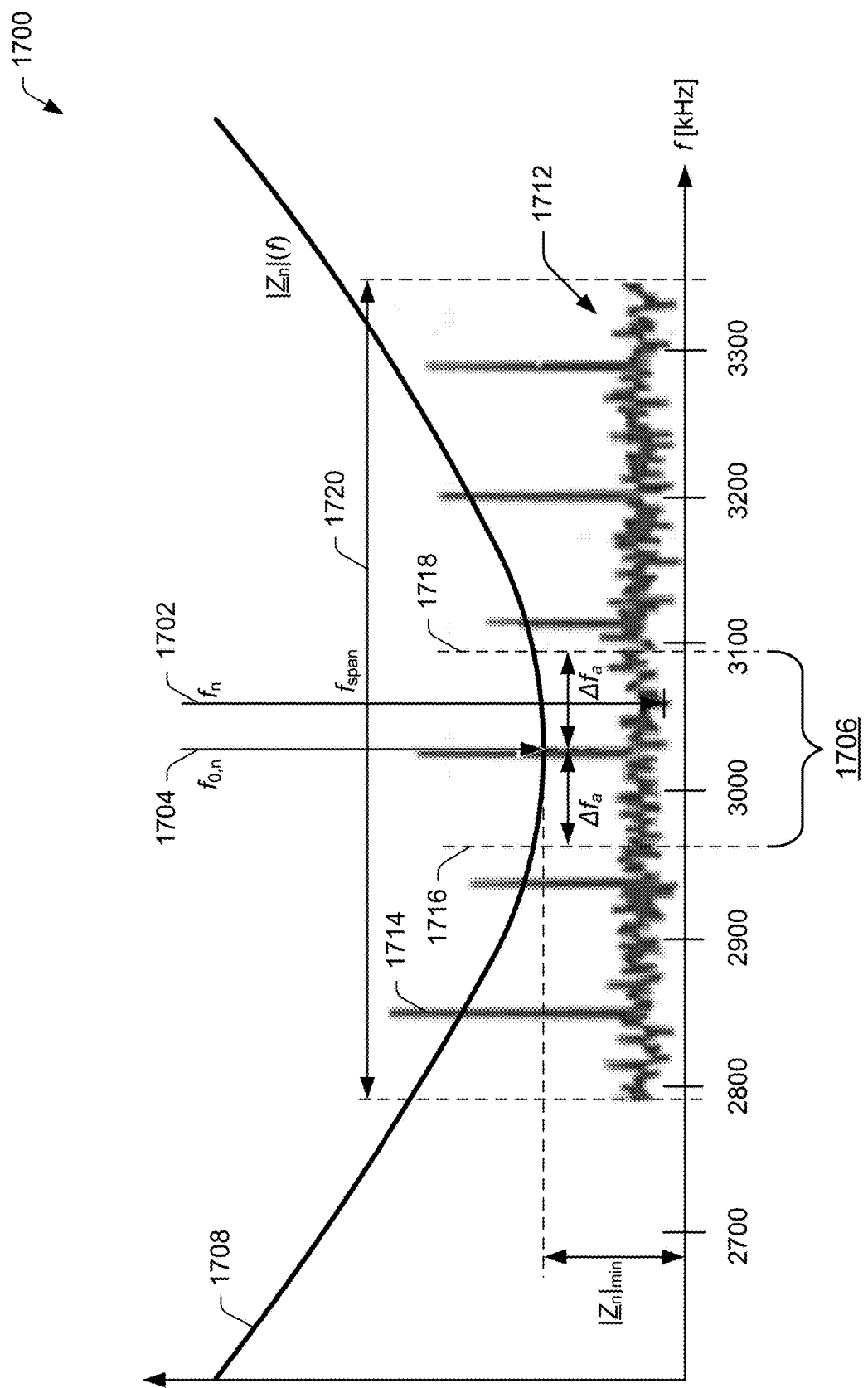
FIG. 17 illustrates a magnitude impedance vs. frequency function of an example implementation of a sense circuit of FIG. 1.

Reallocation of the sense frequency (e.g., sense frequency $f_n$) of a single sense circuit (e.g., sense circuit 104n) may suffice to produce a change due to intermodulation in a plurality of parallel I/Q outputs (e.g., corrected $M_n$ outputs 318) each associated to a concurrently driven sense circuit. It may be appreciated however that a change in consecutive I/Q outputs (e.g., corrected $M_n$ outputs 318) may be also observed in absence of any intermodulation, since the sense circuit's 104n impedance is a function of frequency e.g., as illustrated in FIG. 17. However, as opposed to intermodulation interference, such change may be limited to an I/Q output associated to a sense circuit (e.g., sense circuit 104n) whose frequency (e.g., $f_n$) has changed. Whatever the cause for a change may be, an abrupt change in a series of consecutive outputs 318 associated e.g., to sense circuit 104n may potentially cause a false positive detection. Therefore, in some implementations or operations of a measurement and detection circuit 108, false positive detections due to a frequency reallocation are avoided using measures as discussed in connection with FIGS. 9, 14, and 18 in more detail. Such measures may not noticeably reduce an object detection probability (e.g., a detection reliability).

FIG. 9 is a block diagram illustrating an example implementation of a circuit 900 that is a portion of the measurement and detection circuit 108 of FIG. 1 based on a time-differential detection scheme. The circuit 900 includes a beacon cancellation circuit 904, a sample converter circuit 906, an outlier cancellation filter 910, a time-differentiating filter 914, an object discrimination circuit 918, a dynamic threshold determination circuit 920, and a threshold detection circuit 922. The circuit 900 as illustrated in FIG. 9 may be implemented as a vector processing circuit using a plurality (N) of parallel processing channels, each associated to a respective sense circuit of the plurality of sense circuits 104a, 104b, 104n. Some blocks of the circuit 900 may be implemented as multiple instantiations.

The beacon cancellation circuit 904 is configured to receive vector inputs 930 (corrected $\underline{M}$) and beacon inputs 932 and to provide vector outputs $\underline{M}'$. Vector inputs 930 may correspond to vector outputs 504 with reference to FIGS. 5 and 10. Beacon inputs 932 may correspond to serial stream beacon outputs 320 with reference to FIG. 3 converted to parallel (vector) inputs 932 by some circuitry not shown herein. The sample converter circuit 906 is configured to receive vector inputs $\underline{M}'$ from the beacon cancellation circuit 904 and to provide vector outputs $\underline{Z}$. Each component $\underline{Z}_n$ of the vector $\underline{Z}$ may be indicative of an impedance of a respective sense circuit of the plurality of sense circuits 104a, 104b, 104n. The outlier cancellation filter 910 is configured to receive vector inputs $\underline{Z}$ from the sample converter circuit 906 and filter control inputs 934 (vector inputs) to provide vector outputs $\underline{Z}'$ that are also outputs 908 of the circuit 900. Filter control inputs 934 may correspond to filter control outputs 1824 (vector outputs). Vector outputs 908 may be used by the reference tracking circuit 1500 of FIG. 15 and by the auto-recovery circuit 1600 shown in FIG. 16.

The time-differentiating filter 914 is configured to receive vector inputs $\underline{Z}'$ from the outlier cancellation filter 910 and to provide vector outputs $\underline{\Delta Z}'$. The object discrimination circuit 918 is configured to receive vector inputs $\underline{\Delta Z}'$ from the time-differentiating filter 914 and to provide (e.g., unmodified) vector outputs $\underline{\Delta Z}'$ as well as side information outputs 926 (vector outputs). The dynamic threshold determination circuit 920 is configured to receive vector inputs $\underline{\Delta Z}'$ from the object discrimination circuit 918 and to provide threshold outputs 928 (vector outputs) that are also vector outputs (threshold outputs) of the circuit 900. Finally, the threshold detection circuit is configured to provide a detection output 924 of the circuit 900 based on vector inputs $\underline{\Delta Z}'$, side information outputs 926 from the object discrimination circuit 918, and threshold vector outputs 928 received from the dynamic threshold determination circuit 920. For purposes of illustration, the circuit 900 may exclude additional control inputs and outputs as they may be required in a real implementation.

Since the circuit 900 is used for object detection, the beacon response is first cancelled out in the beacon cancellation circuit 904 to remove effects of the passive beacon response in the further processing of the circuit 900. In some implementations, the passive beacon transponder (e.g., passive beacon transponder 278 with reference to FIG. 2B) when activated and brought into proximity of a sense coil (e.g., the sense coil 105n) produces a change (e.g., a step response) in at least one of the plurality of components of vector inputs 930 (corrected $\underline{M}$) potentially causing a false positive detection in the threshold detection circuit 922. Therefore, the beacon cancellation circuit 904 is configured to cancel out any passive beacon response component using beacon inputs 932.

Vector outputs M' of the beacon cancellation circuit 904 are then further processed by the sample converter circuit 906. If components of vector M' are indicative of the complex admittance, the sample converter circuit 906 converts them to components of vector Z, each indicative of a complex impedance. If components of vector M' are indicative of the complex impedance, vector M' becomes the vector Z. In implementations, where components of vector M' are indicative of an admittance, the sample converter circuit 906 may convert each component (e.g., $M'_n$) to a respective component (e.g., $Z_n$) indicative of an impedance e.g., by applying the following equation:

$$Z_n = \frac{A_n}{M'_n} \qquad \text{Equation 2}$$

where $A_n$ is a scale factor suitably chosen with respect to the number format used for the digital processing in the measurement and detection circuit 108. In some implementations, this scale factor $A_n$ relates to the gain A of variable gain stage 604 with reference to FIG. 6.

Resulting vector outputs Z are then further processed by the outlier cancellation filter 910 configured to identify and remove potential outliers in each component (e.g., $Z_n$) of vector Z. Outliers in a statistic of samples (e.g., $Z_n$) may be produced by transient noise but also by transient foreign objects (e.g., in the slow sampling mode) as discussed with reference to FIGS. 10 and 14. Therefore, the use of an outlier cancellation filter 910 may reduce a false detection probability e.g., in presence of transient noise or in the event of a transient object proximate to a sense circuit (e.g., sense circuit 104n) as discussed with reference to FIG. 10. An example implementation of an outlier cancellation filter 910 is described and illustrated in more detail with reference to FIG. 14. The use of filter control inputs 934 is described in connection with FIGS. 8 and 14. Further, vector outputs Z' are processed by the time-differentiating filter 914.

In some implementations, the time-differentiating filter 914 includes a digital filter structure (e.g., a high pass filter or a combination of a high and low pass filter structure not further described herein) for each of the plurality of components (e.g., $Z'_n$). The time-differentiating filter 914 is configured to sensitively react on relatively fast changes in individual components (e.g., $Z'_n$) in time series of consecutively received vectors Z'. These may be changes as produced by an object (e.g., object 110 falling on a base pad's 224 surface) and that are considerably faster than changes e.g., caused by temperature drift or ageing. Therefore, each component of vector output ΔZ' is indicative of a change in impedance e.g., produced by an object.

Vector output ΔZ' is further processed in the object discrimination circuit 918 configured to classify an object (e.g., object 110) proximate to at least one sense coil (e.g., sense coil 105n) based on the change in the at least one vector component (e.g., $ΔZ'_n$). In some implementations, an object is classified based on the angle of the complex components of vector ΔZ' (e.g., $\arg\{ΔZ'_n\}$). This information may be used in the threshold detection circuit 922 to discriminate between critical and non-critical objects. If the measurement and detection circuit is properly calibrated with respect to the angle (e.g., $\arg\{ΔZ'_n\}$), a change (e.g., $ΔZ'_n$) produced by an object proximate to a sense circuit (e.g., sense circuit 104n) may reflect some physical characteristics of the object such as electric conductivity, magnetic permeability, and electric permittivity. It may be appreciated that a change (e.g., $ΔZ'_n$) may be also produced by a dielectric object since a sense coil (e.g., sense coil 105n) may also generate an electric field (capacitive sensing effect). However, objects containing dielectric materials only (e.g., plastic bottles, water, leaves, wood, etc.) may be less critical as they may not heat up when exposed to the low frequency magnetic field of the wireless power transfer (e.g., 85 kHz) and therefore should not trigger a positive detection output 924. Therefore, the information extracted in the object discrimination circuit 918 for each vector component individually, is used as side information in the threshold detection circuit 922. Side information outputs 926 may indicate whether a potential change (e.g., $ΔZ'_n$) is produced by a critical or a non-critical object.

In the example implementation shown in FIG. 9, the object discrimination circuit 918 passes vector outputs ΔZ' without modification to the dynamic threshold determination circuit 920 and to the threshold detection circuit 922. The dynamic threshold determination circuit 920 determines a threshold to be applied in the threshold detection circuit 922. In some implementations, the dynamic threshold determination circuit 920 determines a threshold for each vector component individually based on vector inputs ΔZ' e.g., by computing the magnitude of each of the plurality of complex components (e.g., $|ΔZ'_n|$), by producing a histogram over the plurality of magnitudes (e.g., $|ΔZ'_a|, |ΔZ'_b|, |ΔZ'_n|$) and by computing a percentile. The thresholds may then be determined based on this percentile and other statistical information derived from consecutively received vectors ΔZ' on a vector component basis. Alternatively, the dynamic threshold determination circuit 920 determines a threshold for the real part and the imaginary part separately based on vector inputs ΔZ'. It may determine a real part threshold for each vector component individually, e.g., by computing the real part absolute value of each of the plurality of complex components (e.g., $|\text{Re}\{ΔZ'_n\}|$), by producing a histogram over the plurality of real part absolute values (e.g., $|\text{Re}\{ΔZ'_a\}|, |\text{Re}\{ΔZ'_b\}|, |\text{Re}\{ΔZ'_n\}|$) and by computing a percentile. The real part thresholds may then be determined based on this percentile and other statistical information derived from the real parts of consecutively received vectors ΔZ' on a vector component basis. Analogously, it may determine an imaginary part threshold for each vector component individually.

The dynamic threshold determination circuit 920 may be used to effectively discriminate the response ΔZ' e.g., produced by a moving vehicle (e.g., vehicle 1902 with reference to FIG. 19) when parked over the sense coil array 106. But it may also effectively discriminate a response produced by a mechanical impact on the base pad 224 (e.g., from a person stepping over the base pad 224). The thresholds may automatically increase when the vehicle 1902 is moving or when mechanical pressure is applied and decrease to their normal value when the vehicle 1902 comes to a rest or mechanical pressure is released. Therefore, the dynamic threshold determination circuit 920 may prevent from false positive detections in presence of a moving vehicle 1902 or mechanical impact. The dynamic threshold determination circuit 920 may be also used to adapt the detection thresholds to varying noise conditions. In aspects, threshold outputs 928 (e.g., vector outputs) of the dynamic threshold determination circuit 920 may be also used by the sampling mode controller circuit 502 as further discussed with reference to FIG. 10.

Finally, the threshold detection circuit 922 determines presence of an object (e.g., object 110) in proximity of the least one of the plurality of sense coils 105a, 105b, 105n based on vector inputs $\underline{\Delta Z'}$, the side information inputs (vector inputs) determined in the object discrimination circuit 918, and the threshold inputs determined in the dynamic threshold determination circuit 920. In some implementations, the detection output 924 may be indicative of whether at least one vector component (e.g., $|\underline{\Delta Z'}_n|$) has exceeded the respective threshold input and whether the angle (e.g., arg{$\underline{\Delta Z'}_n$}) is in a predetermined range e.g., indicative of a critical object. A positive detection output 924 may be indicative of presence of a critical object in the predetermined detection region of the object detection circuit 102 as previously defined with reference to FIG. 1.

Fast and Slow Sampling Modes

As previously discussed with reference to FIG. 9, a time-differential detection scheme is used for achieving the required detection sensitivity. Using time-differential detection, an object can potentially be detected when it enters or leaves the proximity of a sense coil (e.g., sense coil 106a) or generally when it moves. This detection approach may require the object detection circuit 102 to be active and sensitive at any time regardless whether an electric vehicle (e.g., electric vehicle 1902 with reference to FIG. 19) is parked over the wireless power transmit structure 224 (base pad) for charging. In the event the object detection circuit 102 was triggered, a visual inspection e.g., by the user or a service personnel may be required to remove a potential metallic object (e.g., object 110) from the base pad's 224 surface prior reactivation of the object detection circuit 102. Therefore, it may be desirable to reduce a false detection probability of an object detection circuit 102 by implementing more particular features as further discussed below.

In absence of the electric vehicle 1902, the base pad 224 (integrating the sense coil array 106 with reference to FIGS. 1, 2A, and 2B) stays uncovered and thus accessible by a human being or an animal Wireless power transfer is inactive in this scenario. This may impose a certain risk of false triggers e.g., when a person accidentally steps over the base pad 224 with shoes containing metallic parts or moves a bicycle or other metallic objects over the base pad 224. To reduce a false detection probability in absence of a vehicle (e.g., electric vehicle 1902), the object detection circuit 102 is configured to be more tolerant to metallic objects (e.g., object 110) temporarily residing in the predetermined detection region of the object detection circuit 102. An object temporarily residing in this region is referred to as a transient object. This tolerance to transient objects may not impose a safety risk, since wireless power transfer is inactive and therefore no substantial current excitation of the base pad 224 and consequent heating effects are to be expected. Only an object that remains in the predetermined detection region for an amount of time that is more than a predetermined duration of time (e.g., 6 seconds, 8 seconds, 10 seconds, and so on) may trigger the object detection circuit 102.

Accordingly, the object detection circuit 102 may be operated in at least one of a fast and a slow sampling mode (as previously discussed with reference to FIGS. 3, 5, and 10) depending on whether power transfer is active or inactive or on other conditions as discussed below. A fast sampling mode (corresponding to a short cycle period) may be characterized by low detection latency. It is selected when wireless power transfer is active. A slow sampling mode (corresponding to a long scan cycle period) may be characterized by a higher tolerance to transient objects but also by higher detection latency and is therefore normally used when wireless power transfer is inactive. If power transfer is inactive, the object detection circuit 102 assumes absence of a vehicle (e.g., electric vehicle 1902 of FIG. 19) and thus free access to the base pad 224 e.g., by any person as previously discussed. In aspects, a slow sampling mode may also be used for purposes of continuous (slow) resonance frequency tracking, drift estimation, and recalibration of the object detection circuit 102 as explained with reference to FIGS. 12 to 18. An example slow sampling mode configured to support these features is described in more detail below with reference to FIGS. 10 and 11B.

There may be exceptions where the object detection circuit 102 operates in a fast sampling mode though wireless power transfer is inactive. These exceptions may include times when passive beacon positioning is active, times when a vehicle (e.g., electric vehicle 1902 of FIG. 19) is positioned over the base pad 224 and is moving as further explained below, and during short periods for purposes of fast resonance frequency tuning and calibration as further discussed below.

Passive beacon positioning may require a low beacon response detection latency (e.g., <200 ms) to provide position updates at a rate (e.g., 5 positions/s) as specified for a vehicle positioning system. Therefore, in aspects, the object detection circuit 102 may operate in a fast sampling mode when passive beacon positioning is active. Further, as previously discussed in connection with the dynamic threshold determination circuit 920 of FIG. 9, a moving vehicle positioned over the base pad 224 may increase the detection thresholds dynamically and thus desensitize the object detection circuit 102 at least for the duration the vehicle is moving. When the vehicle comes to a rest again or gets outside the detection region of the object detection circuit 102, the detection thresholds may soon return to their normal value and the object detection circuit 102 may regain its full sensitivity. However, a time needed to recover from desensitization (recovery time) may last substantially longer in a slow sampling mode than in a fast sampling mode. This may be explained by a longer decay time of a response in the time-differentiating filter 914 with reference to FIG. 9 due to the low sampling rate. Therefore, in some implementations or operations, the object detection circuit 102 uses a fast sampling mode in presence of a moving vehicle (e.g., electric vehicle 1902 of FIG. 19) to reduce a recovery time.

In principle, resonance frequency tuning and calibration may also be incorporated into a fast sampling mode. However, this may compromise detection reliability and/or increase detection latency. Moreover, resonance frequency tuning and calibration may be less accurate or reliable in presence of switching noise produced by the wireless power transfer system 200 as further described in connection with FIG. 18. Therefore, a fast sampling mode that runs when wireless power transfer is active may not support resonance frequency tuning and calibration. An example fast sampling mode configured for low latency object detection only is described with reference to FIGS. 10 and 11A.

This concept of fast and slow sampling modes may require wireless power transfer to be paused from time to time to provide opportunities for resonance frequency retuning and recalibration. An additional and different second fast sampling mode may apply in these intervals. Therefore, in aspects, the object detection circuit 102 may be configured to provide at least one second fast sampling mode for purposes of fast resonance frequency tuning and calibration. A second or even additional fast sampling mode may also be used initially e.g., for factory calibration, for calibration after system installation and decommissioning, and for each time the object detection circuit 102 is reactivated (e.g., after a visual inspection by a user or service personnel). An example additional second fast sampling mode is further described with reference to FIGS. 10 and 11B.

FIG. 10 is a block diagram of a circuit 1000 illustrating an example implementation of the sampling mode controller circuit 502 of FIG. 5. The circuit 1000 is configured to receive the plurality of serial stream inputs 512 and 514 that may correspond to the plurality of outputs 318 (corrected $\underline{M}_n$ samples) and the plurality of outputs 316 (raw $\underline{M}_n$ samples), respectively as previously discussed with reference to FIGS. 3 and 5. It is further configured to route (dispatch) sample inputs 512 and 514 to produce the various sample outputs 504, 506, and 508 in accordance to the selected sampling mode. The circuit 1000 includes various components (blocks) electrically or logically interconnected (depending on the implementation) as shown by the block diagram of FIG. 10. More specifically, the circuit 1000 includes switches such as an input selector switch 1002 configured to receive and select samples from serial stream inputs 512 and 514, a router switch 1004 configured to receive sample outputs 1022 of input selector switch 1002 (indicated in FIG. 10 by output ①), and an output selector switch 1010 configured to receive and select sample outputs of router switch 1004 (indicated in FIG. 10 by output ②).

Further, the circuit 1000 includes a buffer 1014 configured to receive serial stream outputs 1020 from the output selector switch 1010 and to convert serial outputs 1020 to parallel (vector) outputs 504 (corrected $\underline{M}$) as previously mentioned with reference to FIG. 5. Vector outputs 504 of the circuit 1000 may be vector inputs to the circuit 900 as previously described with reference to FIG. 9. The circuit 1000 also includes a plurality of digital low pass filters 1006, each configured to receive respective sample outputs 1024 from router switch 1004 (indicated in FIG. 10 by the plurality of outputs ③). Further, it includes a plurality of sample decimators 1008, each configured to receive sample outputs from a respective low pass filter 1006. (The plurality is illustrated in FIG. 10 by three boxes on top of each other). The number of low pass filters 1006 and sample decimator 1008 circuits may correspond to the number (e.g., $N_a$) of digital processing channels 302 with reference to FIG. 3. Output selector switch 1010 is also configured to receive and select sample outputs 1016 of the plurality of sample decimators 1008 (indicated in FIG. 10 by the plurality of outputs ④). Router switch 1004 is also configured to provide auxiliary serial stream outputs 506 (corrected $\underline{M}_n$ samples) and 508 (raw $\underline{M}_n$ samples) (indicated in FIG. 10 by output ⑤) in accordance to the selected sampling mode and for purposes as previously discussed with reference to FIG. 5.

The circuit 1000 also includes a decision and control circuit 1012 configured to receive the plurality of induced voltage inputs 516 that may correspond to the plurality of induced voltage outputs 322, control inputs 518, and threshold inputs 520 as previously discussed with reference to FIG. 5 and to decide on a sampling mode (e.g., fast or slow sampling mode) based on these inputs. The decision and control circuit 1012 is further configured to control switches 1002, 1004, and 1010 in accordance to the selected sampling mode and to provide a plurality of serial stream control outputs 510 that may be used by the circuit 300 to control the sampling mode. For purposes of illustration, the circuit 1000 may exclude certain components (e.g., additional buffers, control and processing circuitry) as it may be required in a real implementation of a sampling mode controller circuit 502.

The decision and control circuit 1012 may decide for the fast sampling mode if at least one of the plurality of induced voltage inputs 516 indicates that wireless power transfer is active, or if the control input 518 indicates that passive beacon positioning is active, or if threshold inputs 520 indicate presence of a moving vehicle as previously discussed with reference to FIG. 9, else, depending on control inputs 518, it may choose either the slow sampling mode or a second fast sampling mode for purposes as previously discussed.

In the example fast sampling mode, input selector switch 1002 selects (e.g., sequentially) samples from each of the plurality of serial stream inputs 512 (corrected $\underline{M}_n$ samples) and passes them to router switch 1004 via output ①. Router switch 1004 routes all outputs 1022 to output selector switch 1010 (via output ②) that feeds them to the output buffer 1014 configured to convert the serial stream output 1020 to a parallel (vector) output 504 (corrected $\underline{M}$). Vector $\underline{M}$ may correspond to the (combined) sequence $\underline{M}_1, \underline{M}_2, \ldots \underline{M}_n, \ldots \underline{M}_N$, with $\underline{M}_1$ referring to sense circuit 104a, $\underline{M}_2$ referring to sense circuit 104b, etc., and $\underline{M}_n$ referring to sense circuit 104n, etc. of the plurality of sense circuits 104a, 104b, 104n as previously explained with reference to FIG. 3. In the example fast sampling mode, the overall sample rate in vector outputs 504 corresponds to the overall sample rate in the plurality of inputs 512, thus there is no loss of samples. However, no outputs 506 (corrected $\underline{M}_n$ samples) and 508 (raw $\underline{M}_n$ samples) may be provided, meaning that inputs 514 (raw $\underline{M}_n$ samples) may not be used and are discarded.

In an example slow sampling mode, input selector switch 1002 selects (e.g., sequentially), from each of the plurality of inputs 512 (corrected $\underline{M}_n$ samples), those samples that are associated to the first ($N_s$-1) measurement intervals of a series of $N_s$ measurement intervals a sense circuit (e.g., sense circuit 104n) remains connected to an analog channel 304 as previously explained with reference to FIG. 3 and passes them to router switch 1004 via output ①. Furthermore, input selector switch 1002 selects (e.g., sequentially), from each of the plurality of inputs 514 (raw $\underline{M}_n$ samples), those samples that are associated to the last ($N_s$-th) measurement interval of the series of $N_s$ measurement intervals. Received raw $\underline{M}_n$ samples associated to the first ($N_s$-1) measurement intervals and corrected $\underline{M}_n$ samples associated to the last ($N_s$-th) measurement interval may not be used in the example slow sampling mode. Router switch 1004 in turn routes all corrected $\underline{M}_n$ samples as received from the input selector switch 1002 via output ① to a respective low pass filter 1006 via a respective output ③. More specifically, corrected $\underline{M}_n$ samples originating from the m-th filtering and correction circuit 308 with reference to FIG. 3 are routed to the m-th low pass filter 1006 via a respective output ③. Likewise, corrected $\underline{M}_n$ samples originating from another (e.g., (m−1)-th) filtering and correction circuits 308 are routed to another respective (e.g., (m−1)-th) low pass filter 1006 via a respective output ③.

In some implementations, the low pass filter 1006 together with sample decimator 1008 operates as a block averaging filter, meaning that outputs 1016 of each sample decimator 1008 (plurality of outputs ④) refer to a block average over the respective ($N_s$-1) corrected $\underline{M}_n$ samples e.g., associated to sense circuit 104n as described above. Output selector switch 1010 in turn selects (e.g., sequentially) block average samples as received from each of the plurality of sample decimators 1008 (plurality of outputs ④) to produce the serial stream output 1020 that is an input to buffer 1014 configured for serial-to-parallel (vector) conversion. In the example slow sampling mode, each component of the vector output 504 (corrected $\underline{M}$) corresponds to a block average over a sequence of ($N_s$-1) consecutively received corrected $\underline{M}_n$ samples associated to a respective sense circuit (e.g., sense circuit 104n). Moreover, router switch 1004 routes duplicates of corrected $\underline{M}_n$ samples associated to the first ($N_s$−1) measurement intervals to an output ③ to generate the serial stream outputs 506 corresponding to a repetitive sequence of corrected $\underline{M}_n$ samples e.g., $\underline{M}_1$, $\underline{M}_1$, $\underline{M}_1$, . . . , $\underline{M}_2$, $\underline{M}_2$, $\underline{M}_2$, etc., $\underline{M}_n$, $\underline{M}_n$, $\underline{M}_n$, etc., $\underline{M}_N$, $\underline{M}_N$, $\underline{M}_N$, . . . , $\underline{M}_1$, $\underline{M}_1$, $\underline{M}_1$, . . . , $\underline{M}_2$, $\underline{M}_2$, $\underline{M}_2$, . . . , etc., with $\underline{M}_1$ referring to sense circuit 104a, $\underline{M}_2$ referring to sense circuit 104b, $\underline{M}_3$ referring to sense circuit 104n, etc. of the plurality of sense circuits 104a, 104b, 104n. Similarly, router switch 1004 routes consecutively received raw $\underline{M}_n$ samples associated to the last ($N_s$-th) measurement interval to an output ⑤ to generate the serial stream outputs 508 corresponding to a repetitive sequence of raw $\underline{M}_n$ samples e.g., $\underline{M}_1$, $\underline{M}_2$, . . . , $\underline{M}_n$, . . . , $\underline{M}_N$, $\underline{M}_1$, $\underline{M}_2$, etc.

In the example slow sampling mode, the overall sample rate in vector outputs 504 corresponds to a fraction (1/$N_s$) of the overall sample rate in the plurality of inputs 512 due to the decimation (block averaging). However, only one of $N_s$ corrected $\underline{M}_n$ samples is discarded, the remaining ($N_s$−1) samples are used for computing block averages. The sample rate in outputs 506 (corrected $\underline{M}_n$ samples) is a fraction $N_s/(N_s-1)$ of the overall sample rate of the plurality of inputs 512 (one of $N_s$ corrected $\underline{M}_n$ samples may be discarded), while the sample rate in outputs 508 (raw $\underline{M}_n$ samples) is only a fraction 1/$N_s$ of the overall sample rate of the plurality of inputs 514 ($N_s$−1 of $N_s$ samples may be discarded). Outputs 508 (raw $\underline{M}_n$ samples) may be used for resonance frequency tuning, calibration, and hardware fault detection as discussed with reference to FIG. 12, while outputs 506 (corrected $\underline{M}_n$ samples) may be used for drift estimation as discussed with reference to FIG. 13.

The slow sampling mode as described above should be construed as exemplary and non-limiting. In alternative implementations or operations of a sampling mode controller circuit 502, the slow sampling mode is accomplished by scanning the plurality of sense circuits 104a, 104b, 104n in a fashion similarly to the fast sampling mode and by averaging corrected $\underline{M}_n$ samples associated to the same sense circuit (e.g., sense circuit 104n) over a number ($N_s$−1) of scan cycles (block averaging). Every $N_s$-th scan may be a special scan inserted for purposes of acquiring raw $\underline{M}_n$ samples e.g., used for resonance frequency tuning, calibration, and hardware fault detection as discussed with reference to FIG. 12. In yet other implementations or operations, averaging may be an exponential tail averaging, or any other low pass filtering and decimation function.

An exemplary second or additional fast sampling mode supporting low latency object detection, fast resonance frequency tuning and calibration may be obtained by configuring the slow sampling mode for a low number $N_s$ (e.g., 2). Another fast sampling mode supporting fast resonance frequency tuning and calibration only may be obtained with $N_s$=1. In this mode, the sampling mode controller circuit 502 may provide outputs 508 (raw $\underline{M}_n$ samples) but no outputs 504 and 506 (corrected $\underline{M}_n$ samples).

Figure 11A:
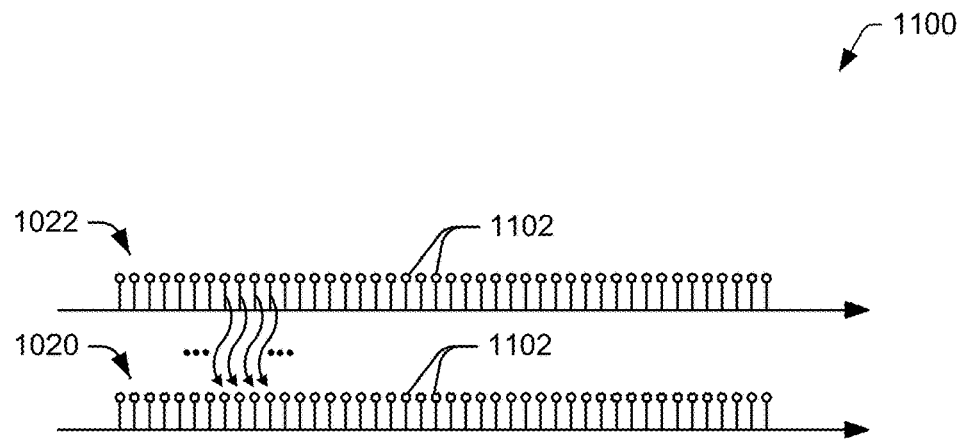
FIG. 11A shows time diagrams illustrating an example operation of the circuit of FIG. 10 in a fast sampling mode.

FIG. 11A shows a couple of time diagrams 1100 illustrating the operation of the circuit 1000 of FIG. 10 in the example fast sampling mode as described with reference to FIGS. 3 and 10. The upper diagram of FIG. 11A illustrates the serial stream outputs 1022 composed of corrected $\underline{M}_n$ samples 1102 as generated by the input selector switch 1002 (output ①). Referring to the descriptions of the circuit 1000 when operated in the fast sampling mode, the serial stream outputs 1022 correspond to the repetitive sequence of corrected $\underline{M}_n$ samples e.g., $\underline{M}_1$, $\underline{M}_2$, . . . , $\underline{M}_n$, . . . , $\underline{M}_N$, $\underline{M}_1$, $\underline{M}_2$, etc. as previously described with reference to FIG. 3. The lower diagram of FIG. 11A illustrates the serial stream outputs 1020 (corrected $\underline{M}_n$ samples 1102) as generated by the output selector switch 1010 that correspond one-to-one to the serial stream outputs 1022 (illustrated in FIG. 11A by the curved arrows).

Figure 11B:
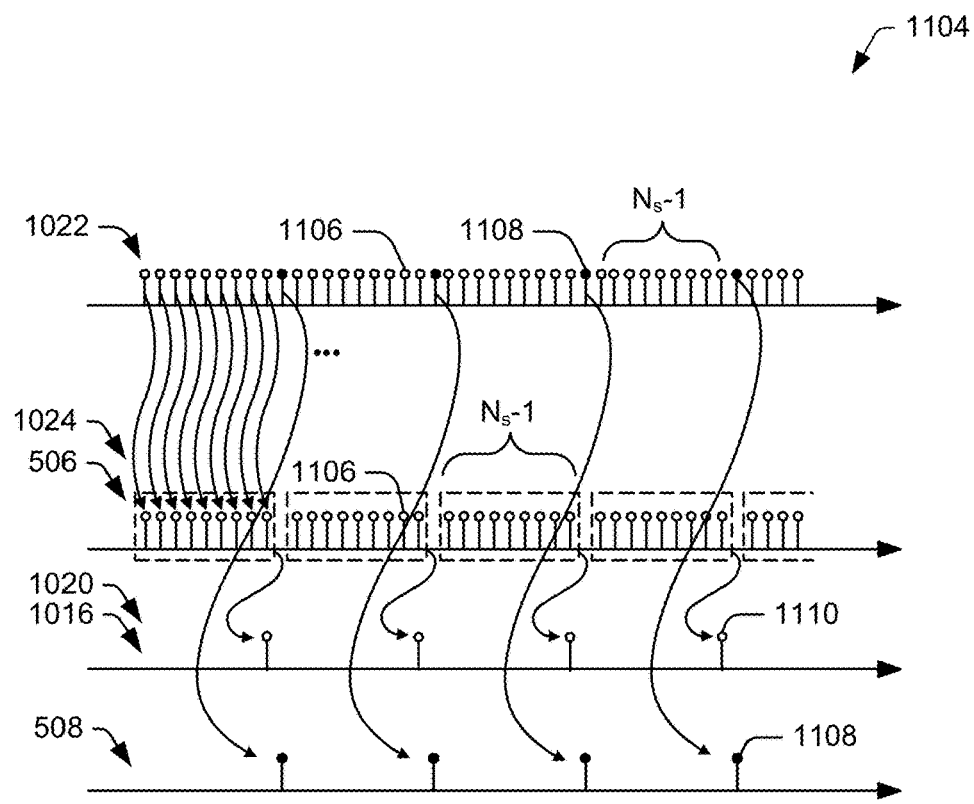
FIG. 11B shows time diagrams illustrating an example operation of the circuit of FIG. 10 in a slow sampling mode.

FIG. 11B shows various time diagrams 1104 illustrating the operation of the circuit 1000 of FIG. 10 in an example slow sampling mode described with reference to FIGS. 3 and 10. The top diagram of FIG. 11B illustrates again the serial stream outputs 1022 (output ①) as generated by the input selector switch 1002 composed of corrected $\underline{M}_n$ samples 1106 (indicated in FIG. 11B as white samples) and raw $\underline{M}_n$ samples 1108 (indicated in FIG. 11B as black samples) for an example operation with a number $N_s$=10 as previously defined with reference to FIG. 3. More specifically, it illustrates the serial stream outputs 1022 corresponding to a repetitive sequence (block) of $N_s$−1 (9) corrected $\underline{M}_n$ samples 1106 followed by one raw $\underline{M}_n$ sample 1108 (replacing the $N_s$-th (10$^{th}$) corrected $\underline{M}_n$ sample 1106).

A first block of 10 samples may refer to sense circuit 104a, a second following block of 10 samples may refer to sense circuit 104b, etc., and an n-th following block of 10 samples may refer to sense circuit 104n, etc. The diagram below the top diagram illustrates the serial stream outputs 1024 at one of the plurality of outputs ③ of the router switch 1004 that are fed into a respective low pass filter 1006 and sample decimator 1008 to produce block average outputs (e.g., sample outputs 1016) as previously discussed with reference to FIG. 10. Each of the plurality of serial stream outputs 1024 is composed of a repetitive sequence (block) of $N_s$−1(9) corrected $\underline{M}_n$ samples 1106, the first block of 9 samples referring e.g., to sense circuit 104a, the second following block of 9 samples referring e.g., to sense circuit 104b, etc., the n-th following block of 9 samples referring e.g., to sense circuit 104n, etc. Dashed line boxes in FIG. 11B indicate blocks of 9 white samples used for computing a block average. Curved arrows illustrate the one-to-one correspondence of the corrected $\underline{M}_n$ samples 1106 (white samples) in the serial stream outputs 1022 with the corrected $\underline{M}_n$ samples 1106 (white samples) in the serial stream outputs 1024. This diagram also applies to the serial stream outputs 506 (corrected $\underline{M}_n$ samples) used, e.g., for drift estimation with reference to FIG. 13.

In addition, FIG. 11B illustrates serial stream outputs 1016 of block averages 1110 as generated by one of the sample decimators 1008 (output ④) (indicated in FIG. 11B also as white samples). This diagram also applies to the serial stream outputs 1020 of the output selector switch 1010. In the example slow sampling mode illustrated in FIG. 11B, outputs 1016 and 1020 (block averages 1110) are generated at a rate that is 10-times lower than the overall input sample rate (plurality of inputs 512). Finally, the bottom diagram of FIG. 11B illustrates the serial stream outputs 508 (raw $\underline{M}_n$ samples) as black samples (raw $\underline{M}_n$ samples 1108) that are also generated at a rate that is 10-times lower than the overall input sample rate (plurality of inputs 514).

FIG. 11B may also apply to the second fast sampling mode (e.g., with $N_s$=2) if the number of white samples (corrected $\underline{M}_n$ samples 1106) per block is reduced to (e.g., $N_s$−1=1). In this mode, outputs 504 and 506 (corrected $\underline{M}_n$ samples) and 508 (raw $\underline{M}_n$ samples) are each generated at a rate that is half of the overall input sample rate of the respective plurality of inputs 512 and 514.

Resonance Frequency Tuning, Calibration, and Fault Detection

In aspects, as previously discussed in connection with FIGS. 3, 8, and 10, the resonant frequency (e.g., $f_{0,n}$) of a sense circuit (e.g., sense circuit 104n) as determined in absence of an object (e.g., object 110) may be subject to change over time e.g., due to changes in ambient temperature, mechanical impacts on the sense coil array 106, and ageing. This may be valid for any of the plurality of sense circuits 104a, 104b, 104n. In implementations or operations of an object detection circuit 102, where each of the plurality of sense circuits 104a, 104b, 104n is driven substantially at resonance (e.g., series resonance) as previously discussed with reference to FIG. 3, it may be beneficial to individually tune the frequency (e.g., $f_n$) assigned to each of the plurality of sense circuits 104a, 104b, 104n substantially for resonance and to maintain (track) a resonance condition tuning during life time of an object detection circuit 102. An initial resonance frequency tuning for each of the plurality of sense circuits 104a, 104b, 104n may be carried out as part of a factory calibration or after system installation and decommissioning.

Changes in ambient temperature, mechanical impacts, and aging may also affect components of analog circuitry 301 and consequently a measured impedance (e.g., $\underline{Z}_n$) or an output (e.g., $\underline{\Delta Z'}_n$) of the time-differentiating filter 914 with reference to FIG. 9. An object detection circuit 102 relying on the angle (e.g., $\arg\{\underline{\Delta Z'}_n\}$) (e.g., for discriminating objects as previously discussed with reference to FIG. 9) may require high impedance angle accuracy and therefore calibration with respect to the angle (e.g., $\arg\{\underline{\Delta Z'}_n\}$) for each of the plurality of sense circuits 104a, 104b, 104n. Such calibration may be performed initially e.g., as part of a factory calibration process or after system installation and decommissioning but also during life time to correct for errors in the angle (e.g., $\arg\{\underline{\Delta Z'}_n\}$) caused by changes in ambient temperature, mechanical impacts, and ageing.

Moreover, in aspects, it may be beneficial to monitor integrity (sanity) of the object detection circuit 102 initially and during its life time. Monitoring integrity may include detection of hardware faults in the plurality of sense circuits 104a, 104b, 104n and in the analog circuitry 301. Hardware faults may include a short circuit, a broken sense coil (e.g., sense coil 105n), a broken component (e.g., a tuning capacitor).

FIG. 12 is a block diagram illustrating an example implementation of a circuit 1200 that is a portion of the measurement and detection circuit 108 with reference to FIG. 1. The circuit 1200 includes a frequency tuning circuit 1204, a calibration circuit 1206, and a hardware fault detection circuit 1208 for purposes as discussed above. The circuit 1200 is configured to receive serial stream inputs 1218 (raw $\underline{M}_n$ samples) and drift estimate inputs 1224. It is further configured to produce various outputs 1210, 1212, 1214, and 1216, partially used by the circuit 1800 with reference to FIG. 18. Serial stream inputs 1218 may correspond to serial stream outputs 508 from the sampling mode controller circuit 502 with reference to FIGS. 5 and 10. Drift estimate inputs 1224 may be outputs from a drift estimator circuit (not shown herein). Depending on the implementation of the circuit 1200, circuits (blocks) 1204, 1206, and 1208 may be electrically or logically interconnected as shown by the block diagram of FIG. 12, and input and output ports may be physical (electrical) ports or just logical ports. For purposes of illustration, the circuit 1200 may exclude additional control inputs and outputs as they may be required in a real implementation.

The circuit 1200 may be active in the example slow sampling mode and in the second fast sampling mode both supporting resonance frequency tuning and calibration as described with reference to FIGS. 10 and 11B. It may be inactive while the object detection circuit 102 runs in the example fast sampling mode as described with reference to FIGS. 10 and 11A.

In aspects as discussed above, the frequency tuning circuit 1204 is configured to receive serial stream inputs 1218 (raw $\underline{M}_n$ samples) and to generate a plurality of serial stream outputs 1210 of frequency sweep control values (e.g., $f_{sweep,n}$). In the example implementation described herein, the frequency tuning circuit 1204 is configured to concurrently generate a plurality ($N_a$) of frequency sweep control values (e.g., $f_{sweep,n}$) used to control the NCO 410 of a respective digital processing channel 302 with reference to FIG. 3 via the frequency control circuit 1806 of FIG. 18. Each in a series of frequency sweep control values $f_{sweep,a}$, $f_{sweep,b}$, $f_{sweep,n}$ is associated to a respective one of the plurality of sense circuits 104a, 104b, 104n.

The frequency tuning circuit 1204 is further configured to determine (search) and track the resonant frequency of each of the plurality of sense circuits 104a, 104b, 104n individually based on the plurality of outputs 1210 and inputs 1218 serving as feedback information. More specifically, the frequency tuning circuit 1204 is configured to generate, for each of the plurality of sense circuits 104a, 104b, 104n, a series of frequency sweep control values (e.g., $f_{sweep,n}$) corresponding to a discrete frequency sweep (e.g., a frequency sweep in small discrete steps) over a predetermined frequency range (e.g., 2.5-3.5 MHz). Frequency sweep control values associated to the sense circuit 104a are applied in measurement intervals where sense circuit 104a is connected to the analog circuitry 301. Frequency sweep control values associated to the sense circuit 104b are applied in measurement intervals where sense circuit 104b is connected to the analog circuitry 301, etc.

The frequency tuning circuit 1204 is further configured to determine, for each of the plurality of sense circuits 104a, 104b, 104n, an extremum of the magnitude in a time-series of captured raw $\underline{M}_n$ outputs 1108 (black samples) associated to a respective sense circuit with reference to FIG. 11B. (Raw $\underline{M}_n$ samples 1108 associated e.g., to the sense circuit 104n are captured in periods corresponding to the scan cycle period of the object detection circuit 102 as previously described with reference to FIG. 3.) In implementations using series-tuned sense circuits, the extremum may be a minimum if the raw $\underline{M}_n$ samples 1108 are indicative of an impedance as illustrated and described with reference to FIG. 17. The frequency sweep control value (e.g., $f_{sweep,n}$) associated to the extremum (e.g., minimum) of the raw $\underline{M}_n$ samples 1108 is considered as the resonant frequency (e.g., $f_{0,n}$) of the respective sense circuit (e.g., sense circuit 104n).

The frequency tuning circuit 1204 is further configured to yield, as vector outputs 1120 ($f_0$), the plurality of resonant frequencies (e.g., $f_{0,n}$), each determined for a respective sense circuit (e.g., sense circuit 104n). It is also configured to yield, as vector outputs 1222 (raw $\underline{M}_0$), the plurality of raw $\underline{M}_n$ samples (e.g., raw $\underline{M}_{0,n}$), whose magnitudes are an extremum (raw $\underline{M}_n$ as obtained at resonance). Vector outputs 1220 and 1222 are the results to be delivered to the calibration circuit 1206.

In some example implementations or operations, the frequency tuning circuit 1204 is configured to perform, for each of the plurality of sense circuits 104a, 104b, 104n, the discrete frequency sweep in small steps (e.g., increments) distributed over many measurement intervals associated to a respective sense circuit (e.g., sense circuit 104n). Each of these measurement intervals may correspond to the last ($N_s$-th) interval of a block of $N_s$ intervals (the interval where raw $\underline{M}_n$ samples 1108 are captured) as previously discussed with reference to FIGS. 10 and 11B. More specifically, the frequency tuning circuit 1204 may control an NCO 410 to increment the frequency (e.g., $f_{sweep,n}$) used to drive a respective sense circuit (e.g., sense circuit 104n) before starting a new measurement interval dedicated to a respective raw $\underline{M}_n$ sample 1108. In some example implementations or operations, frequency increments may correspond to the minimum step size of the NCO 410 (with reference to Equation 1) or any multiple thereof. Further, the frequency tuning circuit 1204 may control an NCO 410 to increment an output frequency used to drive a respective sense circuit (e.g., sense circuit 104n) until a predetermined stop frequency of the frequency sweep is reached. Then, the NCO's 410 output frequency may return to a predetermined start frequency to continue to increment (e.g., a sawtooth sweep). In other operations, the frequency tuning circuit 1204 may control an NCO 410 to increment and decrement an output frequency such as to perform a triangle sweep. In further operations, the NCO 410 is controlled to sweep an output frequency in a manner to optimize a resonance frequency search, e.g., using a larger frequency step size for a coarse search and smaller step size for fine search.

In some operations (e.g., in the second fast sampling mode supporting fast resonance frequency search as previously discussed with reference to FIG. 10), start and stop frequency may define the edge frequencies of a full frequency band (e.g., 2.5-3.5 MHz). In other operations (e.g., in the slow sampling mode supporting resonance frequency tracking), start and stop frequency may define a reduced frequency band centered at a respective resonance frequency that was determined e.g., initially in a fast calibration process using the second fast sampling mode or at any time after using the second fast or the slow sampling mode as previously discussed with reference to FIG. 10. While tracking a resonance frequency, the frequency tuning circuit 1204 may automatically adapt (modify) start and stop frequency if the extremum (e.g., a minimum) of the magnitude of $\underline{M}_n$ would occur at an edge frequency of the frequency sweep.

In aspects, resonance frequency tracking as performed by the frequency tuning circuit 1204 may be disabled under some circumstances. For example, the resonance frequency tracking may be disabled when the detection output 924 is positive (e.g., an object is detected) or a dynamic detection threshold (e.g., threshold output 928 with reference to FIG. 9) exceeds a maximum allowed threshold for resonance tracking forcing the object detection circuit 102 to leave the slow sampling mode as previously discussed with reference to FIG. 10.

In further aspects as discussed above, the calibration circuit 1206 is configured to generate a correction value (e.g., a complex correction value $\underline{c}_{0,n}$) individually for each of the plurality of sense circuits 104a, 14b, 104n. In the implementation descried herein, these correction values (vector outputs $\underline{c}_0$) may be vector inputs 1816 to the frequency allocation circuit 1802 of FIG. 18 that generates the plurality of correction values (e.g., $\underline{c}_n$) used to produce the corrected $\underline{M}_n$ outputs 318 as previously discussed e.g., with reference to FIG. 6. In some implementations, the calibration circuit 1206 determines the correction value e.g., $\underline{c}_{0,n}$ as the conjugate complex of $\underline{M}_{0,n}$ divided by the magnitude of $\underline{M}_{0,n}$. The calibration circuit 1206 is also configured to pass the plurality of resonant frequencies (e.g., $f_{0,n}$) to the hardware fault detection circuit 1208 and to provide vector outputs 1212 ($f_0$) that may be vector inputs 1818 to the frequency allocation circuit 1802 of FIG. 18.

In yet further aspects as previously discussed, the fault detection circuit 108 is configured to detect hardware faults in the plurality of sense circuits 104a, 104b, 104n but also in the analog circuitry 301 based on vector outputs 1212 ($f_0$) of the calibration circuit 1206, vector outputs 1222 (raw $\underline{M}_0$) of the frequency tuning circuit 1204, and on drift estimate inputs 1224. It is further configured to provide a fault detection output 1214 that may be an input to a superordinate control circuit (not shown herein). An apparent resonant frequency (e.g., $f_{0,n}$) (frequency of the extremum of the magnitude of $\underline{M}_n$) that is found outside of a predetermined tolerance range may indicate a hardware fault and thus may produce a positive fault detection output 1214. In some implementations and in case of a hardware failure as described above, the extremum (e.g., minimum) may be found at an edge frequency of the full sweep frequency range (e.g., 2.5-3.5 MHz). Similarly, a drift estimate input 1224 exceeding a predetermined limit may indicate a hardware fault (e.g., as described and illustrated with reference to FIG. 13) and thus may also produce a positive fault detection output 1214.

Upon a positive fault detection output 1214, the object detection circuit 102 or any control instance (e.g., a fault handler) of the wireless transfer system 200 of FIG. 2A may report a hardware issue (including e.g., an error code) to the user or service personnel and a list of hardware issues may be maintained. The fault handler may then prevent the user or service personnel from intentionally or unintentionally clearing a list of hardware issues and running the system in a malfunctioning state.

As previously discussed, the hardware is continuously monitored to detect issues while the object detection circuit 102 runs in the second fast or the slow sampling mode. It may be appreciated that a hardware failure occurring when the hardware fault detection circuit 1208 is inactive (e.g., e.g., during wireless power transfer when the fast sampling mode is active) may cause a change e.g., in an output $\underline{Z}'$, which may trigger the object detection circuit 102 and consequently a shut-down of the wireless power transfer. It may be also appreciated that a hardware fault that has occurred while the hardware fault detection circuit 1208 was inactive may be detected latest when the object detection circuit 102 is reactivated by the user or service personnel and an initial calibration routine (e.g., in the second fast sampling mode) is automatically executed. If a calibration (e.g., in the second fast sampling mode) is successful, the list of hardware issues may be cleared.

As previously discussed with reference to FIG. 12, temperature changes in a sense coil (e.g., sense coil 105n) or in sensitive components of the analog circuitry 301 may cause a measured impedance (e.g., $\underline{Z}_n$) to drift. A sense coil's temperature may change when the sense coil (e.g., sense coil 105n) is driven with a sense current (Joule heating effect) or whenever the temperature inside the wireless power transmit structure 224 changes. With reference to the circuit 900 of FIG. 9, such temperature drifts in a measured impedance (e.g., $\underline{Z}_n$) may cause a magnitude of an output (e.g., $\Delta \underline{Z}'_n$) of a time-differentiating filter 914 to increase and therefore unfavorably biasing the threshold detection circuit 922. This biasing effect may result in an increased false detection rate or a reduced object detection sensitivity. This may be particularly true if the object detection circuit 102 is operating in a slow sampling mode. In a slow sampling mode, temperature drifts may have a stronger impact than in a fast sampling mode as the drift relative to the sample rate is faster. Therefore, in some implementations or operations, the measurement and detection circuit 108 estimates and compensates for a temperature drift when operated in a slow sampling mode.

In further aspects, an abnormal drift in a measured impedance associated to at least one sense circuit (e.g., sense circuit 104n) may indicate a hardware issue e.g., a defective component in the sense circuit or in the analog circuitry 301. FIG. 13 shows time diagrams illustrating drift in example serial stream outputs 506 (corrected $\underline{M}_n$ samples 1106) of the sampling mode controller circuit 502 when operated in the slow sampling mode as previously described with reference to FIGS. 5, 10, and 11B. The top diagram illustrates example serial stream outputs 506 composed of blocks of $N_s$-1 (9) corrected $\underline{M}_n$ samples 1106 (indicated by a dashed line box), with a first block 1302-1 e.g., referring to sense circuit 104a, a second block 1302-2 e.g., referring to sense circuit 104b, a third block 1302-3 e.g., referring to sense circuit 104n, etc. as previously described with reference to FIGS. 10 and 11B. The bottom diagram illustrates drift of the magnitude of the corrected $\underline{M}_n$ samples in a continuous-time representation (e.g., $|\underline{M}_1(t)|$). More specifically, it illustrates drift during time periods corresponding to the periods of blocks 1302-1, 1302-2, 1302-3, 1302-4 shown in the top diagram. Drift curves 1304-1, 1304-2, and 1304-4 may refer to normal temperature drift as typically experienced in a sound hardware while drift curve 1304-3 may refer to an abnormal drift e.g., due to a defective component.

In certain implementations or operations, the drift in series of $\underline{M}_n$ samples is estimated on a per block basis (e.g., per $N_s$-1 samples) and drift estimates (e.g., drift estimate inputs 1224) are used by the hardware fault detection circuit 1208 configured to detect hardware issues as previously discussed with reference to FIG. 12. This feature may be also referred to as drift monitoring.

Outlier Cancellation Filter

Returning to circuit 900 of FIG. 9, the outlier cancellation filter 910 is configured to cancel potential outliers in each component (e.g., $\underline{Z}_n$) of the vector $\underline{Z}$, which is described in more detail for an example implementation that should be construed non-limiting. The following descriptions refer to the outlier cancellation filter 910 dedicated to the vector component $\underline{Z}_n$ (measured impedance associated e.g., to the sense circuit 104n) but may also apply to the (N−1) outlier cancellation filters 910 dedicated to the other (N−1) components.

Figure 14A:
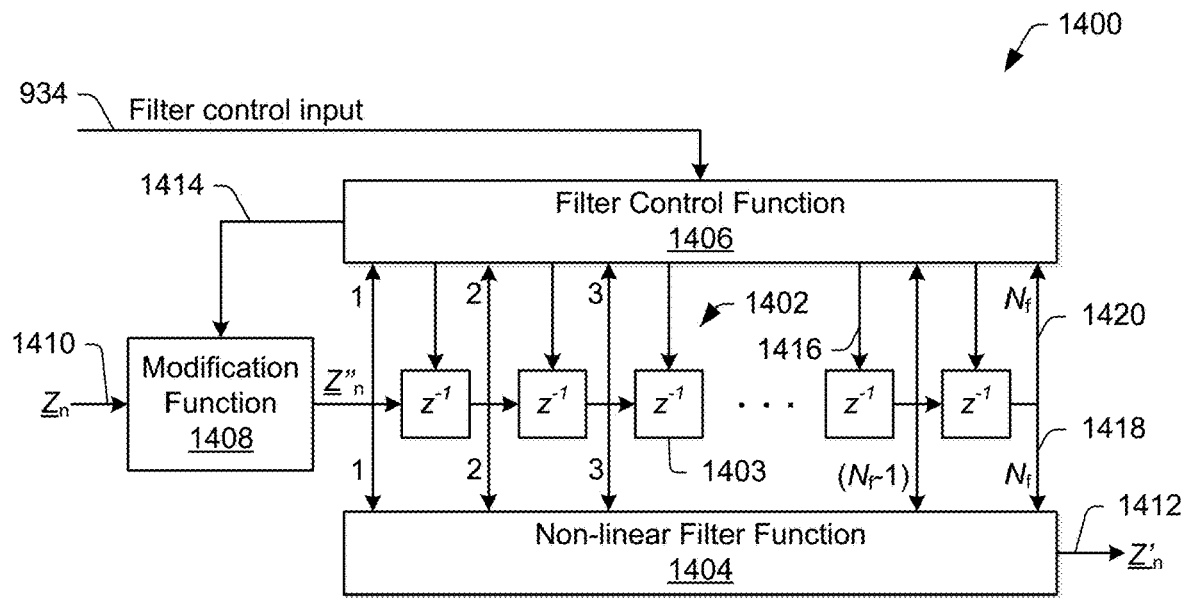
FIG. 14A is a block diagram illustrating an example implementation of an outlier cancellation filter shown in FIG. 9.

FIG. 14A illustrates a circuit 1400 of an example implementation of an outlier cancellation filter 910. The circuit 1400 includes a shift register 1402 (e.g., a tapped digital delay line) composed of ($N_f$-1) delay cells 1403 ($z^{-1}$), where the number $N_f$ is referred to as the shift register length, a non-linear filter function 1404 providing a plurality ($N_f$) of inputs 1418 (designated in FIG. 14A by numbers 1 to $N_f$), each connected to a respective tap of shift register 1402, a filter control function 1406, providing a plurality ($N_f$) of inputs 1420 (designated in FIG. 14A by numbers 1 to $N_f$), each also connected to a respective tap of the shift register 1402, and a plurality ($N_f$-1) of outputs 1416, each connected to a delay cell 1403 of shift register 1402. Further, it includes a modification function 1408 connected to the input of the shift register 1402 and to the output 1414 of the filter control function 1406. Further, the circuit 1400 provides an input 1410 ($\underline{Z}_n$) that is an input of the modification function 1408, a filter control input 934 that is an input of filter control function 1406 and that may correspond to filter control output 1824 of the circuit 1800 of FIG. 18. Finally, the circuit 1400 provides an output 1412 ($\underline{Z}'_n$) that is also an output of the non-linear filter function 1404. Depending on the implementation of the circuit 1400, blocks 1403, 1404, 1406, and 1408 may be electrically or logically interconnected as shown by the block diagram of FIG. 14A, and input and output ports may be physical (electrical) ports or just logical ports.

The modification function 1408 is configured to modify the input 1410 (complex samples $\underline{Z}_n$) as received from the sample converter circuit 906 based on input 1414 received from the filter control function 1406 and to provide complex output $\underline{Z}''_n$. Purpose and implementation of this modification function 1408 are further discussed below in more detail. The shift register 1402 is configured to store the last ($N_f$-1) consecutive complex samples $\underline{Z}''_n$ as received from the sample converter circuit 906 with reference to FIG. 9. Each time a new sample $\underline{Z}''_n$ enters the shift register 1402, the oldest sample drops out. The non-linear filter function 1404 is configured to determine, each time a new sample $\underline{Z}''_n$ enters the circuit 1400, the median value for the imaginary and the real part, separately, based on a number $N_f$ of complex samples $\underline{Z}''_n$.

The $N_f$ complex samples $\underline{Z}''_n$ that are considered in the non-linear filter function 1404 include the new sample $\underline{Z}''_n$ and the last ($N_f$-1) samples $\underline{Z}''_n$ temporarily stored in the shift register. A value that separates a set (e.g., $N_f$) of values into a lower subset and a higher subset with an equal number of members defines the median value. If the number (e.g., $N_f$) of values in the set is odd, there is one value (the middle value) in the set that defines the median value. If the number (e.g., $N_f$) of values in the set is even, the median value may be determined as the arithmetic mean of the value that is the highest of the lower half and the value that is the lowest of the higher half of the set of (e.g., $N_f$) values.

Accordingly, the non-linear filter function 1404 determines the median value (median(Im{$\underline{Z}''_n$})) and the median value (median(Re{$\underline{Z}''_n$})) of the imaginary parts (Im{$\underline{Z}''_n$}) and real parts (Re{$\underline{Z}''_n$}) of the set of $N_f$ complex samples $\underline{Z}''_n$, respectively. Further, the non-linear filter function 1404 is configured to compute the Euclidean distance D between each of the $N_f$ samples $\underline{Z}''_n$ and the complex median value (median(Re{$\underline{Z}''_n$})+j·median(Im{$\underline{Z}''_n$})), to rank the samples with respect to their Euclidean distance D, and to select the sample $\underline{Z}''_n$ with minimum Euclidean distance as the output 1412 ($\underline{Z}'_n$) of the non-linear filter function 1404 and thus of the outlier cancellation filter 910. This process of ranking and selection is repeated each time a new sample $\underline{Z}_n$ enters the outlier cancellation filter 910. Therefore, the rate of samples $\underline{Z}'_n$ at the output 1412 equals the rate of samples $\underline{Z}_n$ at the input 1410 of the outlier cancellation filter 910. It may be appreciated that this strategy may cancel potential outliers but may also cause repetitions of certain samples $\underline{Z}''_n$ in serial stream outputs 1412 ($\underline{Z}'_n$). It may be appreciated that in certain scenarios, a same sample $\underline{Z}''_n$ may be selected multiple times while it moves through the shift register. Such behavior of the outlier cancellation filter 910 may become more evident by contemplating FIG. 14B.

Figure 14B:
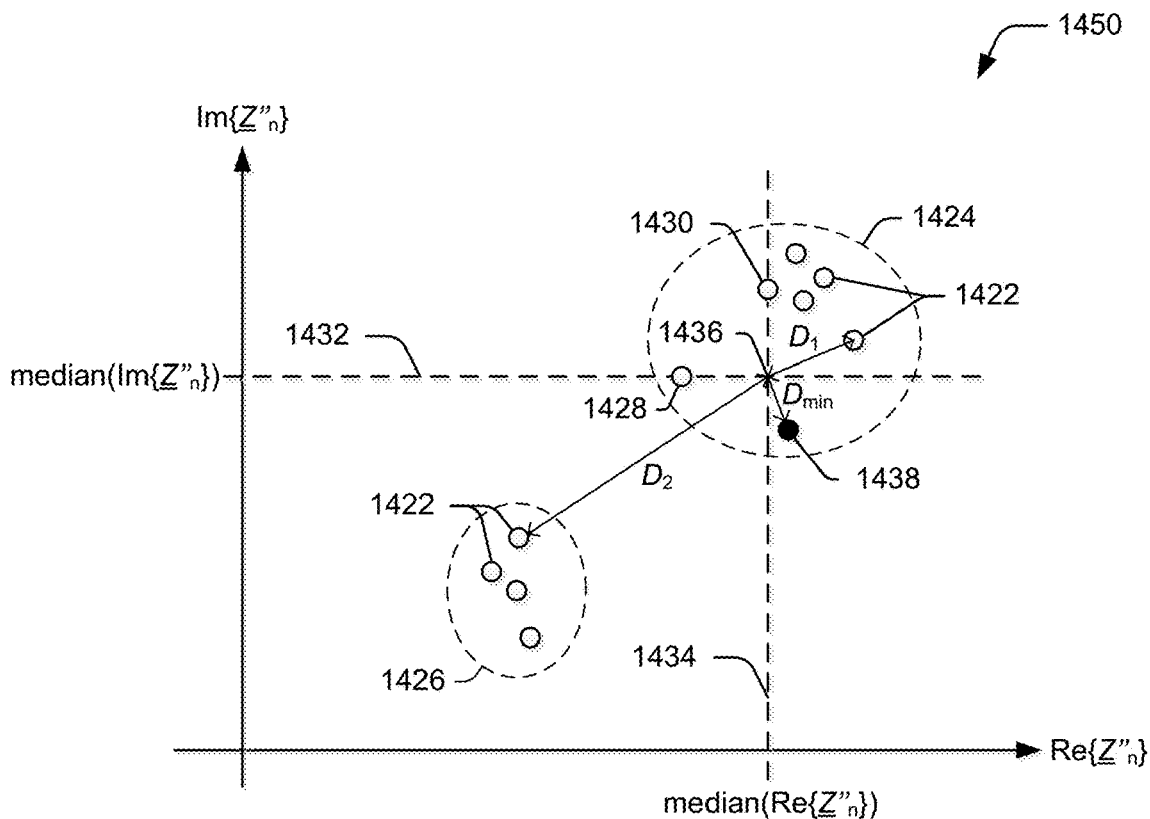
FIG. 14B shows a complex plane illustrating an example operation of the outlier cancellation filter of FIGS. 9 and 14A.

FIG. 14B illustrates the operation of the example implementation of the outlier cancellation filter 910 (circuit 1400) as described above with reference to FIG. 14A in the complex plane 1450 using an example set of $N_f$=11 complex samples 1422 ($\underline{Z}''_n$). The set of samples 1422 may be separated into two distinct clusters as indicated in FIG. 14B by enclosing dashed line circles. A first cluster 1424 includes seven samples 1422, while a second cluster 1426 includes four samples 1422 that may be potential outliers since they are a minority and clearly separated from the first cluster 1424. FIG. 14B also indicates a sample 1428, whose imaginary part determines the median(Im{$\underline{Z}''_n$}) (indicated by dashed line 1432) as described above for odd numbers $N_f$. Accordingly, FIG. 14B indicates a sample 1430, whose real part determines the median(Re{$\underline{Z}''_n$}) (indicated by dashed line 1434). The intersection of dashed lines 1432 and 1434 defines the complex median value 1436 (median(Re{$\underline{Z}''_n$})+j·median(Im{$\underline{Z}''_n$})).

Further, FIG. 14B indicates a first Euclidean distance $D_1$ between a sample 1422 of the first cluster 1424 and the complex median value 1436 and a second Euclidean distance $D_2$ between a sample 1422 of the second cluster 1426 and the complex median value 1436, which is considerably larger than the first distance $D_1$. It further displays sample 1438 (black sample) having minimum Euclidean distance $D_{min}$ to the complex median value 1436. In the example implementation discussed above, the sample 1438 is selected as the output 1412 ($\underline{Z}'_n$) of the outlier cancellation filter 910. As long as the complex median value 1436 remains inside or somewhere close to the first cluster 1424, none of the samples 1422 of the second cluster 1426 (potential outliers) will be selected and thus are ignored (cancelled). It may be appreciated that in certain cases adding a new sample 1422 to the first cluster 1424 and removing the oldest sample from the first cluster 1424 (shift register operation) may not significantly change the complex median value 1436 and thus the situation for the sample 1438 so that it may remain the sample with minimum Euclidean distance $D_{min}$. Therefore, the sample 1438 may be selected as output 1412 ($\underline{Z}'_n$) multiple times. However, as time evolves and more new samples $\underline{Z}_n$ stream into the outlier cancellation filter 910, the complex median value 1436 may move enough and therefore changing the situation for the sample 1438 such that another sample 1422 may become the output 1412 ($\underline{Z}'_n$).

FIG. 14B may also illustrate a scenario where an object (e.g., object 110) comes into proximity of the sense circuit 104n causing an abrupt change $\Delta \underline{Z}_n$ (step response) in a time-series of samples $\underline{Z}_n$. The samples 1422 of the first cluster 1424 may refer to the time before, while samples 1422 of the second cluster 1426 may refer to the time after the object has become proximate. (The scattering of samples 1422 in the two clusters may represent the effect of superimposed noise.) Based on the example implementation described above with reference to FIG. 14A, it may be appreciated that samples 1422 of the second cluster 1426 (indicating the object) will initially be considered as outliers. However, as time evolves while the object stays in proximity, the second cluster 1426 will successively grow until it gets majority pulling the median value 1436 to the second cluster 1426. At this point, a sample 1422 of the second cluster 1426 may become the sample with minimum Euclidean distance $D_{min}$ and thus an output 1412 ($\underline{Z}'_n$) reflecting the change $\Delta \underline{Z}'_n$ caused by the object with some delay.

For a step response (e.g., caused by an object) producing two distinct clusters (e.g., clusters 1424 and 1426), the delay $D_f$ introduced by the outlier cancellation filter 910 with an odd filter length $N_f$ may be quantified in terms of samples by the following equation:

$$D_f = \frac{N_f - 1}{2} \quad \text{Equation 3}$$

The corresponding time delay as resulting in the fast sampling mode with reference to FIGS. 10 and 11A may be expressed as $$T_f = D_f \cdot T_m \cdot \frac{N}{N_a} \quad \text{Equation 4}$$

using definitions provided in connection with FIG. 3. The corresponding time delay as resulting in the slow sampling mode with reference to FIGS. 10 and 11B may be written accordingly as $$T_f = D_f \cdot T_m \cdot \frac{N \cdot N_s}{N_a} \quad \text{Equation 5}$$

Depending on the sampling mode, the outlier cancellation filter 910 may be reconfigured during operation. For example, during fast sampling mode, the outlier cancellation filter 910 may be configured to enable detection of an object (e.g., object 110) within a detection time of one second or less. During slow sampling mode, however, the outlier cancellation filter 910 may be configured to cancel out the response of transient objects by not causing a trigger when a foreign object is added and removed (e.g., from the base pad's 224 surface) within a predefined duration of time, such as six seconds. Accordingly, the outlier cancellation filter 910 may be reconfigured during the slow sampling mode to a much longer filter length $N_f$ to enable it to cancel out longer periods of outliers. Thus, the length $N_f$ of the outlier cancellation filter 910 may be increased and the update rate is reduced in the slow sampling mode.

In an example, the outlier cancellation filter 910 operates in slow sampling mode with $N_s=10$, $N/N_a=16$, $T_m=10$ ms, and over a length $N_f$ of eleven such that eleven input samples are obtained, each being an average of a number ($N_s-1$) of nine corrected $\underline{M}_n$ samples, as described with respect to FIGS. 10 and 11B. Accordingly, more time passes between each input sample in slow sampling mode in comparison to fast sampling mode, where there may be no averaging and sample decimation. According to Equation 3, the outlier cancellation filter 910 introduces a delay $D_f$ of five samples to a response caused by an object (e.g., object 110), meaning that transient objects proximate to the sense circuit for a duration of less than five samples may not trigger the object detection circuit 102. Based on Equation 5 and the example parameter values given above, a delay $D_f$ of five samples in the slow sampling mode corresponds to a time $T_f$ of 8 s.

In an example fast sampling mode configuration with $N_s=1$, $N/N_a=16$, $T_m=10$ ms, a filter length $N_f$ of three, however, the outlier cancellation filter 910 introduces, according to Equation 4, a delay $D_f$ of one sample corresponding to a time $T_f$ of only 160 ms (Equation 4). Such short filter delay may be provided during active power transfer to avoid heating of an object that has the potential to heat up rapidly to hazardous temperatures if exposed to the alternating magnetic field of the wireless power transfer. Even a coin rolling over the base pad's 224 surface may be detected in fast sampling mode, which would interrupt wireless power transfer. As shown by example above, the slow sampling mode may introduce much longer delay without risk since power transfer is inactive and thus no induction heating of objects can occur. In one example, if a coin rolls onto the base pad 224 and remains on the base pad's 224 surface during slow sampling mode, the coin will trigger the object detection circuit 102 and the user or service personnel will be alerted. Wireless power transfer remains disabled until the object detection circuit 102 is manually reset by the user or service personnel after having visually inspected the base pad 224 and having removed the coin from its surface. However, if the coin continues rolling and rolls off the base pad 224 or is removed by a person within a time $T_f$ (e.g., 8 s), the response caused by the coin is considered as an outlier and thus discarded in the outlier cancellation filter 910.

Figure 18:
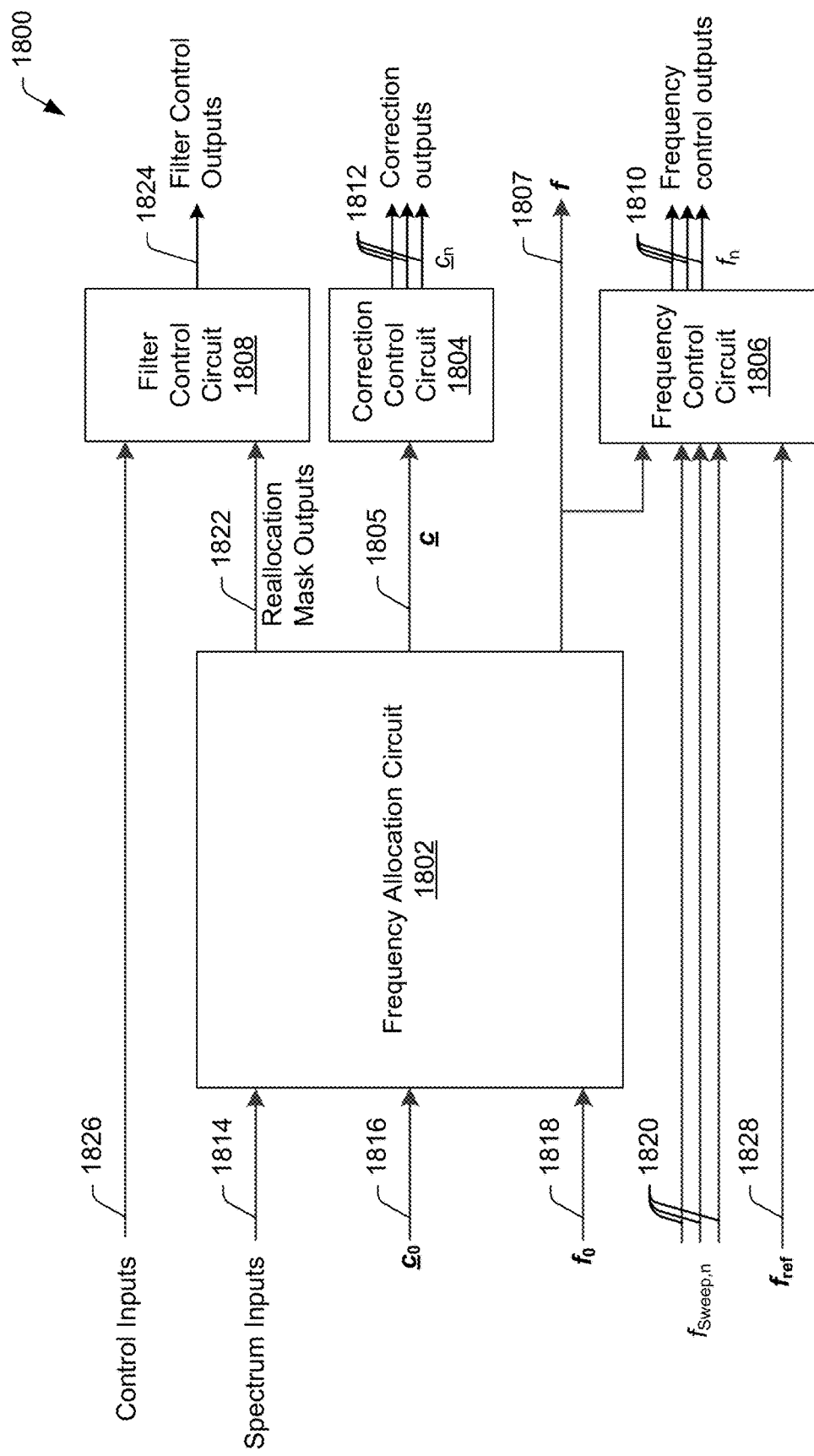
FIG. 18 is a block diagram illustrating an example implementation of a frequency allocation circuit.

As shown in FIGS. 9 and 14A, the outlier cancellation filter 910 is configured to receive filter control inputs 934, which may be filter control outputs 1824 with reference to FIG. 18. Depending on the filter control inputs 934, the outlier cancellation filter 910 operates normally or it changes the modification applied to the input 1410 ($\underline{Z}_n$) or it initializes its shift register 1402.

In an example, the outlier cancellation filter 910 initializes its shift register 1402 when request via the filter control input 934. A shift register 1402 initialization may be requested when the object detection circuit 102 is activated (or reactivated). More specifically, the filter control function 1406 is configured to initialize the shift register 1402 by filling each delay cell 1403 of the shift register 1402, via outputs 1416, with the first input sample ($\underline{Z}''_n$) received at its input 1420 (designated in FIG. 14A by number 1). Once the shift register 1402 is initialized, $N_f$ identical samples 1422 ($\underline{Z}''_n$) are applied to respective input 1418 of the non-linear filter function 1404. This initialization avoids a step response in outputs 1412 ($\underline{Z}'_n$) that may potentially cause a false detection. A step response would be produced, if the shift register 1402 was initially cleared (e.g., all cells filled with zero samples).

In further aspects, the outlier cancellation filter 910 may change (readjust) the modification that is applied to the inputs 1410 ($\underline{Z}_n$) upon a request received via the filter control input 934. A request for changing the modification may be sent to the outlier cancellation filter 910 e.g., in case of a frequency reallocation. Reallocation of a sense frequency (e.g., $f_n$) associated to a sense circuit (e.g., sense circuit 104n) may be necessary for purposes as explained in connection with FIG. 8. However, a frequency reallocation may provoke an abrupt change (step response) in time-series of measured impedances (e.g., $\underline{Z}_n$) potentially causing a false detection as previously discussed with reference to FIG. 8.

To avoid false detections e.g., caused by frequency reallocations, the outlier cancellation filter 910 is configured to substantially eliminate a potential change (step response) in its outputs 1412 ($\underline{Z}'_n$) when notified via the filter control input 934. More specifically, the filter control function 1406 is configured to detect and estimate a step based on the plurality of ($N_f$) inputs 1420 ($\underline{Z}''_n$) and to provide, based on the estimated step, a corresponding output 1414 to the modification function 1408 when notified via the filter control input 934. Based on output 1414, the modification function 1408 is readjusted such to substantially eliminate a step in outputs 1412 ($\underline{Z}'_n$).

In an example and with reference to FIGS. 14A and 14B, a step is detected if the Euclidean distance between a new sample 1422 ($\underline{Z}''_n$) entering the filter control function 1406 via input 1420 (1) and the complex median value 1436 exceeds a predetermined threshold. (Note that the complex median value 1436 may be provided by the non-linear filter function 1404 to the filter control function 1406). Further, in an example, the filter control function 1406 uses the complex difference (difference vector) (e.g., $\Delta\underline{Z}''_n$) between the complex median value 1436 and the complex sample 1422 ($\underline{Z}''_n$) whose Euclidean distance has exceeded the threshold as an estimate of the step and determines a corresponding output 1414 based on the complex difference (e.g., $\Delta\underline{Z}''_n$). In an example implementation, the modification function is a complex adder and the output 1414 is the negative complex difference (e.g., $-\Delta\underline{Z}''_n$). It may be appreciated that adding the negative complex difference (e.g., $-\Delta\underline{Z}''_n$) to all following samples $\underline{Z}_n$ entering the modification function 1408 will substantially eliminate a step e.g., provoked by a frequency reallocation, except the first sample 1422 (remainder) of the step whose Euclidean distance exceeded the threshold. This remainder, however, may appear as an outlier thus eliminated (cancelled) by the non-linear filter function 1404.

A modification as applied to inputs 1410 may not change until a new output 1414 (negative complex difference) is sent to the modification function. The filter control function 1406 may update its output 1414 upon notification via filter control input 934. With reference to FIG. 9, there is an outlier cancellation filter 910 dedicated to each vector component (e.g., $\underline{Z}_n$). In case of a reallocation of a frequency (e.g., $f_n$) associated to a sense circuit (e.g., sense circuit 104n), the circuit 1800 of FIG. 18 may notify, via filter control inputs 934, only those outlier cancellation filters 910 whose inputs (e.g., $\underline{Z}_n$) may be impacted by the frequency reallocation. Finally, it may be concluded that neither initialization nor changing the modification may cause false detections or blind times (e.g., times when a sense coil is inoperable to detect an object) of the object detection circuit 102.

Reference Tracking and Auto-Recovery

As previously discussed in connection with the fast and slow sampling mode, when using a time-differential detection scheme, the object detection circuit 102 may stay active and sensitive any time regardless whether an electric vehicle (e.g., electric vehicle 1902 with reference to FIG. 19) is parked over the wireless power transmit structure 224 (base pad) for charging. Nevertheless, it may be desirable that the object detection circuit 102 can manage short supply power outages or interruptions of operation so that it can be reactivated without the need of an on-site visual inspection by the user or service personnel. If an object (e.g., object 110) is introduced into the predetermined detection region while the object detection circuit 102 is temporarily deactivated, it may be more difficult to detect the object once the system is reactivated.

An aspect of a solution provided is to include tracking and storing a reference. A trade-off exists between an off-time and a probability of false detections when reactivating the object detection circuit 102. False detections may include false positive and false negative detections. False positive detections (false alarm) indicate presence of an object though there is no object, while false negative detections (misdetection) indicate absence of an object though there is an object (e.g., object 110) in the predetermined detection region. In case of a false positive detection (e.g., positive detection output 924 of the threshold detection circuit 922 of FIG. 9), the object detection circuit 102 reports a positive detection to a superordinate control circuit (not shown herein) that may prevent the wireless power transfer circuit 220 from restarting wireless power transfer after the off-time. In case of a false negative detection, the wireless power transfer circuit 220 may restart power transfer and thus may heat the undetected object.

Figure 15:
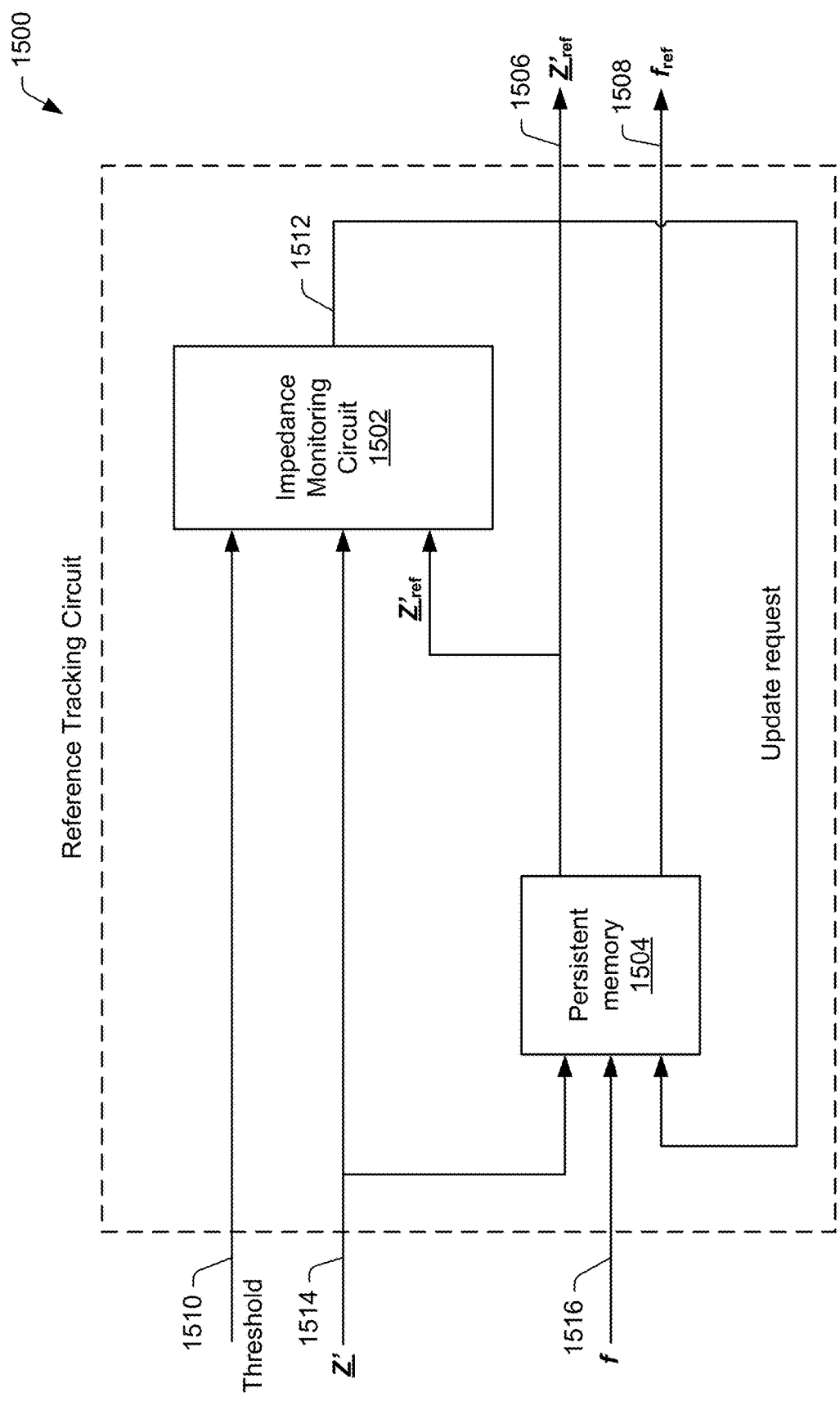
FIG. 15 is a block diagram illustrating an example implementation of a reference tracking circuit.

FIG. 15 is a block diagram of a circuit 1500 illustrating an example implementation of a reference tracking circuit that is a portion of the measurement and detection circuit 108 with reference to FIG. 1. The example reference tracking circuit 1500 includes an impedance monitoring circuit 1502 and a persistent memory 1504 (e.g., implemented as a non-volatile Random Access Memory (RAM) or the like). The impedance monitoring circuit 1502 is configured to receive impedance (vector) inputs 1514 (Z'), impedance reference (vector) outputs 1506 ($Z'_{ref}$), threshold input 1510 and to provide an update request output 1512.

Vector inputs 1514 (Z') may be vector outputs 908 (Z') with reference to FIG. 9. Vector outputs 1506 ($Z'_{ref}$) are outputs of persistent memory 1504, threshold input 1510 may be an output of a superordinate control circuit (not shown herein), and update request output 1512 is an input to the persistent memory 1504. Further, the persistent memory 1504 is configured to receive vector inputs 1514 (Z'), frequency vector inputs 1516 (f) that may correspond to vector outputs 1807 (f) with reference to FIG. 18, and the update request output 1512 of the impedance monitoring circuit 1502. Moreover, the persistent memory 1504 is configured to provide outputs corresponding to impedance reference (vector) outputs 1506 ($Z'_{ref}$) that may be vector inputs 1616 ($Z'_{ref}$) with reference to FIG. 16 and frequency reference (vector) outputs 1508 ($f_{ref}$) that may be frequency reference (vector) inputs 1828 ($f_{ref}$) with reference to FIG. 18.

Depending on the implementation of the circuit 1500 (e.g., hardware or software), blocks 1502 and 1504 may be electrically or logically interconnected as shown by the block diagram of FIG. 15, and input and output ports may be physical (electrical) ports or just logical ports. For purposes of illustration, the circuit 1500 may exclude additional control inputs and outputs as they may be required in a real implementation.

In aspects, while the object detection circuit 102 is active, the impedance monitoring circuit 1502 is configured to continuously compare the impedance vector inputs 1514 (Z') with the impedance reference vector outputs 1506 ($Z'_{ref}$) as stored in the persistent memory 1504 on a vector component basis. If at least one difference between a vector component of Z' and a corresponding vector component of $Z'_{ref}$ becomes greater than the applied threshold input 1510, the impedance monitoring circuit 1502 sends an update request to the persistent memory 1504 and the last impedance vector inputs 1514 (Z') become the new impedance reference vector outputs 1506 ($Z'_{ref}$) and the last frequency vector inputs 1516 (f) become the frequency reference vector outputs 1508 ($f_{ref}$). In case of an off-time of the object detection circuit 102 (e.g., due to a supply power outage) as previously discussed, the persistent memory 1504 holds the last reference vector outputs 1506 ($Z'_{ref}$) and the last frequency reference vector outputs 1508 ($f_{ref}$) as valid before the object detection circuit 102 was deactivated (powered-off). When the object detection circuit 102 returns to normal operation (e.g., after an off-time and successful auto recovery as discussed with reference to FIG. 16), the impedance monitoring circuit 1502 continues comparing vector inputs 1514 (Z') using the reference vector $Z'_{ref}$ as stored in the persistent memory 1504 as previously discussed. A change of a sense frequency (e.g., $f_n$) or a substantial drift in a measured impedance (e.g., $Z'_n$) may cause the threshold input 1510 to be exceeded and thus an update of persistent memory 1504.

Figure 16:
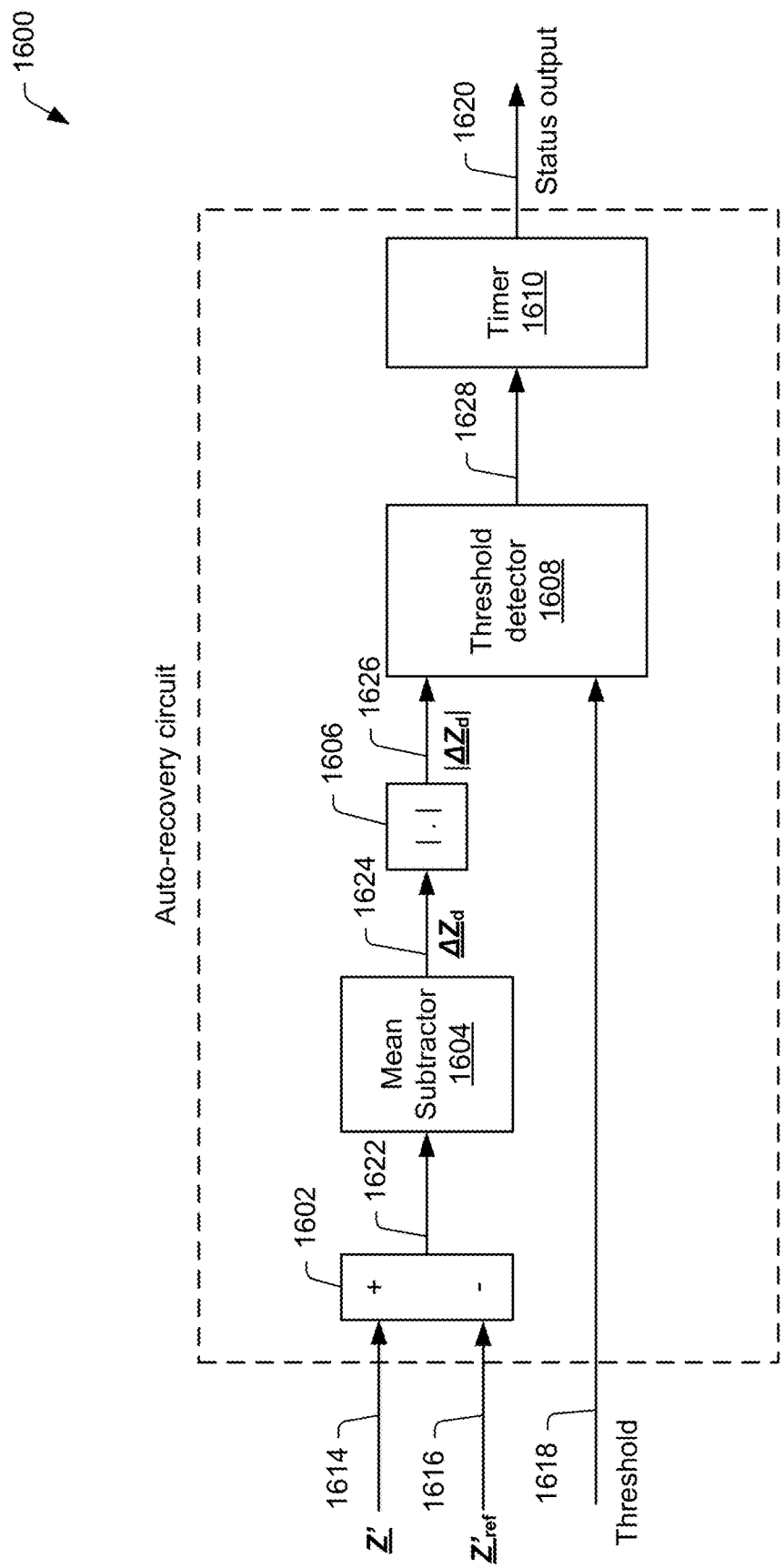
FIG. 16 is a block diagram illustrating an example implementation of an auto-recovery circuit.

FIG. 16 is a block diagram of a circuit 1600 illustrating an example implementation of an auto-recovery circuit that is another portion of the measurement and detection circuit 108 with reference to FIG. 1. The example auto-recovery circuit 1600 is configured to decide whether the object detection circuit 102 can return to normal operation after an off-time as previously discussed with reference to FIG. 15.

If the auto-recovery circuit 1600 concludes that some conditions are not satisfied, the object detection circuit 102 may not resume normal operation and a message may be sent to the user or service personnel requesting a visual inspection and manual restart of the object detection circuit 102. More specifically, the example auto-recovery circuit 1600 is further configured to provide a status output 1620 based on impedance (vector) inputs 1614 (Z') that may be vector outputs 908 (Z') of FIG. 9, impedance reference (vector) inputs 1616 ($Z'_{ref}$) that may be vector outputs 1506 ($Z'_{ref}$) of FIG. 15, and threshold input 1618 that may be an output of a superordinate control circuit (not shown herein).

In a first operation, vector inputs 1616 ($Z'_{ref}$) are subtracted from vector inputs 1614 (Z') in the subtractor circuit 1602 on a vector component basis. In a second operation, based on the difference vector outputs 1622 ($Z'-Z'_{ref}$), a mean difference is computed over all components of the difference vector outputs 1622 and subtracted from each of the components of the difference vector outputs 1622 in the mean subtractor circuit 1604. This results in vector outputs 1624 ($\Delta Z_d$), which are indicative of a differential drift in each of the measured impedances Z'. In a third operation, the magnitude of each component of vector outputs 1624 ($\Delta Z_d$) is computed in the magnitude circuit 1606. In a fourth operation, vector outputs 1626 ($|\Delta \underline{Z}_d|$) are compared against the threshold as defined by threshold input 1618 on a vector component basis in the threshold detector circuit 1608.

Output 1628 of the threshold detector circuit 1608 indicates whether at least one component of vector outputs 1626 ($|\Delta \underline{Z}_d|$) exceeds threshold input 1618. Finally, time-series of consecutive outputs 1628 of the threshold detector circuit 1608 are processed in a timer circuit 1610 to decide on a status output 1620 as further discussed below. The status output 1620 may be an input of a superordinate control circuit (not shown herein) of the object detection circuit 102. A positive status output 1620 may indicate that the conditions for resuming normal operation are not satisfied e.g., because differential drifts (e.g., $|\Delta \underline{Z}_{d,n}|$) of an impedance (e.g., $Z'_n$) exceed the threshold at time when the warm-up time elapses or because an object (e.g., object 110) entered the predetermined detection region during the off-time. In further aspects, a differential drift (e.g., $|\Delta \underline{Z}_{d,n}|$) exceeding the threshold may be also caused by a frequency reallocation carried out by the circuit 1800 of FIG. 18. Therefore, in some implementations, the object detection circuit 102 is configured to disable frequency reallocation while the auto-recovery circuit is active.

Depending on the implementation of the circuit 1600 (e.g., hardware or software), blocks 1602, 1604, 1606, 1608, and 1610 may be electrically or logically interconnected as shown by the block diagram of FIG. 16, and input and output ports may be physical (electrical) ports or just logical ports. For purposes of illustration, the circuit 1600 may exclude additional control inputs and outputs as they may be required in a real implementation.

In aspects, the auto-recovery circuit 1600 may be active immediately after a restart of the object detection circuit 102 (e.g., after an off-time) during a time window controlled by the timer circuit 1610. The length of this time window may be also referred to as the warm-up time (or warm-up phase). This warm-up time allows the object detection circuit to warm-up and stabilize before it runs in the normal operating mode. In some implementations or operations, the object detection circuit 102 is operated in the fast sampling mode as previously described with reference to FIGS. 10 and 11A during the warm-up phase.

During the warm-up phase (e.g., initialization sequence after supply power has returned), the object detection circuit 102 may check status output 1620 of the auto-recovery circuit 1600 to decide whether normal operation (e.g., object detection) can be resumed or the user or service personnel need to be alerted. More specifically, if a positive status output 1620 persists when the warm-up time elapses, the object detection circuit 102 may not resume normal operation and the user or service personnel is alerted. In some implementations, the status output 1620 is determined based on a short-term rate of positive outputs 1628 of the threshold detector circuit 1608. In certain cases, this rate may be higher in the beginning of the warm-up phase and may decrease towards the end of the warm-up phase. If this rate has dropped below a predetermined (e.g., a configurable) limit within the warm-up time, the timer circuit 1610 may provide a negative status output 1620, meaning that the object detection circuit 102 may resume normal operation. Conversely, if the rate has not decreased below this limit before the warm-up time has elapsed, the timer may provide a positive status output 1620 and the object detection circuit 102 may not resume normal operation. In some implementations, the short-term rate as a function of time is determined by counting the positive outputs 1628 within a sliding time window with a length that is a fraction of the warm-up time. A short-term rate may be determined for each shift of the sliding time window over the warm-up time.

Adaptive Frequency Allocation

As previously discussed with reference to FIGS. 3 and 12, the frequency (e.g., $f_n$) of the sense signal that is selectively applied to each of the sense circuits 104a, 104b, 104n may be allocated as close as possible to the respective resonance frequency (e.g., $f_{0,n}$) as given by design, but also, within some constraints, to a frequency providing maximum SNR. Particularly during wireless power transfer, certain frequencies that would negatively affect the sensitivity of the object detection circuit 102 may be avoided.

FIG. 17 is a frequency diagram to illustrate an example implementation of the frequency allocation process as jointly performed by the frequency tuning circuit 1204 and the frequency allocation circuit 1802 with reference to FIGS. 12 and 18, respectively. More specifically, FIG. 17 displays the magnitude of an example impedance function 1708 (|$\underline{Z}_n(f)$|) of a series-tuned sense circuit 104n in a range around its resonant frequency 1704 ($f_{0,n}$) and an example noise frequency spectrum 1712 overlay. The spectrum 1712 may be typical for the switching noise spectrum produced by a wireless power transfer circuit 220 with reference to FIG. 2A operating at a low frequency (e.g., 85 kHz)

The noise spectrum 1712 with a span 1720 ($f_{span}$) covers a range around $f_{0,n}$, which is further discussed below. This noise spectrum 1712 may be an output 325 of spectrum processing circuit 314 with reference to FIG. 3 and shows dominant peaks 1714, which may be associated to harmonics of the fundamental frequency (e.g., 85 kHz). Frequency selective noise may be produced by the wireless power transfer system 200 (e.g., switching noise) and may be magnetically and/or electrically coupled into the sense coils 105a, 105b, 105n. Switching noise may contain harmonics of the wireless power fundamental frequency (e.g., 85 kHz) and may reach up into the MHz range.

The magnitude of the example impedance function 1708 exhibits a minimum (indicated by (|$\underline{Z}_n|_{min}$) at a frequency 1704 that is by definition the resonant frequency $f_{0,n}$ and that may be an output 1220 of the resonance frequency search carried out by the frequency tuning circuit 1204 with reference to FIG. 12. Further, FIG. 17 indicates a lower and upper limit 1716 and 1718 (vertical dashes lines) offset by $-\Delta f_a$ and $+\Delta f_a$ from the resonant frequency 1704 ($f_{0,n}$), respectively, defining a frequency range 1706 that constrains frequency allocation. Therefore, it may be referred to as the frequency allocation range 1706. The width (2 $\Delta f_a$) of the frequency allocation range 1706 may be a trade-off between accuracy requirements not further discussed herein and room for finding an optimum frequency in a switching noise spectrum (e.g., noise spectrum 1712). In an example implementation, the width (2 $\Delta f$) of the frequency allocation range 1706 is 60 kHz.

Moreover, FIG. 17 indicates a frequency 1702 ($f_n$) e.g., found in a search for a spot providing maximum SNR (e.g., by avoiding harmonics frequencies associated with the dominant peaks 1714) within constraints given by the frequency allocation range 1706 and other operational constraints as discussed in more detail with reference to FIG. 18. The frequency 1702 ($f_n$) may be an output 1807 of the frequency allocation circuit 1802. As indicated in the displayed example spectrum 1712, this frequency 1702 ($f_n$) may correspond to the frequency with minimum noise level as measured in the bandwidth defined by low pass filter 420 with reference to FIG. 4 at a time the spectrum 1712 was captured and within the constraints mentioned above.

In other aspects, the frequency span 1720 of the spectrum analysis may be chosen to cover a range as determined by the plurality of resonant frequencies $f_{0,a}$, $f_{0,b}$, $f_{0,n}$, each associated to a respective sense circuit 104a, 104b, 104n, including some margin for the frequency allocation range 1706. To save processing power, some implementations use sense circuit-specific tuning capacitors configured to reduce the spread of the plurality of resonant frequencies and thus to reduce the span 1720 e.g., to less than 200 kHz.

Based on the spectrum outputs 325, an optimum sense frequency (e.g., $f_n$) close enough to the resonant frequency of a sense circuit (e.g., sense circuit 104n) may be determined individually for each of the plurality of sense circuits 104a, 104b, 104n by the frequency allocation circuit 1800 with reference to FIG. 18. The resulting set of frequencies (e.g., $f_a$, $f_b$, $f_n$) may avoid harmonics of the wireless power transfer operating frequency (e.g., 85 kHz) and other spectrum portions with increased noise spectral density. Some hysteresis may be implemented to avoid too often frequency reallocations in case of fluctuating noise.

If the same sense frequency 1702 is assigned to any two or more concurrently driven sense circuits 104a, 104b, 104n, mutual interference may be created as previously discussed with reference to FIG. 3. To avoid such interference, the frequency (e.g., $f_n$) associated to at least one sense circuit (e.g., sense circuit 104n) may be slightly shifted e.g., by the minimum frequency spacing $\Delta f$ as supported by the NCO 410 with reference to Equation 1. While passive beacon positioning is active, there may be additional constraints to the frequency allocation to ensure concurrent (non-impaired) operation of foreign object detection and positioning, e.g., such that false positive detections caused by the passive beacon response are avoided and sensitivity of foreign object detection is not impaired.

When passive beacon positioning is active, the choice of frequencies ensuring concurrent non-impaired operation may be reduced. This may be particularly true in implementations using a passive beacon transponder generating a square wave modulated impedance response with a fundamental frequency $f_{mod}$ (e.g., 5 kHz). In the frequency domain, a square wave modulated response exhibits the sense frequency (e.g., $f_n$) and two-sided modulation sidebands composed of the fundamental at $f_{mod}$ and a plurality of harmonics thereof. The following equations specify a set of frequencies (e.g., $f_{k,n}$, $k \in \{0, 1, 2, \ldots K_h\}$) associated to a first sense circuit (e.g., sense circuit 104n) to be additionally avoided when allocating a frequency to a second concurrently operated sense circuit (e.g., sense circuit 104a) when positioning is active:

$$f_{k,n} \neq f_n \pm k \cdot f_{mod}, \quad k \in \{0,1,2, \ldots K_h\} \qquad \text{Equation 6}$$

where the number $K_h$ may be defined as $$K_h \geq \frac{f_{span}}{2 f_{mod}} \qquad \text{Equation 7}$$

with $f_{mod}$ and $f_{span}$ as previously defined. Equation 6 and 7 may also apply when allocating a frequency to a third concurrently operated sense circuit (e.g., sense circuit 104b). In this case, the set of frequencies to be avoided may include e.g., $f_{k,n}$, $k \in \{0, 1, 2, \ldots K_h\}$ associated to the first sense circuit (e.g., sense circuit 104n) and $f_{k,a}$, $k \in \{0, 1, 2, \ldots K_h\}$ associated to the second sense circuit (e.g., sense circuit 104a). In this way, the frequency of the sense signal applied to the sense coils can be allocated by avoiding switching harmonics e.g., of the wireless power transfer and additionally modulation harmonics of the passive beacon response.

FIG. 18 is a block diagram illustrating an example implementation of a circuit 1800 that is a portion of the measurement and detection circuit 108 with reference to FIG. 1. The circuit 1800 includes a frequency allocation circuit 1802, a correction control circuit 1804, a frequency control circuit 1806, and a filter control circuit 1808. The circuit 1800 is configured to receive vector inputs 1816 ($\underline{c}_0$) and 1818 ($f_0$), which may correspond to vector outputs 1216 ($\underline{c}_0$) and 1212 ($f_0$), respectively, with reference to the circuit 1200 of FIG. 12. Further, the circuit 1800 is configured to receive spectrum inputs 1814, control inputs 1826, a plurality (e.g., $N_a$) of serial stream inputs 1820 ($f_{sweep,n}$), frequency reference inputs 1828 ($f_{ref}$) and to provide a plurality (e.g., $N_a$) of correction (serial stream) outputs 1812 ($c_n$), a plurality (e.g., $N_a$) of frequency control (serial stream) outputs 1810 ($f_n$), frequency control (vector) outputs 1807 (f), and filter control (vector) outputs 1824.

Spectrum inputs 1814 may correspond to spectrum outputs 325 with reference to the circuit 300 of FIG. 3, reference frequency (vector) inputs 1828 ($f_{ref}$) may be reference vector outputs 1508 ($\underline{f}_{ref}$) with reference to FIG. 15, while serial stream inputs 1820 ($f_{sweep,n}$) may correspond to serial stream outputs 1210 ($f_{sweep,n}$) (f with reference to FIG. 12. Control inputs 1826 may be outputs from a superordinate control circuit (not shown herein). Serial stream outputs 1812 ($c_n$) and 1810 ($f_n$) may correspond to correction inputs 324 and frequency control inputs 328, respectively, with reference to the circuit 300 of FIG. 3.

Frequency control (vector) outputs 1807 (f) may be vector inputs to the reference tracking circuit 1500 Filter control (vector) outputs 1824 may correspond to filter control (vector) inputs 934 with reference to the circuit 900 of FIG. 9. Inputs 1814, 1816, 1818 are also inputs to the frequency allocation circuit 1802 that is also configured to provide reallocation mask (vector) outputs 1822 to the filter control circuit 1808, vector outputs 1805 ($\underline{c}$) to the correction control circuit 1804, and vector outputs 1807 (f) to the frequency control circuit 1806. Further, the filter control circuit 1808 is configured to provide filter control (vector) outputs 1824.

The correction control circuit 1804 is configured to provide the plurality of correction outputs 1812 ($c_n$) based on inputs including the vector outputs 1805 ($\underline{c}$), while the frequency control circuit 1806 is configured to provide frequency control outputs 1810 ($f_n$) based on vector outputs 1807 (f) and serial stream inputs 1820 ($f_{sweep,n}$). Depending on the implementation of the circuit 1400 (e.g., hardware or software), blocks 1802, 1808, 1804, and 1806 may be electrically or logically interconnected as shown by the block diagram of FIG. 18, and input and output ports may be physical (electrical) ports or just logical ports. For purposes of illustration, the circuit 1800 may exclude additional control inputs and outputs as they may be required in a real implementation.

The frequency allocation circuit 1802 is further configured to allocate (or reallocate) the frequency (e.g., $f_n$) of each of the plurality of sense signals selectively applied to respective sense circuits 104a, 104b, 104n and to provide vector output 1807 (f). Frequency allocation is based on vector inputs 1818 (plurality of resonant frequencies $f_0$) e.g., provided by the circuit 1200 of FIG. 12 and may be performed as previously discussed with reference to FIG. 17. The frequency allocation circuit 1802 is also configured to adapt correction values (e.g., $c_{0,n}$) as determined at the resonant frequency (e.g., $f_{0,n}$) of a respective sense circuit (e.g., sense circuit 104n) to the effective sense frequency (e.g., $f_n$) chosen by the frequency allocation circuit 1802. This adaptation (or modification) takes the frequency offset (e.g., $f_n - f_{0,n}$) and the complex impedance function 1708 into account. Further, the frequency allocation circuit 1802 is configured to provide reallocation mask outputs 1822 indicating those sense circuits 104n whose sense frequency (e.g., $f_n$) may be temporarily affected by a frequency reallocation e.g., with respect to an impedance change or a change of an intermodulation product as previously discussed with reference to FIG. 8.

The filter control circuit 1808 is configured to generate filter control outputs 1824 (e.g., used to control the outlier cancellation filter 910 with reference to FIG. 9) based on reallocation mask outputs 1822 and control inputs 1826. The correction control circuit 1804 is configured to convert parallel (vector) outputs 1805 ($\underline{c}$) to the plurality (e.g., $N_a$) of correction serial outputs 1812 ($c_n$) as needed e.g., by the circuit 300 of FIG. 3. Further, the frequency control circuit 1806 is configured to convert the parallel (vector) outputs 1807 (f) into the plurality (e.g., $N_a$) of frequency control serial stream outputs 1812 ($\underline{f}_n$) as needed e.g., by the circuit 300 of FIG. 3. It is also configured to insert sweep frequency control samples into serial stream outputs 1810 as needed e.g., in the slow sampling mode with reference to FIGS. 10 and 11B. In the slow sampling mode, sweep frequency control samples are used e.g., by the circuit 300 of FIG. 3 to control the NCO 410 frequency in the measurement intervals associated to raw $\underline{M}_n$ samples 1108 as discussed with reference to FIG. 11B. Moreover, it is configured to use and convert frequency reference (vector) inputs 1828 ($f_{ref}$) to generate frequency control outputs 1810 immediately after the object detection circuit 102 is activated (or reactivated) e.g., after a supply power outage.

Sense Coil Fault Detection

A sense coil (e.g., sense coil 105n) e.g., of the sense coil array 106 may be defective or inoperable to detect an object for a variety of reasons. For example, poor soldering, an electrical defect, or a mechanical defect can cause a sense coil to short-circuit or become an open-circuit. Both cases can be detected e.g., by measuring the magnitude impedance (or admittance) of the sense circuit (e.g., sense circuit 104n)

and by checking whether the measured value is in a valid range (integrity check). In some implementations based on series-tuned sense circuits, the valid impedance range at series resonance may be the range from 3Ω to 5Ω. A measured value in this range may indicate integrity of a sense coil (e.g., sense coil 105*n*). As previously discussed with reference to the hardware fault detection circuit 1208 of FIG. 12, a defective sense coil may be also detected by a resonant frequency that is outside a valid range or by a drift that exceeds a predefined maximum drift. No foreign objects (e.g., object 110) may be detectable, however, on short-circuited sense coils. If a short-circuited sense coil exists, the base pad's housing (e.g., housing 236 with reference to FIG. 2B) may get damaged during power transfer due to excessive induced current and consequent heating of the sense coil's electrically conducting structure.

An open-circuited sense coil (e.g., sense coil 105*n*) can be detected based on a resonant frequency (e.g., $f_{o,n}$) that is outside a predetermined valid range (e.g., 2.5 MHz to 3.5 MHz) or by a measured magnitude impedance that exceeds the upper limit of the valid range as mentioned above or by a drift that exceeds a predetermined maximum drift. No foreign objects may be detectable by an open-circuited sense coil. However, there may be no risk for damaging the base pad (e.g., base pad 224) during power transfer. If a sense coil (e.g., sense coil 105*n*) or a sense circuit (e.g., sense circuit 104*n*) is defective for other reasons, the resonance frequency may be out of range. However, foreign objects (e.g., object 110) may still be detectable with such a sense coil, but with reduced sensitivity. In some cases, a failure e.g., in the AFE circuit 307 or a defective tuning capacitor may also cause an effect similarly to a defective sense coil and may produce a positive fault detection output 1214 with reference to the circuit 1200 of FIG. 12. It is noted that any of above ranges are used as examples only, and that they depend on the design of the sense coil array 106 and its integration into the base pad 224.

Example Wireless Power Transfer System

Figure 19:
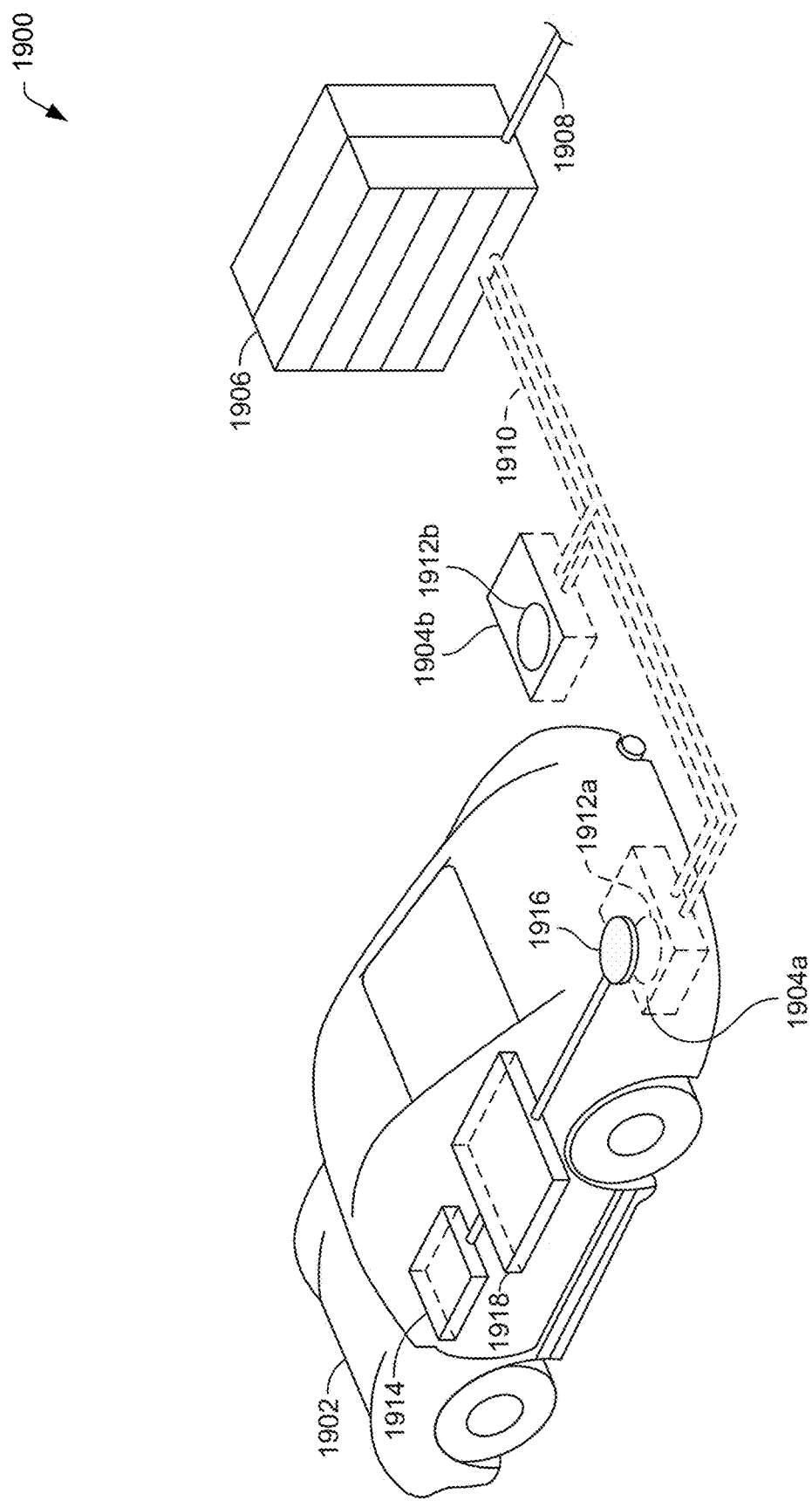
FIG. 19 is a perspective view illustrating a wireless power transfer system for charging an electric vehicle in which any of the elements/functionality described with reference to FIGS. 1-18 may be implemented.

FIG. 19 illustrates a wireless power transfer system 1900 for charging an electric vehicle in which any of the elements/functionality described with reference to FIGS. 1-18 may be implemented.

The wireless power transfer system 1900 enables charging of an electric vehicle 1902 while the electric vehicle 1902 is stationary so as to wirelessly couple power from a base wireless power charging apparatus 1904*a*. The base wireless power charging apparatus 1904*a* may correspond to the wireless power transfer circuit 220 as described with reference to FIG. 2A (e.g., and particularly incorporate the wireless power transmit structure 224 shown in FIG. 2B). Spaces for two electric vehicles are illustrated in a parking area to be parked over corresponding base wireless power charging apparatuses 1904*a* and 1904*b*. In some implementations, a local distribution center 1906 may be connected to a power backbone 1908 and configured to provide an alternating current (AC) or a direct current (DC) supply through a power link 1910 to the base wireless power transfer apparatuses 1904*a* and 1904*b*. Each of the base wireless power transfer apparatuses 1904*a* and 1904*b* also includes a base-side coil 1912*a* and 1912*b* for wirelessly transferring power. The base-side coil 1912*a* and 1912*b* may correspond to the coil 226 of the base wireless power transmit structure 224 as described with reference to FIGS. 2A and 2B. As described above any of the object detection circuits described above with respect to FIGS. 1-18 may be integrated into the base wireless power transfer apparatuses 1904*a* and 1904*b* (or likewise certain or all aspects of the object detection circuits may be implemented on a vehicle side with an electric vehicle wireless charging unit 1918).

The electric vehicle 1902 may include a battery unit 1914, an electric vehicle-side coil 1916, and an electric vehicle wireless charging unit 1918. The electric vehicle coil 1916 may correspond to the coil 266 of the wireless power receive structure 260 with reference to FIG. 2B. The electric vehicle wireless charging apparatus may correspond to the wireless power transfer circuit 220 of FIG. 2A (e.g., and particularly incorporate the wireless power receive structure 260 shown in FIG. 2B).

The vehicle-side coil 1916 may receive power when the vehicle-side coil 1916 is located in an electromagnetic field produced by the base-side coil 1912*a* or 1912*b*. The field may correspond to a region where energy output by the base-side coil 1912*a* may be captured by the vehicle-side coil 1916. For example, the energy output by the base-side coil 1912*a* may be at a level sufficient to charge or power the electric vehicle 1902.

In some implementations, the electric vehicle coil 1916 may be aligned e.g., with the base coil 1912*a* and, therefore, disposed within a near-field region simply by the electric vehicle operator positioning the electric vehicle 1902 such that the electric vehicle coil 1916 is sufficiently aligned relative to the base coil 1912*a*.

Base wireless charging units (e.g., 1904*a*) may be located in a variety of locations. As non-limiting examples, some suitable locations include a parking area at a home of the electric vehicle 1902 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention or manipulation thereby improving convenience to a user. There may also be no exposed electrical contacts and no mechanical wear out, thereby improving reliability of the wireless power transfer system 1900. Safety may be improved since manipulations with cables and connectors may not be needed and there may be no cables, plugs, or sockets to be exposed to moisture in an outdoor environment. In addition, there may also be no visible or accessible sockets, cables, or plugs, thereby reducing potential vandalism of power charging devices. Further, since the electric vehicle 1902 may be used as distributed storage devices to stabilize a power grid, a convenient docking-to-grid solution may help to increase availability of vehicles for vehicle-to-grid (V2G) operation.

Figure 20:
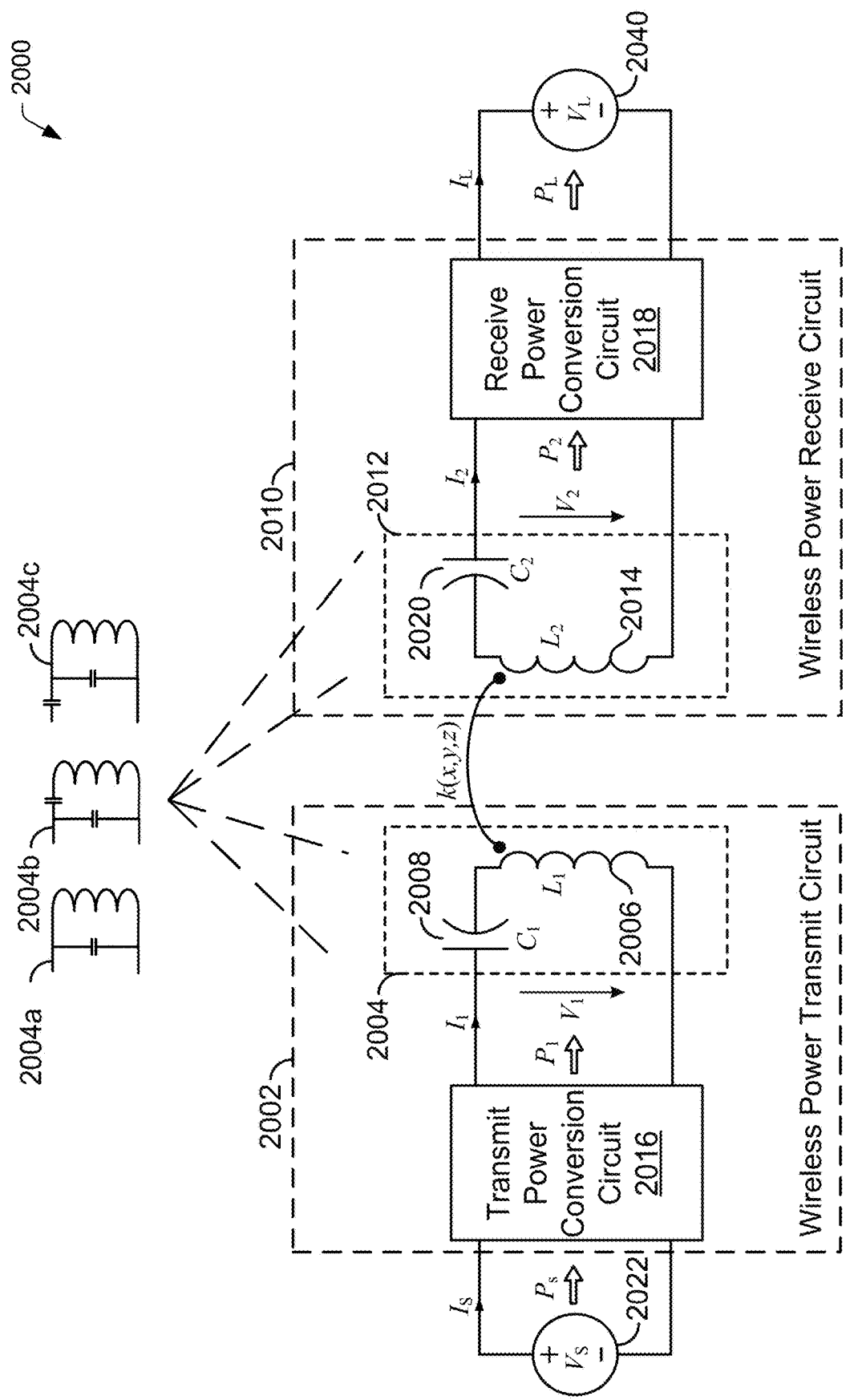
FIG. 20 is a schematic view illustrating an example implementation of a wireless power transfer apparatus that may be part of the wireless power transfer system of FIG. 19.

FIG. 20 is a schematic view illustrating an example implementation of a wireless power transfer system 2000 that may be a portion of the wireless power transfer system 1900 of FIG. 19. The wireless power transfer system 2000 of FIG. 20 includes a wireless power transmit circuit 2002. The wireless power transmit circuit includes a transmit resonant circuit 2004 including a transmit coil 2006 having an inductance $L_1$. The transmit coil 2006 may correspond to the wireless power transfer coil 226 with reference to FIG. 2A or 2B.

The wireless power transfer system 2000 further includes a wireless power receive circuit 2010. The wireless power receive circuit 2010 includes a receive resonant circuit 2012 including a receive coil 2014 having an inductance $L_2$. The receive coil 2014 may correspond to the wireless power transfer coil 266 with reference to FIG. 2B. Implementations described herein may use capacitively loaded conductor loops (e.g., multi-turn coils) forming a resonant structure that is capable of more efficiently coupling energy from a primary structure (transmitter) to a secondary structure (receiver) via a magnetic or electromagnetic near-field (e.g., where both the transmit resonant circuit 2004 and the receive resonant circuit 2012 are tuned substantially to a common resonant frequency). Using resonant structures for coupling energy may be referred to as "magnetically coupled resonance," "electromagnetically coupled resonance," and/or "resonant induction."

With reference to FIG. 20, a power supply 2022 (e.g., AC or DC) with a voltage $V_S$ supplies power $P_S$ to the transmit power conversion circuit 2016. In some implementations, the transmit power conversion circuit 2016 includes circuitry such as an AC-to-DC converter configured to convert power from standard mains AC to DC power at a suitable DC voltage level, and a DC-to-AC frequency converter configured to convert DC power to power at an operating frequency $f_{wpt}$ suitable for wireless high power transfer (e.g., at 85 kHz). In some implementations, the transmit power conversion circuit 2016 includes an inverter amongst other circuitry for regulating the current $I_S$ drawn from the power supply 2022, the current $I_1$ in the transmit resonant circuit 2004, the voltage $V_1$ across the transmit resonant circuit 2004, and the power $P_1$ supplied to the transmit resonant circuit 2004. The transmit resonant circuit 2004 includes a tuning capacitor 2008 with capacitance $C_1$ in series with the transmit coil 2006 to compensate for the reactance of the transmit coil 2006 substantially at the operating frequency $f_{wpt}$. When excited by a current $I_1$, the transmit coil 2006 generates a magnetic field at the operating frequency $f_{wpt}$.

While the transmit resonant circuit 2004 is shown as series-tuned this should be considered as just one example implementation. Resonant circuits 2004a, 2004b, and 2004c provide just a few examples of other resonant topologies of parallel tuned, parallel series tuned, and the like. Other implementations may use further reactive components such as further capacitors or additional inductors (e.g., for filtering/matching and other purposes to form other topologies—e.g., LCL-topology, etc.). The transmit coil 2006 receives the power $P_1$ from the transmit power conversion circuit 2016 (e.g., AC current is driven into the transmit coil 2006) and wirelessly transmits power at a level sufficient to charge or power a load connected to the wireless power receive circuit 2018. For example, the level of power provided wirelessly by the transmit coil 2006 may be on the order of kilowatts (kW) (e.g., anywhere from 1 kW to 110 kW, although actual levels may be higher or lower).

The receive coil 2014 may be positioned within the near-field of the transmit coil 2006. In this case, the transmit coil 2006 and the receive coil 2014 may become wirelessly coupled (e.g., via a magnetic field) to one another such that power may be transferred wirelessly from the transmit coil 2006 to the receive coil 2014.

The tuning capacitor 2020 (e.g., series capacitor) with capacitance $C_2$ may be provided to form a receive resonant circuit 2004 with the receive coil 2014 having an inductance $L_2$ that resonates substantially at the operating frequency $f_{wpt}$. The series-tuned receive resonant circuit 2012 should be construed as being exemplary and other resonant topologies may be used similarly as described with the transmit resonant circuit 2004 (e.g., with respect to resonant circuits 2004a, 2004b, and 2004c to form any combination of parallel or series topology).

FIG. 20 also indicates magnetic field coupling between transmit coil 2006 and receive coil 2014 with a coupling coefficient $k(x,y,z)$ that is a function of the vertical separation (z) and horizontal displacement (x,y). If sufficiently coupled to the transmit coil 2006, the receive resonant circuit 2012 receives and provides the power $P_2$ to a receive power conversion circuit 2018 of the wireless power receive circuit 2010. An electrical current in the receive resonant circuit 2012 is represented by $I_2$ and a voltage across the receive resonant circuit 2012 is represented by $V_2$.

The receive power conversion circuit 2016 may include, among other things, an AC-to-DC converter configured to convert power at an operating frequency back to DC power at a voltage $V_L$ of the load 2040 that may represent a battery unit. In some implementations, the receive power conversion circuit 2018 includes a rectifier amongst other circuitry (e.g., DC-DC converter) for regulating the current $I_2$ in the receive coil 2014), the voltage $V_2$ across the receive resonant circuit 2012, the current $I_L$ and the power $P_L$ supplied to the load 2040.

The transmit power conversion circuit 2016 and/or the transmit resonant circuit 2004 may further include other matching and/or filter circuitry configured to match impedances between the transmit resonant circuit 2004 and the transmit power conversion circuit 2016 and provide other filter functions (e.g., harmonics filtering). Other amplifiers/oscillators and other circuitry for driving the transmit coil 2006 with the appropriate current/voltage is also contemplated. Likewise, the receive power conversion circuit 2018 and/or the receive resonant circuit 2012 may also include similar matching and/or filter circuitry.

While the term "coil" is used above, the transmit coil 2006 and the receive coil 2014 may also correspond to other forms of power transfer elements. As such, the term "coil" is intended to refer to a component that may wirelessly output or receive energy for coupling to another "coil." However, in particular exemplary implementations the transmit coil 2006 and the receive coil 2014 are configured as coils of wire (e.g., Litz wire) and be configured as "conductor loops", and more specifically, "multi-turn conductor loops."

While an example has provided for the implementations described herein to be part of an electric vehicle charging system, other these techniques/implementations described with reference to FIGS. 1-20 may be used for other applications.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general-purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The bus may also link various other circuits such as timing sources, peripherals, voltage regulators, power management circuits, and the like.

Although subject matter has been described in language specific to structural features or methodological operations, it is to be understood that the subject matter defined in the appended claims is not necessarily limited to the specific features or operations described above, including not necessarily being limited to the organizations in which features are arranged or the orders in which operations are performed.

What is claimed is:

1. An apparatus for detecting an object, comprising:
a plurality of sense coils in a power-transfer system;
drive circuitry electrically connected to the plurality of sense coils and configured to selectively apply a signal at an operating frequency to each of the plurality of sense coils;
a detection circuit configured to:
generate one or more sample values indicative of an impedance at one or more of the plurality of sense coils based on the selective application of the signal at the operating frequency to each of the plurality of sense coils by the drive circuitry; and
adjust a parameter associated with a processing of the one or more sample values based on whether power transfer by the power-transfer system is active or inactive.

2. The apparatus of claim 1, wherein the parameter corresponds to a sampling mode.

3. The apparatus of claim 1, wherein one or more of the one or more sample values are averaged in response to determining that the power transfer is inactive.

4. The apparatus of claim 1, wherein the parameter corresponds to at least one of a sample rate or an amount of a time the object is present as indicated by the one or more sample values or a combination thereof.

5. The apparatus of claim 1, wherein the detection circuit comprises an outlier cancellation filter, and wherein the parameter comprises a filter length of the outlier cancellation filter.

6. The apparatus of claim 5, wherein the filter length is increased in response to determining that power transfer is inactive.

7. The apparatus of claim 1, wherein:
the parameter comprises a sampling rate for generating the one or more sample values; and
the detection circuit is further configured to adjust the sampling rate for generating the one or more sample values based on whether the power transfer by the power-transfer system is active or inactive.

8. The apparatus of claim 1, wherein:
the detection circuit comprises an outlier cancellation filter configured to cancel out one or more of the one or more sample values that are within a time window; and
a length of the time window is based on whether the power transfer is active or inactive.

9. A method for detecting an object, the method comprising:
selectively applying a signal at an operating frequency to each of a plurality of sense coils of a power-transfer system;
generating one or more sample values indicative of an impedance at one or more of the plurality of sense coils based on the selective application of the signal at the operating frequency to each of the plurality of sense coils; and
adjusting a parameter associated with a processing of the one or more sample values based on whether power transfer by the power-transfer system is active or inactive.

10. The method of claim 9, wherein the parameter corresponds to a sampling mode.

11. The method of claim 9, further comprising averaging one or more sample values in response to determining that the power transfer is inactive.

12. The method of claim 9, wherein the parameter corresponds to at least one of a sample rate or an amount of a time the object is present as indicated by the one or more sample values or a combination thereof.

13. The method of claim 9, further comprising canceling out one or more of the sample values that are within a time window having a length based on whether the power transfer is active or inactive.

14. The method of claim 9, further comprising:
determining that the power transfer is inactive; and
responsive to determining that the power transfer is inactive, increasing a filter length of an outlier cancellation filter.

15. The method of claim 9, wherein:
the parameter comprises a sample rate for generating the one or more sample values; and
the method further comprises adjusting the sample rate for generating the one or more sample values based on whether the power transfer by the power-transfer system is active or inactive.

16. An apparatus for detecting an object, comprising:
a plurality of sense coils in a power-transfer system;
drive circuitry electrically connected to the plurality of sense coils and configured to selectively apply a signal at an operating frequency to each of the plurality of sense coils;
a detection circuit, the detection circuit configured to:
generate one or more values indicative of an impedance at one or more of the plurality of sense coils based on the selective application of the signal at the operating frequency to each of the plurality of sense coils;
store at least one of the one or more values in a memory;
compare at least another of the one or more values to the at least one of the one or more values stored in the memory;

in response to detecting a power outage event; or
as part of an initialization sequence that determines whether the at least one of the one or more values is stored in the memory; and
determine whether the object is proximate to at least one of the plurality of sense coils based on at least the comparison of the at least another of the one or more values to the at least one of the one or more values stored in the memory.

17. The apparatus of claim 16, wherein the detection circuit is configured to compare a difference between the at least another of the one or more values and the at least one of the one or more values to a threshold input.

18. The apparatus of claim 17, wherein the detection circuit is further configured to update the at least one of the one or more values stored in the memory with the at least another of the one or more values in response to the difference being greater than the threshold parameter.

19. The apparatus of claim 17, wherein the memory comprises a non-volatile memory.

20. The apparatus of claim 17, wherein the detection circuit is further configured to, as part of the initialization sequence:
  determine a rate of outputs of a threshold detector circuit;
  check the rate of outputs within a time window against a predetermined rate limit within the time window to detect whether the object is proximate to the plurality of sense coils.

21. The apparatus of claim 20, wherein if the rate of outputs is less than the predetermined rate limit, the detection circuit enables operation of a foreign object detection system to resume.

22. The apparatus of claim 17, wherein if the rate of outputs is greater than the predetermine rate limit, the detection circuit triggers a detection of the object.

23. A method of detecting an object, the method comprising:
  selectively applying a signal at an operating frequency to each of a plurality of sense coils of a power-transfer system;
  generating one or more values indicative of an impedance at one or more of the plurality of sense coils based on the selective application of the signal at the operating frequency to each of the plurality of sense coils;
  storing at least one of the one or more values in a memory;
  comparing at least another of the one or more values to the at least one of the one or more values stored in the memory;
    in response to detecting a power outage event; or
    as part of an initialization sequence that determines whether the at least one of the one or more values is stored in the memory; and
  determining whether the object is proximate to at least one of the plurality of sense coils based on at least the comparison of the at least another of the one or more values to the at least one of the one or more values stored in the memory.

24. The method of claim 23, further comprising comparing a difference between the at least another of the one or more values and the at least one of the one or more values to a threshold parameter.

25. The method of claim 24, further comprising updating the at least one of the one or more values stored in the memory with the at least another of the one or more values in response to the difference being greater than the threshold parameter.

26. The method of claim 23, further comprising, as part of the initialization sequence:
  determining a rate of outputs of a threshold detector circuit;
  checking the rate of outputs within a time window against a predetermined rate limit within the time window to detect whether a metal object is proximate to the plurality of sense coils.

27. The method of claim 26, further comprising enabling operation of a foreign object detection system to resume if the rate of outputs is less than the predetermined rate limit.

28. The method of claim 23, further comprising triggering a detection of a metal object if the rate of outputs is greater than the predetermined rate limit.

29. The method of claim 23, wherein the memory comprises a non-volatile memory.

30. The method of claim 23, further comprising:
  generating one or more sample values indicative of an impedance at each of the plurality of sense coils;
  adjusting a sampling rate for generating the one or more sample values based on whether power transfer by the power-transfer system is active or inactive; and
  canceling out one or more of the one or more sample values that are within a time window having a length based on whether the power transfer is active or inactive.

* * * * *